US008645022B2

(12) United States Patent
Yoshimura et al.

(10) Patent No.: US 8,645,022 B2
(45) Date of Patent: Feb. 4, 2014

(54) VEHICLE CONTROL SYSTEM

(75) Inventors: Kentaro Yoshimura, Paris (FR); Kohei Sakurai, Hitachi (JP); Nobuyasu Kanekawa, Hitachi (JP); Yuichiro Morita, Hitachi (JP); Yoshiaki Takahashi, Mito (JP); Kenichi Kurosawa, Hitachi (JP); Toshimichi Minowa, Mito (JP); Masatoshi Hoshino, Tsuchiura (JP); Yasuhiro Nakatsuka, Tokai (JP); Kotaro Shimamura, Hitachinaka (JP); Kunihiko Tsunedomi, Hitachi (JP); Shoji Sasaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 190 days.

(21) Appl. No.: 12/575,212

(22) Filed: Oct. 7, 2009

(65) Prior Publication Data
US 2010/0030421 A1 Feb. 4, 2010

Related U.S. Application Data

(62) Division of application No. 11/094,660, filed on Mar. 31, 2005, now Pat. No. 7,630,807.

(30) Foreign Application Priority Data

Jul. 15, 2004 (JP) ................. 2004-207997
Jan. 28, 2005 (JP) ................. 2005-021656

(51) Int. Cl.
*G06F 19/00* (2011.01)
*G07C 5/00* (2006.01)
(52) U.S. Cl.
USPC ........... 701/32.8; 701/31.4; 903/903; 714/30; 714/E11.063

(58) Field of Classification Search
USPC ............ 701/48, 29, 53, 201, 29.2, 33.5, 33.7, 701/36, 4, 34.3, 31.4, 32.8; 707/101; 700/89; 710/34; 74/335; 340/438, 340/426.2; 714/30, E11.63
See application file for complete search history.

(56) References Cited

U.S. PATENT DOCUMENTS

| 5,957,985 | A * | 9/1999 | Wong et al. ................. 701/29.2 |
| 6,321,165 | B1 | 11/2001 | Ohta et al. |
| 6,345,222 | B1 | 2/2002 | Toukura et al. |
| 6,415,394 | B1 * | 7/2002 | Fruehling et al. ............... 714/30 |
| 6,421,790 | B1 * | 7/2002 | Fruehling et al. ............... 714/30 |
| 6,463,366 | B2 * | 10/2002 | Kinashi et al. .................. 701/13 |
| 6,463,373 | B2 * | 10/2002 | Suganuma et al. ............ 701/48 |
| 6,625,688 | B1 * | 9/2003 | Fruehling et al. ............. 711/109 |
| 6,729,844 | B2 | 5/2004 | Bettencourt |
| 6,952,688 | B1 * | 10/2005 | Goldman et al. ............... 706/45 |
| 6,981,176 | B2 * | 12/2005 | Fruehling et al. ............... 714/11 |
| 7,855,678 | B2 * | 12/2010 | Scherzinger et al. ..... 342/357.23 |
| 7,877,177 | B2 * | 1/2011 | Kueperkoch et al. ........ 701/30.3 |
| 2002/0004691 | A1 * | 1/2002 | Kinashi et al. ..................... 701/4 |
| 2002/0099487 | A1 * | 7/2002 | Suganuma et al. ............. 701/48 |
| 2002/0183911 | A1 * | 12/2002 | Tashiro et al. .................. 701/48 |
| 2003/0120401 | A1 | 6/2003 | Bauer et al. |
| 2005/0030009 | A1 * | 2/2005 | Moreno .................. 324/207.11 |
| 2008/0228323 | A1 | 9/2008 | Laumer et al. |
| 2009/0005986 | A1 * | 1/2009 | Soehren ......................... 701/220 |
| 2010/0019963 | A1 * | 1/2010 | Gao et al. .................. 342/357.04 |
| 2011/0250931 | A1 * | 10/2011 | Pande et al. .................... 455/566 |

FOREIGN PATENT DOCUMENTS

| CN | 2418058 | | 2/2001 |
| DE | 39 02 849 | A1 | 8/1990 |
| DE | 41 29 809 | A1 | 7/1992 |
| DE | 197 35 015 | A1 | 2/1999 |
| DE | 010058899 | A1 * | 5/2002 |
| DE | 010112514 | A1 * | 6/2002 |
| EP | 0 494 467 | A2 | 7/1992 |
| EP | 0 494 467 | A3 | 7/1992 |
| EP | 974482 | A2 | 1/2000 |
| EP | 990821 | A1 | 4/2000 |
| EP | 1550573 | A1 | 7/2005 |
| EP | 1877296 | A2 | 1/2008 |
| EP | 001972514 | A1 * | 9/2008 |
| FR | 2944612 | A3 * | 10/2010 |
| JP | 3-82621 | A | 4/1991 |

| | | |
|---|---|---|
| JP | 4252776 | 9/1992 |
| JP | 5-248528 A | 9/1993 |
| JP | 672172 | 3/1994 |
| JP | 9160643 | 6/1997 |
| JP | 10250417 | 9/1998 |
| JP | 10-291489 | 11/1998 |
| JP | 11-183220 A | 7/1999 |
| JP | 2000-264239 A | 9/2000 |
| JP | 2000-297664 A | 10/2000 |
| JP | 2002-53024 | 2/2002 |
| JP | 2002154418 | 5/2002 |
| JP | 2002-347602 | 12/2002 |
| JP | 200319931 | 1/2003 |
| JP | 200372417 | 3/2003 |
| JP | 2003-263235 | 9/2003 |
| JP | 2005199951 | 7/2005 |
| JP | 02005210892 A * | 8/2005 |
| SU | 874402 B | 10/1981 |
| WO | WO 98/26958 A1 | 6/1998 |
| WO | WO 04/000598 A1 | 12/2003 |
| WO | WO 2006113510 A2 | 10/2006 |

OTHER PUBLICATIONS

Electromechanical steering, suspension, drive and brake modules; Zetterstrom, S.; Vehicular Technology Conference, 2002. Proceedings. VTC 2002-Fall. 2002 IEEE 56th; vol. 3; Digital Object Identifier: 10.1109/VETECF.2002.1040538 Publication Year: 2002 , pp. 1856-1863 vol. 3.*
On the development of a high quality software design methodology for automotive applications; Tran, S.; Cullyer, J.; Hines, E.; Marks, K.; Safety Critical Software in Vehicle and Traffic Control, IEE Colloquium on; Publication Year: 1990 , pp. 6/1-6/5.*
Cited reference of Tashiro et al., US Pub. 2002/0183911 A1, was cited in U.S. Appl. No. 11/094,660.*
Integrated INS/GPS System for an Autonomous Mobile Vehicle; Jun Zhou; Bolandhemmat, H.; Mechatronics and Automation, 2007. ICMA 2007. International Conference on; Digital Object Identifier: 10.1109/ICMA.2007.4303628; Publication Year: 2007 , pp. 694-699.*
ANFIS-Based Model for Real-time INS/GPS Data Fusion for Vehicular Navigation System; El Shafie, A.; Hussain, A.; Eldin, A.E. N.; Computer Technology and Development, 2009. ICCTD '09. International Conference on; vol. 2; Digital Object Identifier: 10.1109/ICCTD.2009.42; Publication Year: 2009 , pp. 278-282.*
Tightly-coupled image-aided inertial relative navigation using Statistical Predictive Rendering (SPR) techniques and a priori world Models; Beich, Major J.; Veth, Col M.; Position Location and Navigation Symposium (PLANS), 2010 IEEE/ION Digital Object Identifier: 10.1109/PLANS.2010.5507309; Publication Year: 2010 , pp. 552-560.*
A tracking of AUV with integration of SSBL acoustic positioning and transmitted INS data; Watanabe, Y.; Ochi, H.; Shimura, T.; Hattori, T.; OCEANS 2009—Europe; Digital Object Identifier: 10.1109/OCEANSE.2009.5278145; Publication Year: 2009 , pp. 1-6.*
Integrated Vehicle Dynamics Control—state-of-the art review; Fan Yu ; Dao-Fei Li ; Crolla, D.A.; Vehicle Power and Propulsion Conference, 2008. VPPC '08. IEEE; Digital Object Identifier: 10.1109/VPPC.2008.4677809; Publication Year: 2008 , pp. 1-6.*
Hardware Building Blocks for High Data-Rate Fault-Tolerant In-vehicle Networking; Baronti, F. ; Saponara, S. ; Petri, E. ; Roncella, R. ; Saletti, R. ; Fanucci, L. ; D'Abramo, P.; Industrial Electronics, 2007. ISIE 2007. IEEE International Symposium on; Digital Object Identifier: 10.1109/ISIE.2007.4374579; Publication Year: 2007 , pp. 89-94.*
Node status monitoring and state transition mechanism for network centric X-by-Wire systems; Matsubara, M. ; Kojima, T. ; Shimamura, K. ; Kanekawa, N. ; Sakurai, K.; Autonomous Decentralized Systems, 2009. ISADS '09. International Symposium on; Digital Object Identifier: 10.1109/ISADS.2009.5207325; Publication Year: 2009 , pp. 1-6.*
Implementation of a fuzzy predictive redundancy system for tolerance of x-by-wire systems; Young Hun Song ; Man Ho Kim ; Suk Lee ; Kyung Chang Lee; IECON 2010—36th Annual Conference on IEEE Industrial Electronics Society; Digital Object Identifier: 10.1109/IECON.2010.5675027; Publication Year: 2010 , pp. 3141-3145.*
Providing convincing evidence of safety in X-by-wire automotive systems; Czerny, B.J. ; D'Ambrosio, J.G. ; Murray, B.T. High Assurance Systems Engineering, 2000, Fifth IEEE International Symposim on. HASE 2000; Digital Object Identifier: 10.1109/HASE.2000.895458; Publication Year: 2000 , pp. 189-192.*
Active steering unit with integrated ACC for X-by-wire vehicles using a joystick as H.M.I; Kelber, C.R. ; Webber, D. ; Gomes, G.K. ; Lohmann, M.A. ; Rodrigues, M.S. ; Ledur, D.; Intelligent Vehicles Symposium, 2004 IEEE; Digital Object Identifier: 10.1109/IVS. 2004.1336376; Publication Year: 2004 , pp. 173-177.*
Model-based Sensor Fault Detection and Isolation for X-By-Wire Vehicles Using a Fuzzy Logic System with Fixed Membership Functions; Quet, P.-F. ; Salman, M.; American Control Conference, 2007. ACC '07; Digital Object Identifier: 10.1109/ACC.2007.4282248; Publication Year: 2007 , pp. 2314-2319.*
Degradable on-chip safety controller with intra-chip communication for steer-by-wire systems; Hayek, A. ; Ugljesa, E. ; Schwarz, M.H. ; Borcsok, J. ; Salihbegovic, A.; Telecommunications (BIHTEL), 2012 IX International Symposium on Digital Object Identifier: 10.1109/BIHTEL.2012.6412090; Publication Year: 2012 , pp. 1-6.*
Use of Fuzzy Controller for Hybrid Traction Control System in Hybrid Electric Vehicles: Jianlong Zhang; Chengliang Yin; Jianwu Zhang; Mechatronics and Automation, Proceedings of the 2006 IEEE International Conference on; Jun. 25-28, 2006, pp. 1351-1356; Digital Object Identifier 10.1109/ICMA.2006.257824.
Driver-Input Sensor Selection and Topologies for Fault-Tolerant Drive-By-Wire Applications; Lii, N.Y.; Sturm, S.; Coombs, T.A.; Advanced Intelligent Mechatronics. Proceedings, 2005 IEEE/ASME International Conference on; 2005 pp. 122-127; Digital Object Identifier 10.1109/AIM.2005.1500977.
A backup system for automotive steer-by-wire, actuated by selective braking; Dominguez-Garcia, A.D.; Kassakian, J.G.; Schindall, J.E.; Power Electronics Specialists Conference, 2004, PESC 04, 2004 IEEE 35th Annual; vol. 1, Jun. 20-25, 2004 pp. 383-388 vol. 1; Digital Object Identifier 10.1109/PESC.2004.1355774.
Effective regenerative braking control for smooth stop of a hybrid electric bus; Jie Shu; Weiwei Xiong; Chengliang Yin; Yong Zhang; Vehicle Power and Propulsion Conference, 2008, VPPC '08, IEEE; Sep. 3-5, 2008 pp. 1-5; Digital Object Identifier 10.1109/VPPC. 2008.4677695.
Literature of First "X-by-Wire" Seminar by D & M Nikkei Mechanical, etc., pp. 3-6, lower left picture in slide 12.
Japanese office action dated Mar. 17, 2009 with English translation.
Chinese office action dated Feb. 29, 2008 with English translation.
European Search Report dated Oct. 5, 2007 (seven (7) pages).
European Search Report dated Jan. 18, 2011 (Seven (7) pages).
Japanese Office Action dated Oct. 9, 2012 (two (2) pages).

* cited by examiner

*Primary Examiner* — Cuong H Nguyen
(74) *Attorney, Agent, or Firm* — Crowell & Moring LLP

(57) ABSTRACT

A vehicle control system which can ensure high reliability, real-time processing, and expandability with a simplified ECU configuration and a low cost by backing up an error through coordination in the entire system without increasing a degree of redundancy of individual controllers beyond the least necessary level. The vehicle control system comprises a sensor controller for taking in sensor signals indicating a status variable of a vehicle and an operation amount applied from a driver, a command controller for generating a control target value based on the sensor signals taken in by the sensor controller, and an actuator controller for receiving the control target value from the command controller and operating an actuator to control the vehicle, those three controller being interconnected via a network. The actuator controller includes a control target value generating unit for generating a control target value based on the sensor signals taken in by the sensor controller and received by the actuator controller via the network when the control target value generated by the command controller is abnormal, and controls the actuator in accordance with the control target value generated by the control target value generating unit.

12 Claims, 49 Drawing Sheets

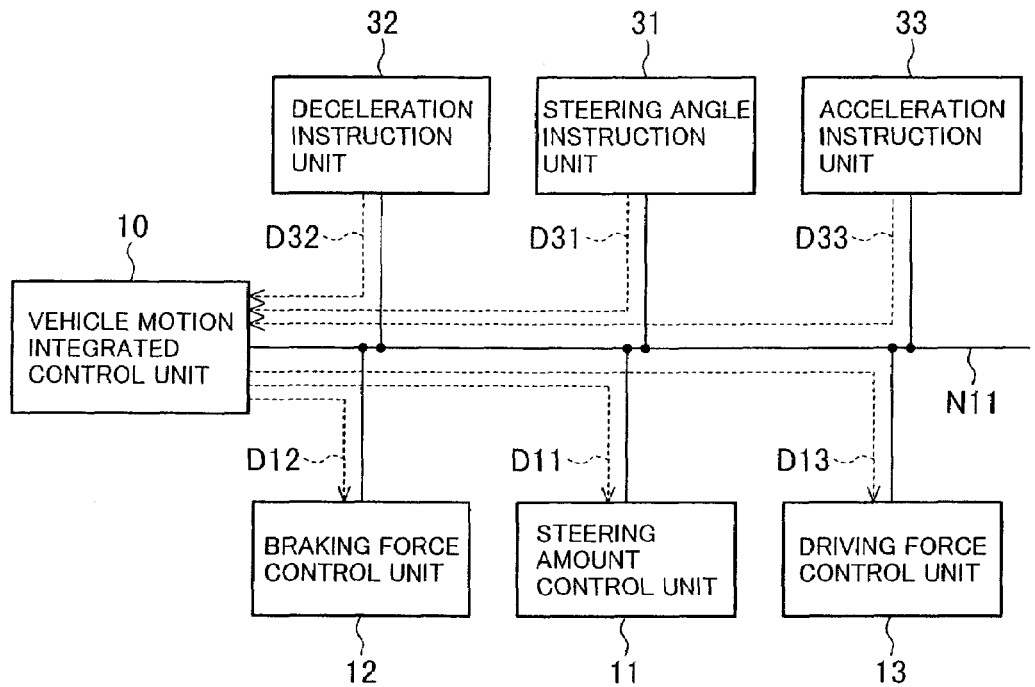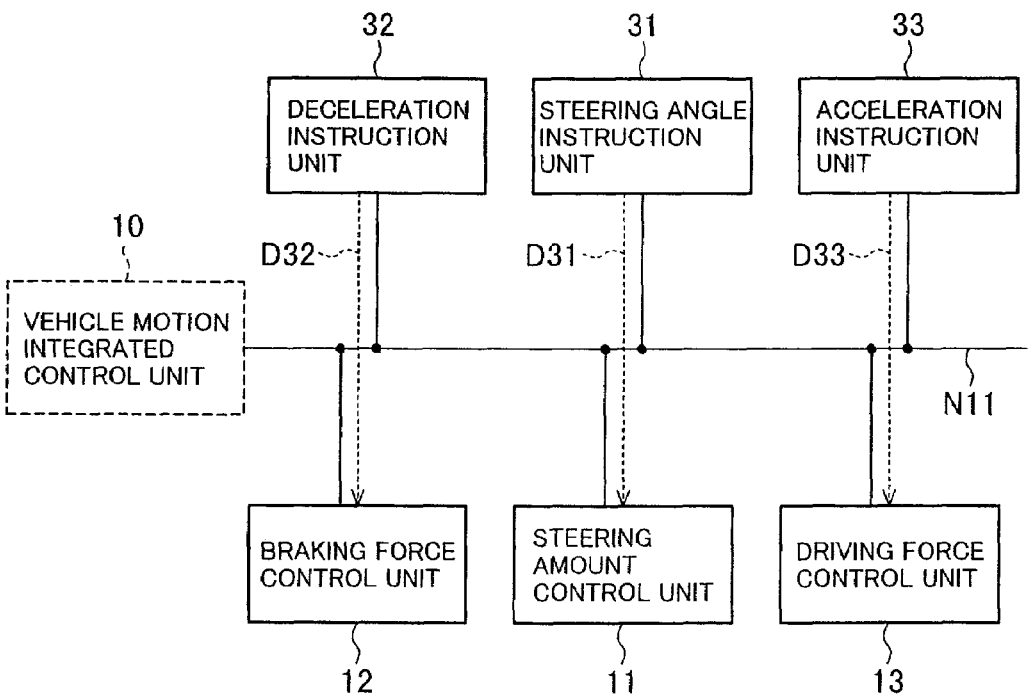

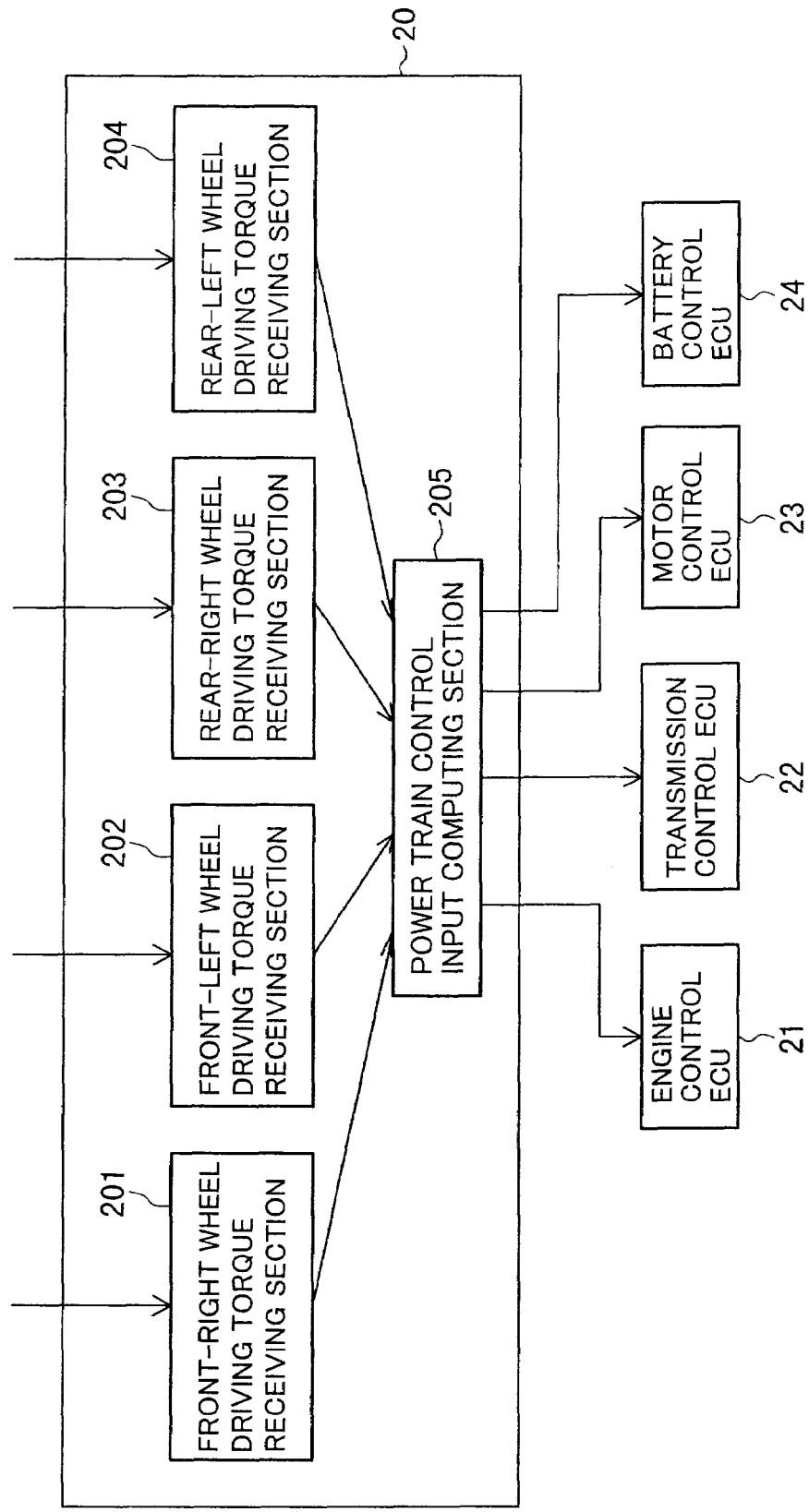

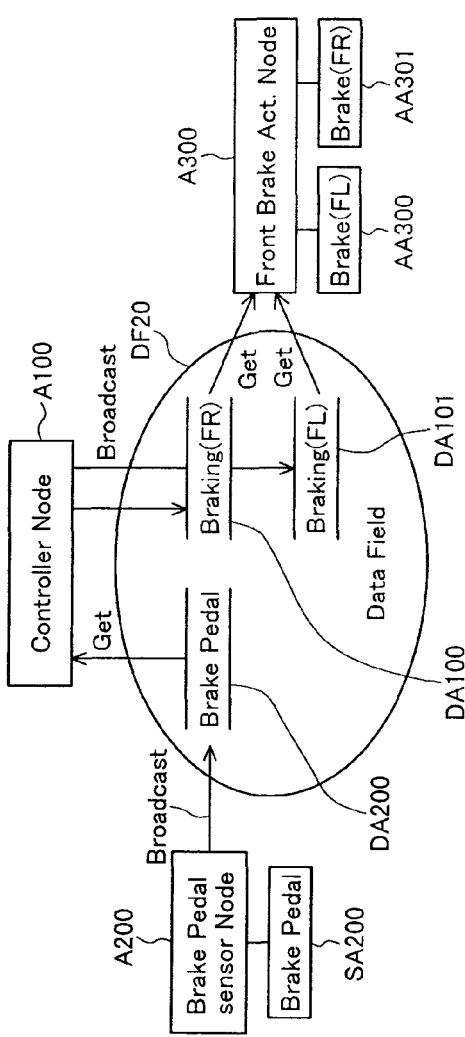
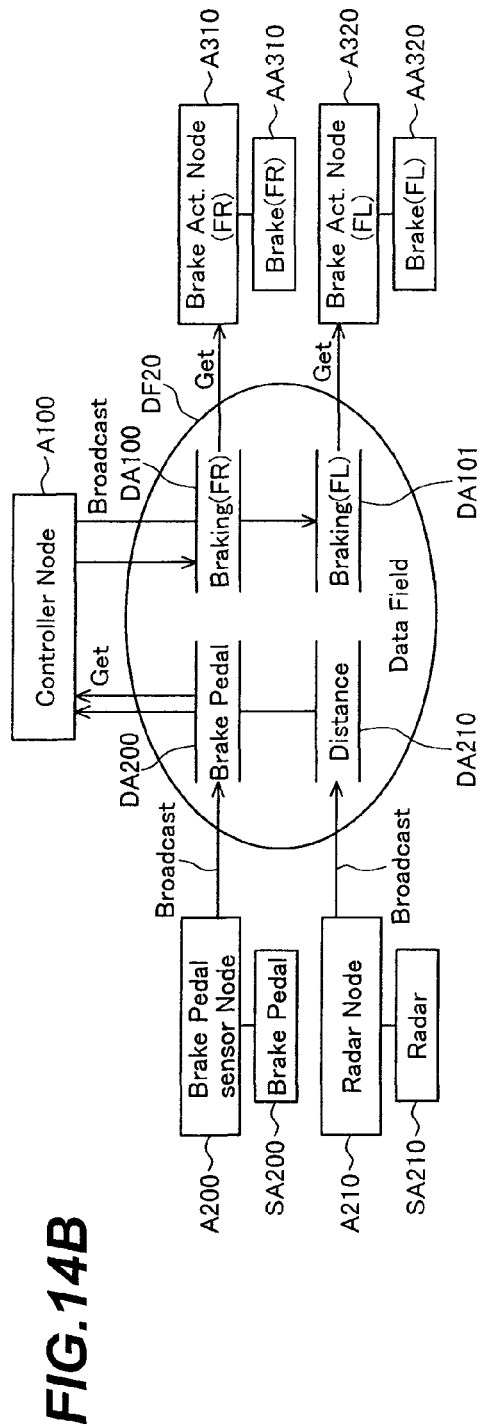
FIG.14A
FIG.14B

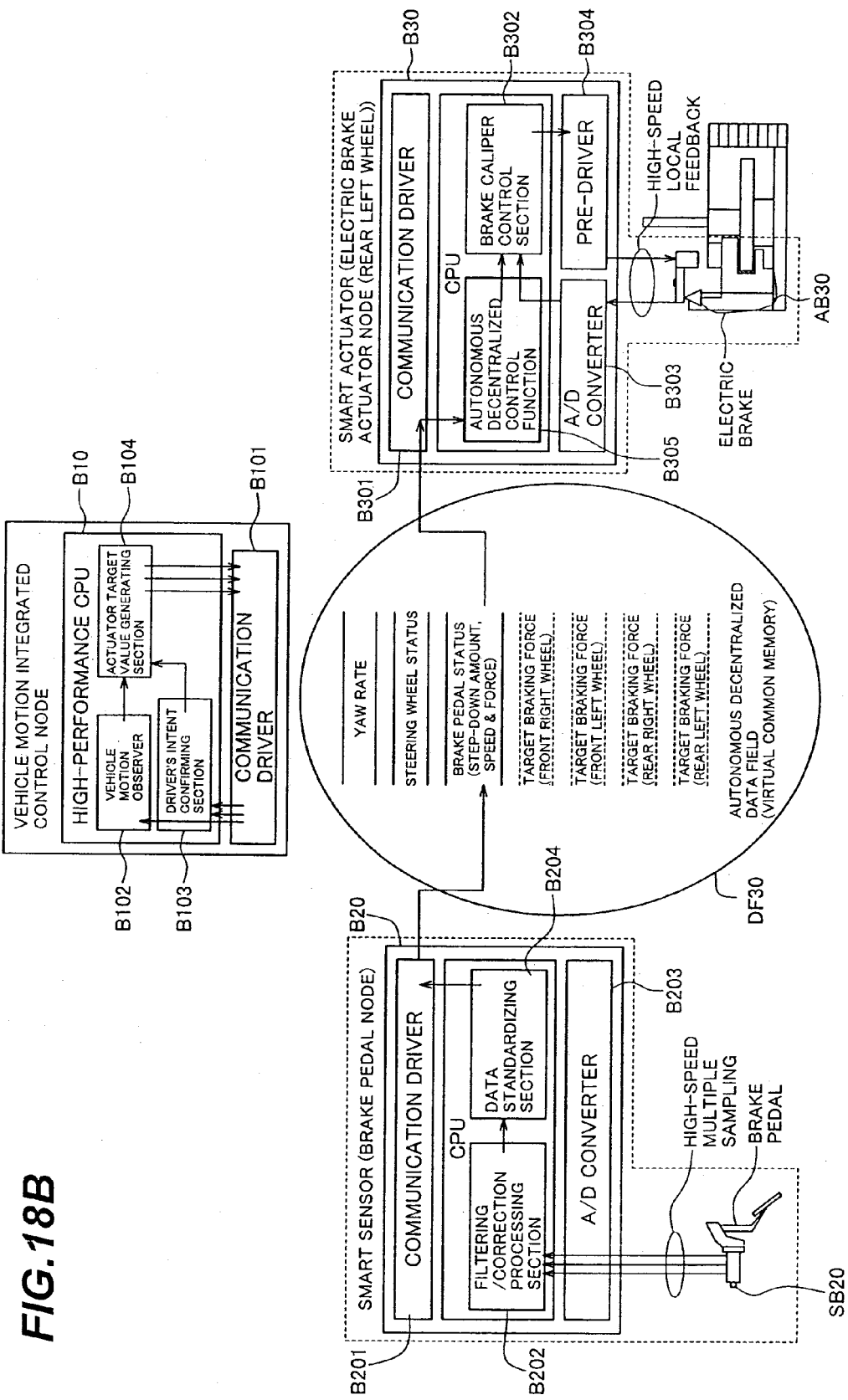

FIG.47A

| No. | LONGITUDINAL ADJACENT WHEEL | TRANSVERSE ADJACENT WHEEL | DIAGONAL ADJACENT WHEEL | CONTROL PROGRAM |
|---|---|---|---|---|
| 1 | ABNORMAL | NORMAL | NORMAL | (Y) |
| 2 | NORMAL | ABNORMAL | NORMAL | (Z) |
| 3 | NORMAL | NORMAL | ABNORMAL | (Y) |
| 4 | ABNORMAL | ABNORMAL | NORMAL | (Y) |
| 5 | ABNORMAL | NORMAL | ABNORMAL | (Y) |
| 6 | NORMAL | ABNORMAL | ABNORMAL | (Z) |
| 7 | ABNORMAL | ABNORMAL | ABNORMAL | (Z) |

FIG.47B

| No. | LONGITUDINAL ADJACENT WHEEL | TRANSVERSE ADJACENT WHEEL | DIAGONAL ADJACENT WHEEL | CONTROL PROGRAM |
|---|---|---|---|---|
| 1 | ABNORMAL | NORMAL | NORMAL | (Y) |
| 2 | NORMAL | ABNORMAL | NORMAL | (Y) |
| 3 | NORMAL | NORMAL | ABNORMAL | (Z) |
| 4 | ABNORMAL | ABNORMAL | NORMAL | (Y) |
| 5 | ABNORMAL | NORMAL | ABNORMAL | (Y) |
| 6 | NORMAL | ABNORMAL | ABNORMAL | (Z) |
| 7 | ABNORMAL | ABNORMAL | ABNORMAL | (Z) |

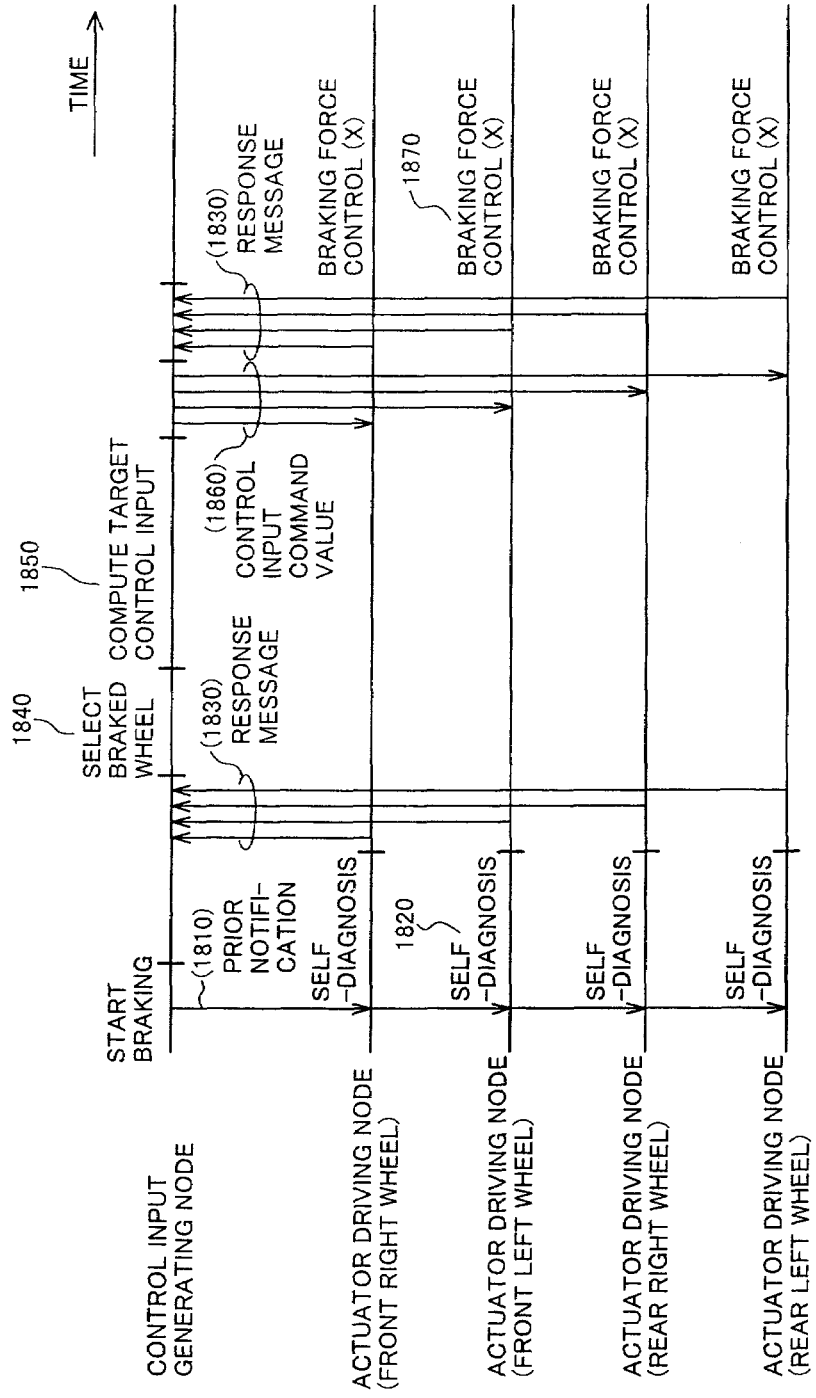

FIG.51A

| No. | FRONT RIGHT WHEEL | FRONT LEFT WHEEL | REAR RIGHT WHEEL | REAR RIGHT WHEEL | SELECTED WHEELS |
|---|---|---|---|---|---|
| 1 | ABNORMAL | NORMAL | NORMAL | NORMAL | TWO REAR WHEELS |
| 2 | NORMAL | ABNORMAL | NORMAL | NORMAL | TWO REAR WHEELS |
| 3 | NORMAL | NORMAL | ABNORMAL | NORMAL | TWO FRONT WHEEL |
| 4 | NORMAL | NORMAL | NORMAL | ABNORMAL | TWO FRONT WHEEL |
| 5 | ABNORMAL | ABNORMAL | NORMAL | NORMAL | TWO REAR WHEELS |
| 6 | NORMAL | NORMAL | ABNORMAL | ABNORMAL | TWO FRONT WHEEL |

FIG.51B

| No. | FRONT RIGHT WHEEL | FRONT LEFT WHEEL | REAR RIGHT WHEEL | REAR RIGHT WHEEL | SELECTED WHEELS |
|---|---|---|---|---|---|
| 1 | ABNORMAL | NORMAL | NORMAL | NORMAL | FRONT LEFT WHEEL AND REAR RIGHT WHEEL |
| 2 | NORMAL | ABNORMAL | NORMAL | NORMAL | FRONT RIGHT WHEEL AND REAR LEFT WHEEL |
| 3 | NORMAL | NORMAL | ABNORMAL | NORMAL | FRONT RIGHT WHEEL AND REAR LEFT WHEEL |
| 4 | NORMAL | NORMAL | NORMAL | ABNORMAL | FRONT LEFT WHEEL AND REAR RIGHT WHEEL |
| 5 | ABNORMAL | ABNORMAL | NORMAL | NORMAL | TWO REAR WHEELS |
| 6 | NORMAL | NORMAL | ABNORMAL | ABNORMAL | TWO FRONT WHEEL |

| No. | v | time | data | vote |
|---|---|---|---|---|
| 0 | 1 | 530 | 0123 | 00000100 |
| 1 | 1 | 531 | 4567 | 00000100 |
| 2 | 0 | ... | ... | ... |
| 3 | 1 | 529 | 89ab | 00000100 |
| 4 | 1 | 530 | cdef | 00000100 |
| 5 | 1 | 479 | aaaa | 00000100 |
| 6 | 0 | ... | ... | ... |
| 7 | 1 | 531 | 6969 | 00000100 |
| ... | ... | ... | ... | |

VEHICLE CONTROL SYSTEM

This application is a divisional of U.S. patent application Ser. No. 11/094,660, filed Mar. 31, 2005, the entire disclosure of which is incorporated herein by reference, which in turn claims priority under 35 U.S.C. §119 of prior Japanese application nos. 2005-021656, filed Jan. 28, 2005 and 2004-207997, filed Jul. 15, 2004.

BACKGROUND OF THE INVENTION

1. Field of the Invention

The present invention relates to a vehicle control system for controlling the running state of a vehicle. More particularly, the present invention relates to a vehicle control system for electronically controlling driving of a prime mover, steering and braking in a vehicle such as an automobile.

2. Description of the Related Art

As a vehicle control system, there was hitherto known an operation control system for controlling various control means related to a braking force, a driving force and a steering angle by an electronic control system, i.e., one master, in a concentrated manner (see, e.g., Patent Reference 1: JP-A-2003-263235).

Recently, aiming at an improvement of comfortableness in driving and safety of an automobile, a vehicle control system has intensively been developed in which driver's operations on an accelerator, a steering wheel and a brake are reflected on mechanisms for generating vehicle driving, steering and braking forces under electronic control without resorting to mechanical linkages. In such a vehicle control system, high reliability is required to ensure that the functions of driving, steering and braking the vehicle are in no way failed.

In other words, control realized with a mechanical mechanism has been replaced by control realized with an electrical mechanism. Typical examples are the so-called "Fly-by-Wire" in airplane control and "X-by-Wire" in automotive control. In these applications, a mechanical backup mechanism was initially provided to be ready for the event of a failure. However, the electrical mechanism has been required to have high reliability with a tendency to omit the mechanical backup mechanism.

Of the "X-by-Wire" (XBW system) for electrical control of an automobile, the "Steer-by-Wire" for electrical control of steering and the "Brake-by-Wire" for electrical control of braking are required to positively operate without malfunctions and to have high reliability. In particular, the "Steer-by-Wire" is required to have extremely high reliability because of the absence of a (failsafe) steering position that ensures safety in the event of a failure.

On the other hand, the merit of the "X-by-Wire" resides in that vehicle safety is improved by electronically controlling the steering and braking operations in an integrated manner. This point is represented by the widely-spreading concept "active safety", i.e., the concept of enhancing safety of an automobile with the so-called vehicle stabilization control (see, e.g., Patent Reference 3: JP-A-10-291489).

In one known example of the vehicle control system aiming at high reliability, the reliability is improved by providing a dual-redundant master controller that has the functions of ABS (Antilock Brake System), TCS (Transmission Controlled System), etc. (see, e.g., Non-Patent Reference 1: Literature of First "X-by-Wire" Seminar, by D&M Nikkei Mechanical, etc., pp. 3-6, lower left picture in slide 12). Another example is intended to realize high reliability by designing a control module for a front wheel brake to continue the normal operation even when an error occurs (so-called "fail-operative"), and designing a control module for a rear wheel brake to stop the function when an error occurs (so-called "fail-silent") (see, e.g., Patent Reference 2: JP-A-2002-347602).

As another type of vehicle control system, there is also known, for example, a system in which an operation amount applied from a driver to a maneuvering means, such as a brake pedal, is converted to an electric signal and the electric signal is transmitted to a control computer provided in a brake mechanism via a communication means, such as a CAN (Controlled Area Network), thereby performing electronic control.

SUMMARY OF THE INVENTION

The above-mentioned vehicle control system is generally known as the "X-by-Wire" system and is expected to realize more intelligent integrated running control, to reduce the vehicle weight, and to increase the flexibility in design by using a computer in comparison with the known system transmitting control forces through mechanical and hydraulic mechanisms.

In the known vehicle control system, signals from sensors for monitoring the operation amounts applied from the driver and the vehicle status are inputted to an electronic control unit serving as one master (i.e., a master ECU), and an engine controller, a brake controller and a steering controller, i.e., actuators for vehicle control, are controlled in an integrated manner. Therefore, if the master ECU is failed, the maneuvering of the vehicle cannot be performed at all. For that reason, the master ECU must have extremely high reliability to ensure safety.

With that situation in mind, providing a plurality of master ECU's with redundancy is proposed to ensure the reliability. However, redundancy of the master ECU requiring sophisticated processing increases the cost.

In conventional control architecture, an entire vehicle is constructed of subsystems such as an engine, a steering apparatus, and a brake. The reason is that an operating means and an actuator are provided in one-to-one relation as represented by pairs of an accelerator and the engine, a steering wheel and the steering apparatus, and a brake pedal and the brake.

Many of the XBW systems currently put into practice are designed as extensions of such conventional control architecture. Stated another way, the subsystems are constructed per each of the functions of "Drive-by-Wire", "Steer-by-Wire", "Brake-by-Wire", etc., and vehicle motion control is realized with coordination among the subsystems.

As a result of studying the problem with the known technique (conventional control architecture), the inventors have confirmed that a very high cost is necessary to ensure high reliability, real-time processing, and expandability required for the vehicle control system. The problem of the known technique is discussed in more detail below.

An integrated vehicle control system requires high reliability. In other words, even if a controller, a sensor or an actuator is failed, safe running of a vehicle must be ensured.

In the known technique, the fail-operative function (i.e., operation capability in the event of a failure) is required per subsystem because development of the function is performed per subsystem. Thus, the known technique includes an ECU for controlling an actuator (such as a steering apparatus or a brake) in accordance with a sensor (such as steering wheel or a brake pedal) per subsystem.

The ECU controls the associated sensor and actuator in a concentrated manner. To provide the fail-operative function in the entire system, therefore, the ECU per subsystem is required to have the fail-operative function. Providing the fail-operative function in the ECU increases the product cost because of the necessity of redundancy, etc.

Consequently, it is difficult to realize a highly reliable system at a low cost with the known technique that the ECU is installed per subsystem and is given with the fail-operative function.

In view of the above-mentioned problem, the inventors have found it effective, in realizing a highly reliable and low-cost system, to separate the ECU control functions into an integrated vehicle control function, an actuator control function and a sensor control function, to provide necessary and sufficient reliability per function, and to give the actuator control function with an autonomous backup function that is controllable in accordance with sensor information even when an abnormality occurs in the integrated vehicle control function.

Also, the vehicle control system is operated on the basis of hard real-time processing that satisfies strict time restrictions. In other words, changes in maneuvering of the driver and conditions of road surfaces must be promptly reflected on the control within a limit time. With the known technique, the real-time processing within the subsystem can relatively easily be ensured because development of the function is performed per subsystem.

However, the known technique has a difficulty in ensuring the real-time processing in the case of integrated control using a plurality of actuators, such as skidding attitude control. More specifically, because information obtained from one sensor is propagated successively through the vehicle control functions for the plural subsystems such as the brake, the steering apparatus and the engine, it is difficult to ensure the operation within a deadline time required for the relevant control.

Further, a delay in data propagation makes it also difficult to ensure simultaneity in obtaining data that is referred to by each subsystem. Realizing the sophisticated coordination in the vehicle motion control with the known technique, therefore, increases the number of steps required for adaptation and adjustment of the system and the subsystems, thus resulting in an increase of the development cost.

Thus, a difficulty exists in realizing the real-time integrated control at a low cost with the known system in which vehicle control logics and device drivers are distributed in respective ECU's and coordination must be made among the ECU's.

In view of the above-mentioned problem, the inventors have found it effective, in realizing the real-time integrated control, to separate the control functions into an integrated vehicle ECU and device controllers (i.e., actuator and sensor controllers), and to constitute them to be able to autonomously operate while sharing data.

In development of a new model car, a method of developing a plurality of new models using a common platform is generally employed to cut the development cost. This requires that addition of the function and change of parts can easily be performed per model. With the known technique, however, it is difficult to realize standardization at a sensor/actuator level because the various functions are performed by the respective ECU's at the subsystem level.

In other words, control logics in each ECU contain two parts in a mixed way, i.e., one corresponding to a logical and abstract control application, and the other corresponding to a device driver for actually controlling the sensor or the actuator.

Although there is a tendency toward standardization of device drivers, the tendency is limited to standardization in terms of interface alone, and the individual device drivers are closely related to the respective control applications in terms of real-time processing, ECU resources, etc.

That characteristic raises the problem that, whenever a sensor and/or an actuator is added or changed, control tasks, etc. at the subsystem level must be redesigned and the development cost is increased.

To realize a highly expandable system, it is required that controllers be designed to enable individual sensors and actuators to autonomously operate, and virtual common memories are provided in decentralized vehicle control units. In this respect, the inventors have found it effective to enable each sensor or actuator to broadcast, e.g., status information or a control target value to the common memories via a high-order interface, and to autonomously acquire required data or make control based on the received data.

Thus, the problem in realizing practical use of a vehicle control system with high reliability resides in achieving the high reliability without inviting a noticeable cost increase. From the viewpoint of cost, however, the known technique cannot be said as providing an optimum system because a master controller and control modules are partly designed to have the fail-operative function with a complicated redundant hardware configuration, for example.

Additionally, with the known technique, a vehicle can be avoided from slipping or spinning to prevent an accident by electronically correcting, e.g., the braking operation even when the driver applies a brake beyond a limit set on the vehicle.

However, because respective brakes associated with four wheels are controlled by an electronic control unit (ECU) in a concentrated manner in accordance with information obtained from a brake pedal and various sensors, the braking operation is no longer effectuated if the ECU is failed. Accordingly, the ECU is required to have high reliability, and a further consideration must be paid to a control system.

In view of the state of the art set forth above, it is an object of the present invention to provide a vehicle control system which can ensure high reliability, real-time processing, and expandability with a simplified ECU configuration and a low cost by backing up an error through coordination in the entire system without increasing a degree of redundancy of individual controllers beyond the least necessary level.

To achieve the above object, the present invention provides a vehicle control system comprising a sensor slave computer (sensor controller) for outputting a sensor value to a network, a master computer (command controller) for receiving the sensor value, computing a control target value based on the sensor value, and outputting the computed control target value to the same network, and an actuator slave computer (actuator controller) for receiving the control target value and operating an actuator, wherein when the actuator slave computer cannot properly receive the control target value, the actuator slave computer receives the sensor value outputted from the sensor slave computer to the same network and computes a control target value based on the received sensor value, thereby controlling the actuator.

Also, the present invention provides a vehicle control system comprising an operation amount generating node for computing an operation amount command value based on driver's demand signals and vehicle status signals from sensors, and actuator driving nodes each controlling an actuator in accordance with the operation amount command value from the operation amount generating node, thereby driving, steering and braking a vehicle, wherein each of those nodes has a failure detecting function and operates such that, when a failure is detected in itself with the failure detecting function, the relevant node does not make any action externally of the relevant node except for notifying that the relevant node is in a failed state, and when a failure occurs in any node, the other normal nodes than the failed node switch over control in accordance with a failure detecting notification from the failed node, thereby continuing normal operation as an entire system.

Each of the driver's demand detecting sensors is connected to a communication network, and when a failure of the relevant sensor is detected, the relevant sensor does not make any action externally of the relevant sensor except for notifying that the relevant sensor is in a failed state.

More specifically, each of the sensors comprises a plurality of sensor elements, A/D converters for converting outputs of the plurality of sensor elements to digital values, a match checking function for a plurality of A/D-converted values, a filter function, and a communication interface.

When the operation amount generating node receives the failure detection notification from the failed node, the operation amount generating node switches over control depending on a failure position so that a vehicle running state is kept stable.

Each of the actuator driving nodes has a function of generating an operation amount command value based on the signals from the driver's demand detecting sensors when the operation amount command value is not receivable from the operation amount generating node, and the operation amount generating node switches over control from a normal mode to a mode for realizing the operation amount command value generating function so that the vehicle running state is kept stable, when the operation amount command value is not receivable from the operation amount generating node.

The driver's demand detecting sensors, the operation amount generating node, and the actuator driving node are connected to the same communication network. The communication network comprises a main bus and a backup bus. The main bus is connected to all of the driver's demand detecting sensors, the operation amount generating node and the actuator driving nodes, while the backup bus is connected to a part of the driver's demand detecting sensors and a part of the actuator driving nodes. In the event of a failure of the main bus, the actuator driving nodes operate such that a vehicle running state is kept stable.

In the vehicle control system according to the present invention, more specifically, the driver's demand detecting sensors include a steering angle sensor for measuring a steering wheel rotational angle, a brake pedal position sensor for measuring a brake pedal step-down amount, and an accelerator pedal position sensor for measuring an accelerator pedal step-down amount; the operation amount generating node is constituted as a vehicle motion integrated controller and a driving-system integrated controller, the vehicle motion integrated controller interpreting a driver's intent based on the signals from the driver's demand detecting sensors and controlling a vehicle motion in an integrated manner in combination with the signals from the vehicle status detecting sensors, the driving-system integrated controller interpreting a driver's intent based on the signals from the driver's demand detecting sensors and controlling a driving system of the vehicle in an integrated manner in combination with the signals from the vehicle status detecting sensors; and the actuator driving nodes are constituted as a steering actuator driving controller for controlling a steering actuator which generates a steering force, a brake actuator driving controller for controlling a brake actuator which generates a braking force, and a suspension actuator driving controller for controlling a suspension actuator which adjusts a damping force, those nodes being connected to the same communication network. A radar or a camera for detecting a situation outside the vehicle may be connected to the communication network.

In addition, the accelerator pedal position sensor is connected to the communication network and is further directly connected to an engine controller for receiving a torque command value from the driving-system integrated controller and controlling an engine in accordance with the received torque command value.

In the vehicle control system described above, when a brake pedal and a braking force generating mechanism are not coupled mechanically to each other, at least the brake pedal position sensor is constituted to enable normal operation to be continued even in the occurrence of a single failure.

When a steering wheel and a steering force generating mechanism are not coupled mechanically to each other, at least the steering angle sensor and the steering actuator driving controller are constituted to enable normal operation to be continued even in the occurrence of a single failure, and the steering actuator is installed plural with redundancy.

A force generated by each of the plurality of steering actuators is smaller than a force generated by the steering actuator when the steering wheel and the steering force generating mechanism are mechanically coupled to each other.

Also, the steering actuator driving controller comprises a plurality of driving nodes with redundancy each constituted such that, when a failure in the relevant node is detected, the relevant node does not make any action externally of the relevant node except for notifying that the relevant node is in a failed state, and wherein the driving nodes drive the steering actuators in redundant arrangement independently of one another.

In the vehicle control system including no backup mechanisms for braking and steering, each of the brake pedal position sensor and the steering angle sensor is constituted as a set of fail-silent sensors with redundancy each comprising a plurality of sensor elements, A/D converters for converting outputs of the plurality of sensor elements to digital values, a match checking function for a plurality of A/D-converted values, a filter function, and a communication interface. As an alternative, each of the brake pedal position sensor and the steering angle sensor is constituted as a fail-operative node comprising at least three sensor elements, A/D converters for converting outputs of the plurality of sensor elements to digital values, a majority decision function for a plurality of A/D-converted values, a filter function, and a communication interface.

Further, the present invention provides a vehicle control system comprising an operation amount generating node, a correction amount generating node, and an actuator driving node, wherein the actuator driving node controls the actuator by using, as a control target value, a value obtained by adding the correction amount from the correction amount generating node to the operation amount from the correction amount generating node when the correction amount generating node is normal, and controls the actuator by using, as the control target value, the operation amount from the operation amount generating node when the correction amount generating node is abnormal.

As a result, even if the correction amount generating node is failed, the actuator can be controlled in accordance with the operation amount from the operation amount generating node although the correction is not performed.

Still further, the present invention provides a vehicle control system comprising a plurality of actuator driving units for controlling actuators in accordance with a driver's demand and a vehicle status, and a communication unit for interconnecting the plurality of actuator driving units, thereby controlling at least one of driving, steering and braking of a vehicle, wherein each of the actuator driving units has a control method selecting unit for selecting an actuator control method based on an operation state of itself and operation states of the other actuator driving units.

Still further, the present invention provides a vehicle control system comprising a plurality of actuator driving units for controlling actuators in accordance with a driver's demand and a vehicle status, and a communication unit for interconnecting the plurality of actuator driving units, thereby controlling at least one of driving, steering and braking of a vehicle, wherein each of the actuator driving units has a failure detecting unit for detecting its own failure and notifying the occurrence of the failure to the other actuator driving units via the communication unit, and has a control method selecting unit for selecting an actuator control method based on the failed state of itself and the failed states of the other actuator driving units.

Still further, the present invention provides a vehicle control system comprising a plurality of actuator driving units for controlling actuators in accordance with a driver's demand and a vehicle status, and a communication unit for interconnecting the plurality of actuator driving units, thereby controlling at least one of driving, steering and braking of a vehicle, wherein each of the actuator driving units has a control method selecting unit for selecting an actuator control method based on reception states of messages sent from the other actuator driving units via the communication unit.

Still further, the present invention provides a vehicle control system comprising a plurality of actuator driving units for controlling actuators in accordance with a driver's demand and a vehicle status, and a communication unit for interconnecting the plurality of actuator driving units, thereby controlling at least one of driving, steering and braking of a vehicle, wherein each of the actuator driving units sends a message notifying its own operation state to the other actuator driving units via the communication unit, and has a control method selecting unit for selecting an actuator control method based on whether the messages have been received from the other actuator driving units.

Still further, the present invention provides a vehicle control system comprising at least one operation amount generating unit for computing operation amount command values based on a driver's demand and a vehicle status, a plurality of actuator driving units for controlling actuators in accordance with the operation amount command values from the operation amount generating unit, and a communication unit for interconnecting the operation amount generating unit and the plurality of actuator driving units, thereby controlling at least one of driving, steering and braking of a vehicle, wherein each of the actuator driving units has a control method selecting unit for selecting an actuator control method based on an operation state of itself, operation states of the other actuator driving units, and an operation state of the operation amount generating unit.

Still further, the present invention provides a vehicle control system comprising at least one operation amount generating unit for computing operation amount command values based on a driver's demand and a vehicle status, a plurality of actuator driving units for controlling actuators in accordance with the operation amount command values from the operation amount generating unit, and a communication unit for interconnecting the operation amount generating unit and the plurality of actuator driving units, thereby controlling at least one of driving, steering and braking of a vehicle, wherein the operation amount generating unit has a failure detecting unit for detecting its own failure and notifying the occurrence of the failure to the actuator driving units or the operation amount generating unit via the communication unit, and wherein each of the actuator driving units has a failure detecting unit for detecting its own failure and notifying the occurrence of the failure to the other actuator driving units or the operation amount generating unit via the communication unit, and has a control method selecting unit for selecting an actuator control method based on the failed state of itself, the failed states of the other actuator driving units, and the failed state of the operation amount generating unit.

Still further, the present invention provides a vehicle control system comprising at least one operation amount generating unit for computing operation amount command values based on a driver's demand and a vehicle status, a plurality of actuator driving units for controlling actuators in accordance with the operation amount command values from the operation amount generating unit, and a communication unit for interconnecting the operation amount generating unit and the plurality of actuator driving units, thereby controlling at least one of driving, steering and braking of a vehicle, wherein each of the actuator driving units has a control method selecting unit for selecting an actuator control method based on reception states of messages sent from the other actuator driving units or the operation amount generating unit.

Still further, the present invention provides a vehicle control system comprising at least one operation amount generating unit for computing operation amount command values based on a driver's demand and a vehicle status, a plurality of actuator driving units for controlling actuators in accordance with the operation amount command values from the operation amount generating unit, and a communication unit for interconnecting the operation amount generating unit and the plurality of actuator driving units, thereby controlling at least one of driving, steering and braking of a vehicle, wherein the operation amount generating unit sends the operation amount command values to the actuator driving units via the communication unit, and wherein each of the actuator driving units sends, upon receiving the operation amount command value, a response message to the operation amount generating unit or the other actuator diving units via the communication unit, and has a control method selecting unit for selecting an actuator control method based on whether the operation amount command value from the operation amount generating unit or the response messages from the other actuator driving units have been received.

Still further, the present invention provides a vehicle control system comprising sensor units for detecting a driver's demand and a vehicle status, at least one operation amount generating unit for computing operation amount command values based on information from the sensor units, a plurality of actuator driving units for controlling actuators in accordance with the operation amount command values from the operation amount generating unit or the information from the sensor units, and a communication unit for interconnecting the sensor units, the operation amount generating unit and the plurality of actuator driving units, thereby controlling at least one of driving, steering and braking of a vehicle, wherein each of the actuator driving units has a control method selecting unit for selecting one of a control method using the operation amount command value from the operation amount generating unit, a control method using the information from the sensor units, and a control method of bringing the actuator into a predetermined state based on an operation state of itself, operation states of the other actuator driving units, and an operation state of the operation amount generating unit.

Still further, the present invention provides a vehicle control system comprising sensor units for detecting a driver's demand and a vehicle status, at least one operation amount generating unit for computing operation amount command values based on information from the sensor units, a plurality of actuator driving units for controlling actuators in accordance with the operation amount command values from the operation amount generating unit or the information from the sensor units, and a communication unit for interconnecting the sensor units, the operation amount generating unit and the plurality of actuator driving units, thereby controlling at least one of driving, steering and braking of a vehicle, wherein the operation amount generating unit has a failure detecting unit for detecting its own failure and notifying the occurrence of the failure to the actuator driving units or the operation amount generating unit via the communication unit, and wherein each of the actuator driving units has a failure detecting unit for detecting its own failure and notifying the occurrence of the failure to the other actuator driving units or the operation amount generating unit via the communication unit, and has a control method selecting unit for selecting one of a control method using the operation amount command value from the operation amount generating unit, a control method using the information from the sensor units, and a control method of bringing the actuator into a predetermined state based on the failed state of itself, the failed states of the other actuator driving units, and the failed state of the operation amount generating unit.

Still further, the present invention provides a vehicle control system comprising sensor units for detecting a driver's demand and a vehicle status, at least one operation amount generating unit for computing operation amount command values based on information from the sensor units, a plurality of actuator driving units for controlling actuators in accordance with the operation amount command values from the operation amount generating unit or the information from the sensor units, and a communication unit for interconnecting the sensor means, the operation amount generating unit and the plurality of actuator driving units, thereby controlling at least one of driving, steering and braking of a vehicle, wherein each of the actuator driving units has a control method selecting unit for selecting one of a control method using the operation amount command value from the operation amount generating unit, a control method using the information from the sensor units, and a control method of bringing the actuator into a predetermined state based on reception states of messages sent from the other actuator driving units or the operation amount generating unit.

Still further, the present invention provides a vehicle control system comprising sensor units for detecting a driver's demand and a vehicle status, at least one operation amount generating unit for computing operation amount command values based on information from the sensor units, a plurality of actuator driving units for controlling actuators in accordance with the operation amount command values from the operation amount generating unit or the information from the sensor units, and a communication unit for interconnecting the sensor means, the operation amount generating unit and the plurality of actuator driving units, thereby controlling at least one of driving, steering and braking of a vehicle, wherein the operation amount generating unit sends the operation amount command values to the actuator driving units via the communication unit, and wherein each of the actuator driving units sends, upon receiving the operation amount command value, a response message to the operation amount generating unit or the other actuator driving units via the communication unit, and has a control method selecting unit for selecting one of a control method using the operation amount command value from the operation amount generating unit, a control method using the information from the sensor units, and a control method of bringing the actuator into a predetermined state based on whether the operation amount command value from the operation amount generating unit or the response messages from the other actuator driving units have been received.

Still further, the present invention provides a vehicle control system for driving, steering and braking a vehicle, the vehicle control system comprising a node for detecting a driver's demand and outputting a corresponding signal; an operation amount generating node for computing an operation amount command value based on the driver's demand signal and outputting a corresponding signal; and an actuator driving node for controlling an actuator in accordance with the operation amount command value from the operation amount generating node, those three nodes being arranged in a decentralized manner, wherein each of those three nodes includes a data reception table storing the signals outputted from the other nodes and has a function of detecting a failure of the other nodes by determining data stored in the data reception table.

Still further, the present invention provides a vehicle control system wherein the data reception table includes information representing the time of each message, and each node has a function of determining that a message transmission source or a communication path does not operate normally or has recovered to a normal state, when a time delay is larger than a predetermined value.

Still further, the present invention provides a vehicle control system wherein the data reception table includes a failure vote section, and each node has a function of identifying a failed node or a node having recovered to a normal state in accordance with a predetermined algorithm. With this feature, the occurrence of a failure in any node and recovery of the failed node to a normal state can be determined, whereby vehicle control can safely be continued.

Still further, the present invention provides a vehicle control system wherein each node outputs, as failure votes, failure diagnosis information of the other nodes so that failure determination results of the individual nodes are shared by all the nodes. With this feature, the failure determination results of the individual nodes are made coincident with one another, whereby vehicle control can safely be continued.

According to the vehicle control system of the present invention, even if the operation amount generating unit or any of the actuator driving units becomes uncontrollable, the vehicle control can safely be continued using the other actuator driving units. It is therefore possible to ensure high reliability, real-time processing, and expandability with a simplified ECU configuration and a low cost without increasing a degree of redundancy of individual controllers beyond the least necessary level.

BRIEF DESCRIPTION OF THE DRAWINGS

FIGS. 2A and 2B are each a data flowchart showing a practical example of communication data flows in the vehicle control system according to the first embodiment;

FIG. 12 is a control block diagram of a DBW-system integrated control ECU in the vehicle control system according to the first embodiment;

FIGS. 14A and 14B are each a block diagram showing an outline of a data field in the autonomous decentralized control platform;

FIGS. 18A and 18B are each a block diagram showing a configuration example of the XBW vehicle control system;

FIGS. 47A and 47B are each a representation showing an example of a control program selection table;

FIG. 48 is a time chart showing the operations of the operation amount generating node and the actuator driving node at the start timing of brake control;

FIGS. 51A and 51B are each a representation showing an example of a braked wheel selection table;

DESCRIPTION OF THE PREFERRED EMBODIMENTS

First Embodiment

Figure 1:
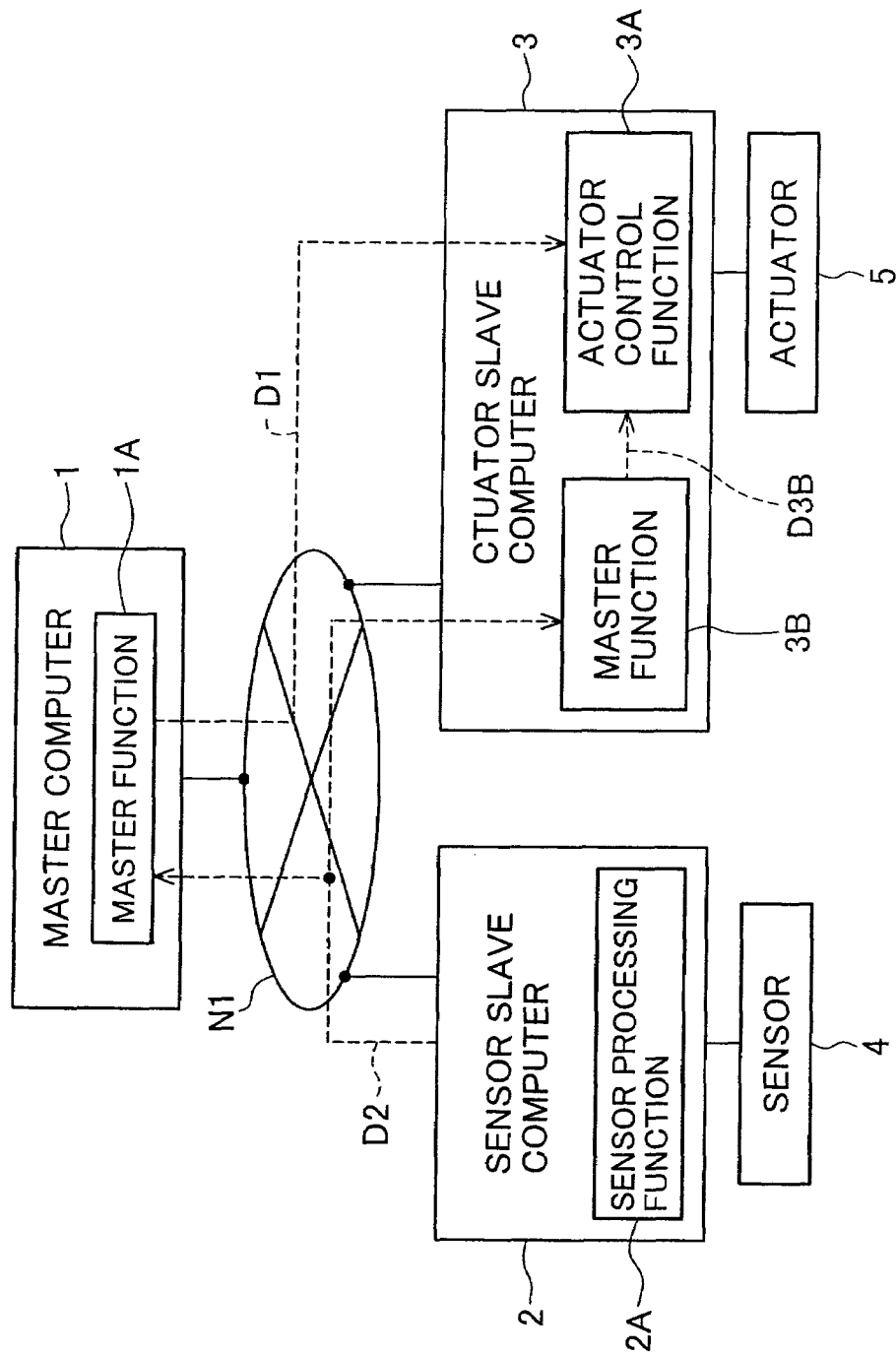
FIG. 1 is a block diagram showing a basic configuration of a vehicle control system according to a first embodiment of the present invention.

First, a basic configuration of a vehicle control system according to a first embodiment of the present invention will be described below with reference to FIG. 1.

The vehicle control system comprises a master computer (command controller) 1, a sensor slave computer (sensor controller) 2, and an actuator slave computer (actuator controller) 3. These computers are interconnected to perform two-way data communication among them via a wired or wireless network N1 of bus, mesh, star, ring or any other suitable type.

The master computer 1 is a command controller for computing a control target value and includes a master control function (master control means) 1A.

The sensor slave computer 2 is connected to a sensor 4 for monitoring (measuring) the status of a control target. The sensor slave computer 2 includes a sensor processing function (sensor processing means) 2A for processing a sensor signal from the sensor 4.

An actuator 5 for operating the control target is connected to the actuator slave computer 3. The actuator slave computer 3 is a slave computer for controlling the actuator 5, and it includes an actuator control function (actuator control means) 3A for controlling the actuator 5 in accordance with the control target value from the master computer 1 and a simplified master function (control target value generating means) 3B for computing the control target value.

On the network N1, there are a data flow D1 of the control target value and a data flow D2 of a measured sensor value.

The measured-sensor-value data flow D2 is a data flow of the measured sensor value outputted from the sensor slave computer 2. The measured sensor value outputted from the sensor slave computer 2 is received by both the master function 1A of the master computer 1 and the simplified master function 3B of the actuator slave computer 3.

The control-target-value data flow D1 is a data flow of the control target value outputted from the master computer 1.

The control target value outputted from the master computer 1 is received by the actuator control function 3A of the actuator slave computer 3.

In the normal operation, the actuator slave computer 3 controls the actuator 5 in accordance with the control target value received by the actuator control function 3A from the master computer 1 via the data flow D1.

In the event of abnormality in the data flow D1, however, the actuator slave computer 3 controls the actuator 5 in accordance with the control target value computed by the simplified master function 3B. More specifically, the simplified master function 3B computes the control target value based on the measured sensor value obtained via the data flow D2, and the actuator control function 3A controls the actuator 5 in accordance with the result computed by the simplified master function 3B, i.e., the control target value, which is obtained via a data flow D3B inside the actuator slave computer 3.

With the configuration described above, even if the master function 1A of the master computer 1 comes into an inoperable state, the actuator control can be continued in accordance with result computed by the simplified master function 3B. It is therefore possible to reflect the operation applied from the driver and changes of the vehicle status on the control, and to realize a vehicle control system with high reliability.

While FIG. 1 shows the master computer 1 as one computer, the master control function may be divided into a plurality of functions, and a plurality of computers may be used to execute the divided functions.

Practical examples of communication data flows in the vehicle control system shown in FIG. 1 will be described below with reference to FIGS. 2A and 2B.

The master computer is embodied as a vehicle motion integrated control unit 10 for controlling the motion of an entire vehicle in an integrated manner.

The sensor slave computer is embodied as including a steering angle instruction unit (steering angle sensor system) 31, a deceleration instruction unit (brake pedal step-down amount sensor system) 32, and an acceleration instruction unit (accelerator pedal step-down amount sensor system) 33, these instruction units being responsive to operations applied from the driver.

The actuator slave computer is embodied as including a steering amount control unit 11 for controlling a vehicle steering angle, a braking force control unit 12 for controlling a vehicle braking force, and a driving force control unit 13 for controlling a vehicle driving force.

The steering angle instruction unit 31, the deceleration instruction unit 32, and the acceleration instruction unit 33, the steering amount control unit 11, the braking force control unit 12, the driving force control unit 13, and the vehicle motion integrated control unit 10 are interconnected via the communication bus N11.

FIG. 2A shows the data flow when the vehicle motion integrated control unit 10 operates normally.

In the data flow of FIG. 2A, numeral D31 denotes an operation amount applied to the steering angle instruction unit 31 from the driver, which is converted to an electric signal by the steering angle instruction unit 31 and outputted to the communication bus N11.

Numeral D32 denotes an operation amount applied to the deceleration instruction unit 32 from the driver, which is converted to an electric signal by the deceleration instruction unit 32 and outputted to the communication bus N11.

Numeral D33 denotes an operation amount applied to the acceleration instruction unit 33 from the driver, which is converted to an electric signal by the acceleration instruction unit 33 and outputted to the communication bus N11.

The vehicle motion integrated control unit 10 receives the steering angle instruction unit operation amount D31, the deceleration instruction unit operation amount D32 and the acceleration instruction unit operation amount D33 via the communication bus N11, and executes computations for controlling the vehicle motion in an integrated manner.

Thereafter, the vehicle motion integrated control unit 10 outputs a steering amount target value D11, a braking force target value D12, and a driving force target value D13, as target values applied to the respective control units for controlling the vehicle, to the communication bus N11.

The steering amount control unit 11 receives the steering amount target value D11 via the communication bus N11 and controls a steering system, e.g., a steering mechanism, so that the steering amount target value D11 is realized.

The braking force control unit 12 receives the braking force target value D12 via the communication bus N11 and controls a braking device, e.g., an electric brake, so that the braking force target value D12 is realized.

The driving force control unit 13 receives the driving force target value D13 via the communication bus N11 and controls a driving force generator and a power transmission system, e.g., an engine, a transmission and an electric motor, so that the driving force target value D13 is realized.

FIG. 2B shows the data flow when there occurs an error in the vehicle motion integrated control unit 10.

When the vehicle motion integrated control unit 10 is failed, the steering amount target value D11, the braking force target value D12 and the driving force target value D13 are not outputted to the communication bus N11. In spite of such a situation, the vehicle must be controlled as intended by the driver.

To that end, when it is determined that an error has occurred in the vehicle motion integrated control unit 10, the steering amount control unit 11 receives the steering angle instruction unit operation amount D31 via the communication bus N11 and controls the steering system, e.g., a steering gear, in accordance with the steering angle instruction unit operation amount D31.

When it is determined that an error has occurred in the vehicle motion integrated control unit 10, the braking force control unit 12 receives the deceleration instruction unit operation amount D32 via the communication bus N11 and controls the braking device, e.g., an electric brake, in accordance with the deceleration instruction unit operation amount D32.

When it is determined that an error has occurred in the vehicle motion integrated control unit 10, the driving force control unit 13 receives the acceleration instruction unit operation amount D33 via the communication bus N11 and controls the driving force generator, e.g., the engine, the transmission and the electric motor, in accordance with the acceleration instruction unit operation amount D33.

The fact that an error has occurred in the vehicle motion integrated control unit 10 is determined by monitoring, e.g., such an event that no data has been outputted to the communication bus N11 for a certain time. As an alternative, the vehicle motion integrated control unit 10 may output a message indicating the occurrence of an error when the error has occurred.

Figure 3:
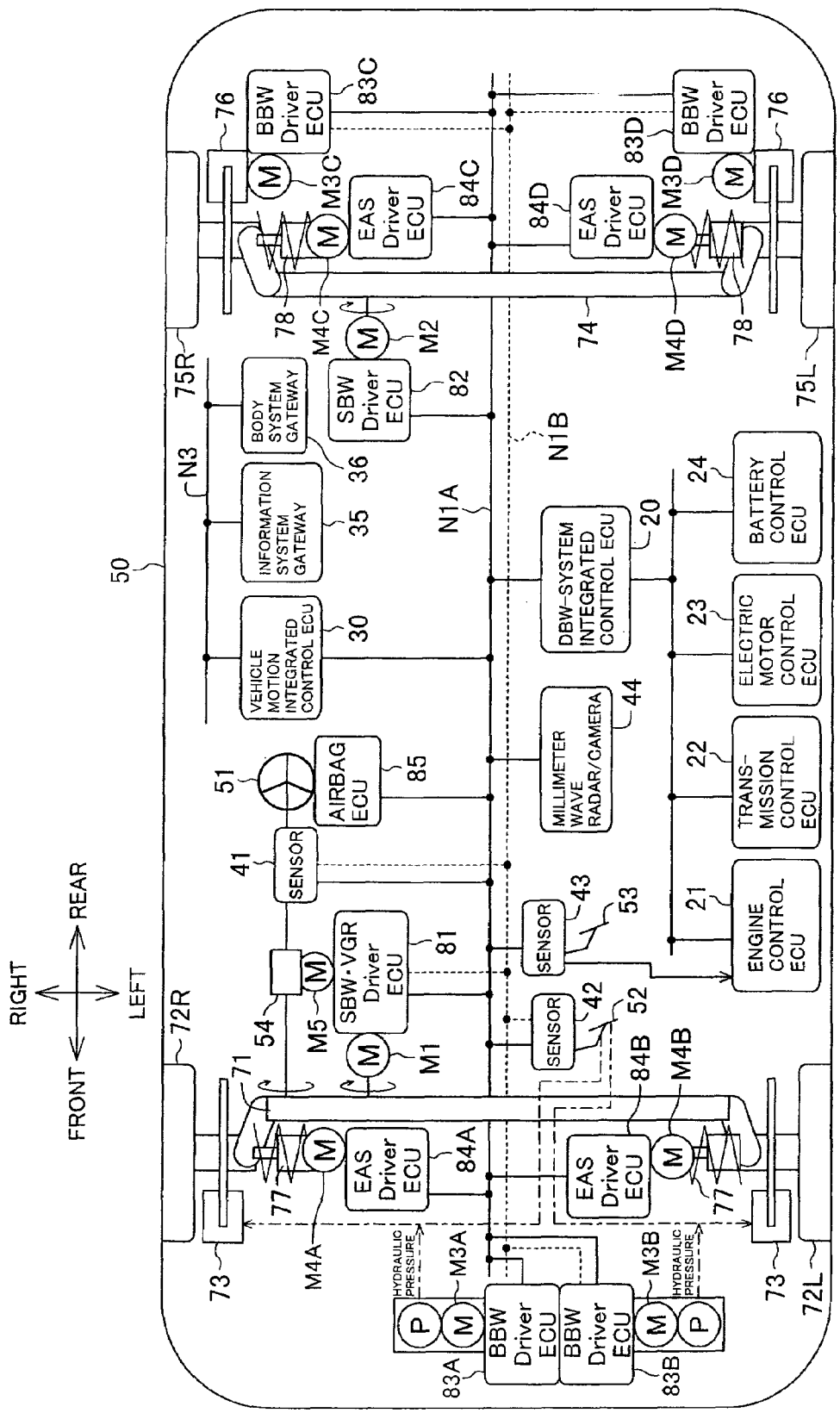
FIG. 3 is a schematic view of a vehicle to which the vehicle control system according to the first embodiment is applied.

One example of the vehicle (automobile) to which the vehicle control system according to the present invention is applied will be described below with reference to FIG. 3.

A control system network N1A corresponds to a communication line in the present invention and is used for communicating data in relation to the vehicle motion control. A control system backup network N1B also corresponds to a communication line in the present invention and serves as a backup means used when the control system network N1A is inevitably failed due to, e.g., wire disconnection in the event of a collision accident.

A steering sensor 41 corresponds to the steering angle instruction unit 31. The steering sensor 41 measures the operation amount (steering angle) by which a steering wheel 51 is operated by the driver, and outputs the steering wheel operation amount, as an electric signal, to the control system network N1A and the control system backup network N1B after signal processing such as filtering.

In addition, the steering wheel 51 is connected to a front wheel steering mechanism 71 through a mechanical mechanism so that respective steering angles of front wheels 72R, 72L of a vehicle 50 can be controlled even when a trouble has occurred in the control system network N1A, the steering sensor 41, and an SBW/VGR (Steer-By-Wire/Variable Gear Ratio) driver ECU (Electronic Control Unit) 81 by an inevitable accident.

A brake pedal position sensor 42 corresponds to the deceleration instruction unit 32. The brake pedal position sensor 42 measures the operation amount by which a brake pedal 52 is operated by the driver, and outputs the brake pedal operation amount, as an electric signal, to the control system network N1A and the control system backup network N1B after signal processing such as filtering.

In addition, the brake pedal 52 is connected to front wheel brake mechanisms 73 through a hydraulic system so that the braking force applied to the vehicle 50 can be controlled even when a trouble has occurred in the control system network N1A, the brake pedal position sensor 52, BBW (Brake-By-Wire) driver ECU's 83A, 83B, etc. by an inevitable accident.

An accelerator pedal position sensor 43 corresponds to the acceleration instruction unit 33. The accelerator pedal position sensor 43 measures the operation amount by which an accelerator pedal 53 is operated by the driver, and outputs the accelerator pedal operation amount, as an electric signal, to the control system network N1A after signal processing such as filtering.

In addition, the accelerator pedal position sensor 43 is connected to an engine control ECU 21 via another communication line so that the engine of the vehicle 50 can be controlled even when a trouble has occurred in the control system network N1A and a DBW (Drive-By-Wire)-system integrated control ECU 20 by an inevitable accident.

A millimeter wave (EHF) radar/camera 44 is used to recognize external conditions of the vehicle 50, for example, by detecting running states of other vehicles in front and rear of the vehicle 50 and recognizing a white line as a boundary of the lane along which that the vehicle 50 is running. The millimeter wave radar/camera 44 recognize the external conditions, computes a relative angle, a relative distance, a relative speed, etc. of the other vehicle running ahead, for example, through signal processing, and outputs the computed data as electric signals to the control system network N1A.

The steering sensor 41, the brake pedal position sensor 42, the accelerator pedal position sensor 43, and the millimeter wave radar/camera 44 are correspond to the sensor slave computer.

A vehicle motion integrated control ECU 30 serves as the master computer and corresponds to the vehicle motion integrated control unit 10. The vehicle motion integrated control ECU 30 receives not only the operation amounts applied from the driver and the running state of the vehicle, which are outputted to the control system network N1A, but also values of measured by the sensors associated with the vehicle motion integrated control ECU 30, and manages the motion of the vehicle 50 in an integrated manner. Then, it outputs the control target values for the driving force control unit, the braking force control unit, the steering amount control unit, a suspension control unit, a safety device control unit, etc. to the control system network N1A.

The vehicle motion integrated control ECU 30 has the gateway function between a supervisory network N3 and the control system network N1A.

Examples of the actuator slave computer include the SBW/VGR driver ECU 81, an SBW driver ECU 82, BBW driver ECU's 83A-83D, EAS (Electric Active Suspension) driver ECU's 84A-84D, and an airbag ECU 85.

The SBW/VGR driver ECU 81 corresponds to the steering angle control unit. It controls an electric motor M1 to thereby control the respective steering angles of front wheels 72R, 72L through a front wheel steering mechanism 71, and also controls an electric motor M5 to thereby control a known steering-system variable gear ratio (VGR) mechanism 54.

The SBW driver ECU 82 also corresponds to the steering angle control unit and controls an electric motor M2 to thereby control respective steering angles of rear wheels 75R, 75L through a rear wheel steering mechanism 74.

The BBW driver ECU's 83A, 83B, 83C and 83D correspond to the braking force control unit.

The BBW driver ECU 83A controls an electric motor M3A to control the hydraulic pressure of a pump P, thereby controlling the braking force applied to the front right wheel 72R through the front wheel brake mechanism 73.

The BBW driver ECU 83B controls an electric motor M3B to control the hydraulic pressure of a pump P, thereby controlling the braking force applied to the front left wheel 72L through the front wheel brake mechanism 73.

The BBW driver ECU 83C controls an electric motor M3C to control the hydraulic pressure of a pump P, thereby controlling the braking force applied to the rear right wheel 75R through a rear wheel brake mechanism 76.

The BBW driver ECU 83D controls an electric motor M3D to control the hydraulic pressure of a pump P, thereby controlling the braking force applied to the rear left wheel 75L through the rear wheel brake mechanism 76.

The EAS driver ECU's 84A, 84B, 84C and 84D correspond to the suspension control unit and control suspension mechanisms 77, 78 installed in the vehicle 50.

The EAS driver ECU 84A controls an electric motor M4A to thereby control the suspension length, the spring constant, the attenuation constant, etc. of the front wheel suspension mechanism 77 associated with the front right wheel 72R.

The EAS driver ECU 84B controls an electric motor M4B to thereby control the suspension length, the spring constant, the attenuation constant, etc. of the front wheel suspension mechanism 77 associated with the front left wheel 72L.

The EAS driver ECU 84C controls an electric motor M4C to thereby control the suspension length, the spring constant, the attenuation constant, etc. of the rear wheel suspension mechanism 78 associated with the rear right wheel 75R.

The EAS driver ECU 84D controls an electric motor M4D to thereby control the suspension length, the spring constant, the attenuation constant, etc. of the rear wheel suspension mechanism 78 associated with the rear left wheel 75L.

Thus, by controlling the EAS driver ECU's 84A-84D with the vehicle motion integrated control ECU 30, it is possible, for example, to increase the spring constants of the front wheel suspension mechanisms 77 during the deceleration, thereby preventing the vehicle 50 from inclining forward, to increase the spring constants of the suspension mechanisms on the outer side when the vehicle turns, thereby preventing the vehicle from rolling over, and to reduce the front wheel suspension lengths and increase the rear wheel suspension lengths when the vehicle climbs a slope, thereby lessening an inclination of the vehicle.

The airbag ECU 85 corresponds to the safety device control unit and controls passenger protective devices such as airbags.

The DBW-system integrated control ECU 20 corresponds to the driving force control unit. The DBW-system integrated control ECU 20 controls devices used for the driving control of the vehicle 50 in an integrated manner, such as an engine control ECU 21, a transmission control ECU 22, an electric motor control ECU 23, and a battery control ECU 24 which are connected to a DBW sub-network N2.

With that configuration, the vehicle motion integrated control ECU 30 is just required to instruct a final driving force to the DBW-system integrated control ECU 20. It is hence possible to instruct target values regardless of the configurations of devices related to the actual driving control, and to realize a simplified control system.

The engine control ECU 21 is an ECU for controlling the engine (not shown). It receives target values of an engine shaft torque, an engine revolution speed, etc. from the DBW-system integrated control ECU 20, and controls the engine so that the target values are realized.

The transmission control ECU 22 is an ECU for controlling the transmission (not shown). It receives target values of shift stages, etc. from the DBW-system integrated control ECU 20, and controls the transmission so that the target values are realized.

The electric motor control ECU 23 is an ECU for controlling a not-shown electric motor for generating the driving force. It receives target values of an output torque, a rotational speed, etc. from the DBW-system integrated control ECU 20, and controls the engine so that the target values are realized. The electric motor control ECU 23 also operates as a driving force generator in the negative direction through regenerative control of the electric motor.

The battery control ECU 24 is an ECU for controlling a battery (not shown) and control a charged state, etc. of the battery.

An information system gateway 35 serves as a gateway for connecting an information system network (such as MOST known in the art), which is used for connection to, e.g., a radio communication means (such as a cellular phone), a GPS and a car navigation unit (not shown), and the supervisory network N3 to each other.

With the information system network and the control system network N1A interconnected via the gateway function, the control system network N1A can logically be separated from the information system network, thus making it possible to comparatively simply make up a configuration that can easily satisfy demands specific to the control system network N1A, such as real-time processing.

A body system gateway 36 serves as a gateway for connecting a body system network including door locks, power windows, etc. (not shown) and the supervisory network N3 to each other. With the body system network and the control system network N1A interconnected via the gateway function, the control system network N1A can logically be separated from the body system network, thus making it possible to comparatively simply make up a configuration that can easily satisfy demands specific to the control system network N1A, such as real-time processing.

Processing executed by the vehicle motion integrated control ECU 30 will be described below with reference to FIG. 4.

Figure 4:
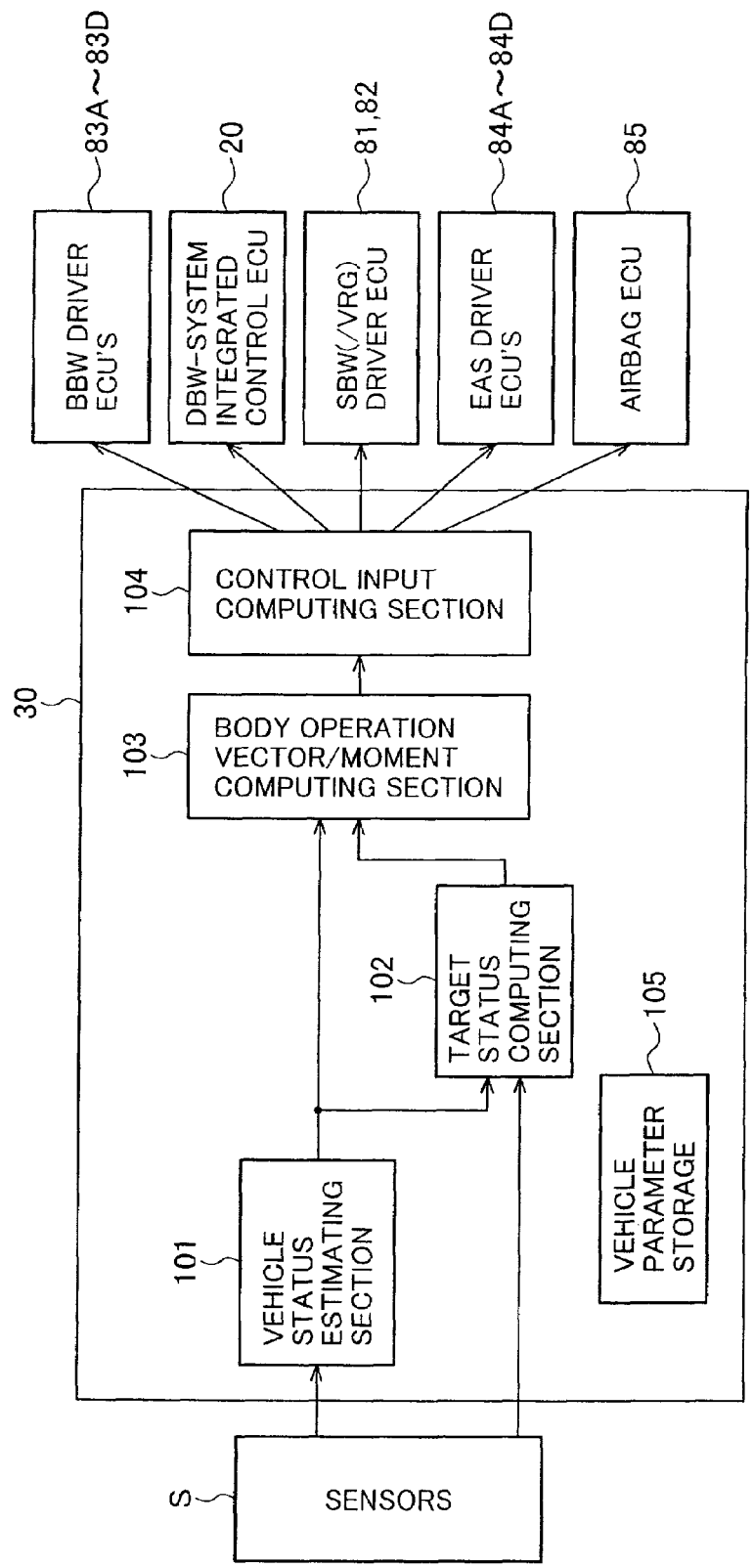
FIG. 4 is a control block diagram of a vehicle motion integrated control ECU in the vehicle control system according to the first embodiment.

FIG. 4 shows a data flow when the vehicle motion integrated control ECU 30 operates normally.

The vehicle motion integrated control ECU 30 comprises a vehicle status estimating section 101, a target status computing section 102, a body operation vector/moment computing section 103, an operation amount computing section 104, and a vehicle parameter memory 105. Then, the ECU 30 receives signals from various sensors S, i.e., the steering sensor 41, the brake pedal position sensor 42, the accelerator pedal position sensor 43, the millimeter wave radar/camera 44, and other sensors such as a wheel speed sensor, a body acceleration sensor and an angular acceleration sensor (which are not shown in FIG. 3).

The vehicle status estimating section 101 estimates the current vehicle status based on the sensor signals.

The target status computing section 102 computes the target vehicle status to be realized with the control, i.e., the target motion status to be taken by the vehicle, based on the vehicle running state estimated by the vehicle status estimating section 101 and the sensor signals.

The body operation vector/moment computing section 103 computes a force vector parallel to the vehicle running direction and a moment vector in the rotating direction, which are to be generated on a vehicle body with the control, based on the difference between the current vehicle status estimated by the vehicle status estimating section 101 and the target status computed by the target status computing section 102.

The operation amount computing section 104 computes the target operation amounts to be realized with the control actuators, such as the BBW driver ECU's 83A-83D, the DBW-system integrated control ECU 20, the SBW/VRG driver ECU 81, the SBW driver ECU 82, the EAS driver ECU's 84A-84D, and the airbag ECU 85, based on the force vector and the moment vector computed by the body operation vector/moment computing section 103.

The vehicle parameter memory 105 stores vehicle parameters, such as dynamic constants of the vehicle body (e.g., the mass, the rotational inertia, and the center of gravity) and specifications of the control actuators (e.g., the time constant of each actuator, the maximum braking force of the brake, and the maximum steering angle of the steering wheel). These vehicle parameters are referred to when processing is executed in the vehicle status estimating section 101, the target status computing section 102, the body operation vector/moment computing section 103, and the operation amount computing section 104.

While an output from the operation amount computing section 104 to each driver ECU is indicated by a single line in FIG. 4, the single line does not means only one value, and also represents one set of controlled variables. For example, the BBW driver ECU's 83A-83D may receive the respective controlled variables instructing braking forces independent per wheel.

With the vehicle motion integrated control ECU 30 comprising the vehicle status estimating section 101, the target status computing section 102, the body operation vector/moment computing section 103, and the operation amount computing section 104, an advantage capable of managing and controlling the vehicle motion in an integrated manner can be obtained.

Also, with the separation of the vehicle status estimating section 101, the following advantage is obtained. For example, when the control actuator configuration of the vehicle is changed, such as when only a power train is changed from the engine type to the hybrid type in vehicles having the same platform, a section for computing dynamic characteristics of the vehicle can be reused and therefore the development efficiency of the control system can be increased.

Further, with the separation of the target status computing section 102, the following advantage is obtained. Even when the vehicle setting is customized depending on individual drivers or when the limits of target values are modified depending on conditions of the road and other vehicles running around the relevant one, only the target status computing section 102 is required to be modified and therefore the development efficiency of the control system can be increased.

Still further, with the body operation vector/moment computing section 103 and the operation amount computing section 104 being independent of each other, the operation amounts applied to the vehicle body can be computed independently of the configuration of the control systems incorporated in the vehicle.

For example, when an automobile type is changed from the hybrid type to the in-wheel electric motor type, the body operation vector/moment computing section 103 is able to compute the force and moment vectors to be generated in a similar manner, and only the operation amount computing section 104 requires to be modified. Therefore, the development efficiency of the control system can be increased.

Figure 5:
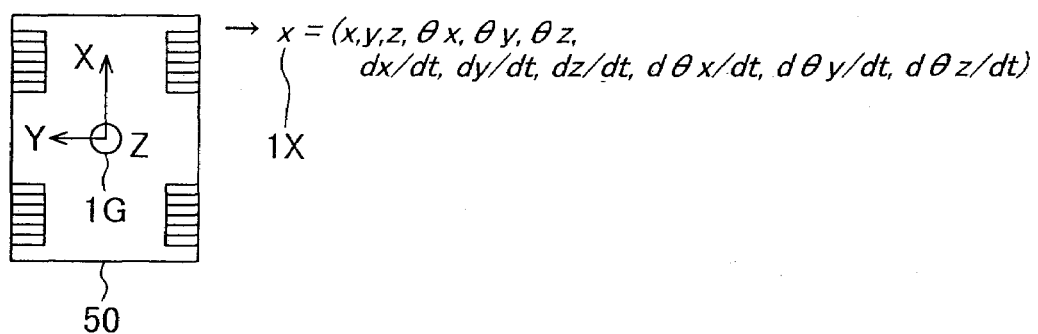
FIG. 5 is an illustration for explaining vehicle motion status variables.

The current vehicle status computed by the vehicle status estimating section 101 and the target vehicle status computed by the target status computing section 102 will be described below with reference to FIG. 5.

The current status and target status of the vehicle are each represented by a status variable 1X in motion of a rigid body on an assumption that the body of the vehicle 50 is a rigid body. The status variable 1X means displacements (x, y, z), rotational angles ($\theta x$, $\theta y$, $\theta z$), speeds (dx/dt, dy/dt, dz/dt), and angular speeds (d$\theta$x/dt, d$\theta$y/dt, d$\theta$z/dt) on a three-dimensional (X-Y-Z) local coordinate system 1G fixed to, for example, the center of gravity of the body of the vehicle 50.

Because the components of the status variable 1X are linked with one another in rigid body mechanics, determination of the status variable 1X is effective in performing more precise control and realizing control with more comfortableness to passengers and high safety.

Figure 6:
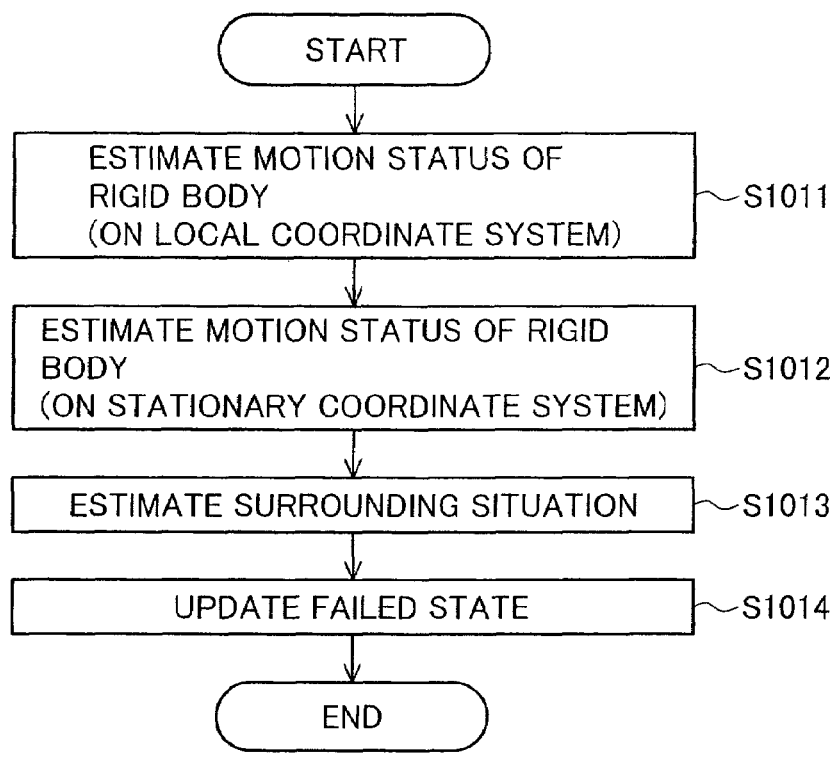
FIG. 6 is a flowchart showing a vehicle status estimation flow executed by a vehicle status estimating section of the vehicle motion integrated control ECU.

A vehicle status estimation flow executed by the vehicle status estimating section 101 will be described below with reference to FIG. 6.

First, in step S1011, the vehicle status estimating section 101 estimates the vehicle motion status on the local coordinate system 1G fixed to the vehicle.

Then, in step S1012, it estimates the vehicle motion status on a stationary coordinate system fixed to a particular point, e.g., Nihonbashi (one geographical point in Tokyo).

Then, in step S1013, it estimates the situation around a point where the vehicle is running.

Then, in step S1014, it estimates and updates a failed state of the vehicle based on the measured values from the sensors S and the failure self-diagnosis results from the control actuators, such as the BBW driver ECU's 83A-83D, the DBW-system integrated control ECU 20, the SBW/VRG driver ECU 81, the SBW driver ECU 82, the EAS driver ECU's 84A-84D, and the airbag ECU 85.

Figure 7:
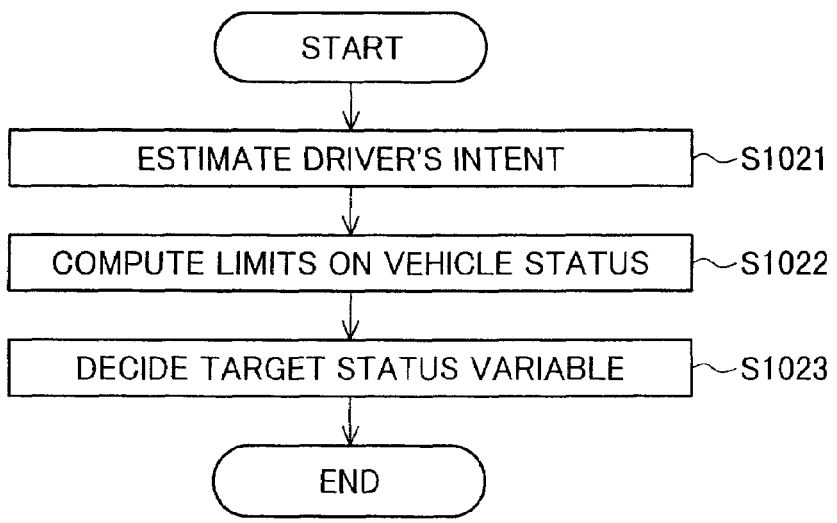
FIG. 7 is a flowchart showing a target status computation flow executed by a target status computing section of the vehicle motion integrated control ECU.

A target status computation flow executed by the target status computing section 102 will be described with reference to FIG. 7.

First, in step S1021, the target status estimating section 102 estimates the vehicle status intended by the driver based on the operation amounts detected by the steering sensor 41, the brake pedal position sensor 42, and the accelerator pedal position sensor 43, as well as the current vehicle status.

Then, in step S1022, it computes limits on the vehicle status based on the surrounding situation of the vehicle, the performance of the vehicle control system, failed states of individual devices, legal regulations, etc. For example, when brake devices are partly failed, a maximum speed is limited within the range in which the vehicle can safely be braked by using the remaining normal brake devices.

Then, in step S1023, it decides the target status variable of the vehicle 50 in conformity with the driver's intent within the range not exceeding the limits set on the vehicle status.

Figure 8:
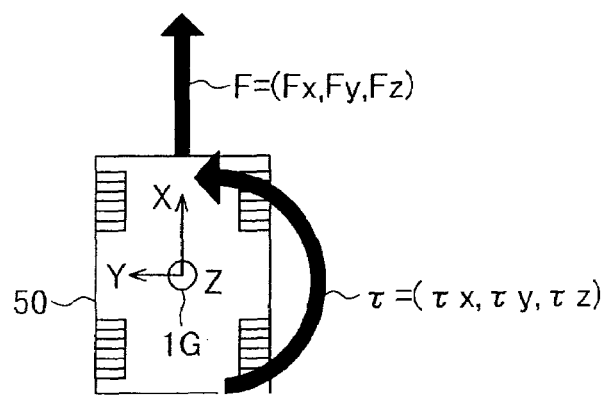
FIG. 8 is an illustration for explaining a body operation vector and moment.

FIG. 8 shows the operation force and moment vectors computed by the body operation vector/moment computing section 103.

As shown in FIG. 8, an operation force vector F(Fx, Fy, Fz) and an operation moment vector $\tau(\tau X, \tau y, \tau z)$ are computed on the local coordinate system 1G fixed to the vehicle. This is advantageous in facilitating conversion to the operation amounts for the control devices fixed to the vehicle.

Figure 9:
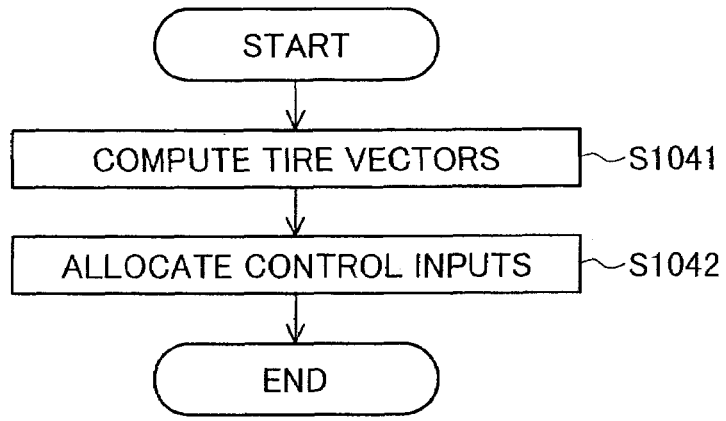
FIG. 9 is a flowchart showing an operation amount computation flow executed by an operation amount computing section of the vehicle motion integrated control ECU.

An operation amount computation flow executed by the operation amount computing section 104 will be described with reference to FIG. 9.

The operation amount computing section 104 receives the body operation force vector F and moment vector $\tau$ both computed by the body operation vector/moment computing section 103 and computes what controlled variables are to be set as the target values for the actual control devices.

First, in step S1041, the operation amount computing section 104 distributes the body operation force vector F and moment vector $\tau$ into tire forces to be generated for each of tires attached to the vehicle 50. Then, it computes the target values of the controlled variable for the actual control devices based on the allocated tire vectors.

By using the braking force, the driving force, and the turning force (lateral force generated on the tire with steering) as the target values in the vehicle control, the motion of the entire vehicle can be controlled in an integrated manner.

Figure 10:
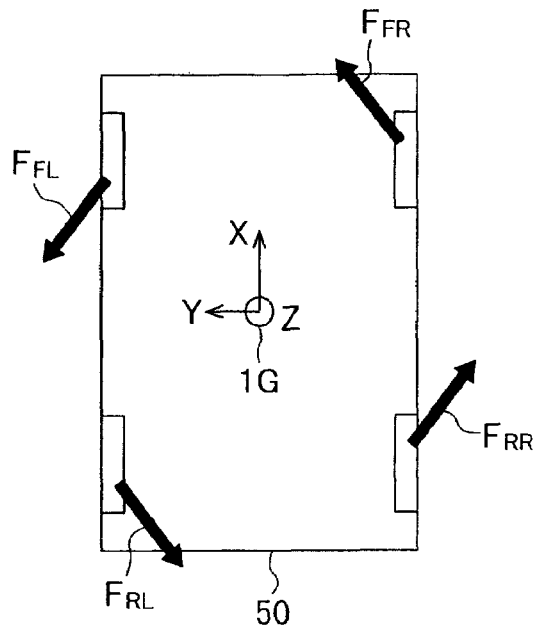
FIG. 10 is an illustration for explaining tire vectors in body operation.

FIG. 10 shows the tire vectors computed in step S1041.

$F_{FR}$ represents the tire vector to be generated on the front right wheel with the control. $F_{FL}$ represents the tire vector to be generated on the front left wheel with the control. FRR represents the tire vector to be generated on the rear right wheel with the control. $F_{RL}$ represents the tire vector to be generated on the rear left wheel with the control. The tire vectors are defined as components on the local coordinate system 1G fixed to the vehicle 50.

Defining the tire vectors as components on the local coordinate system is advantageous in facilitating conversion to the operation amounts for tire driving axles and the steering mechanisms, which are fixed to the vehicle 50.

In step S1042, the operation amount computing section 104 executes an operation amount allocation process. The operation amount allocation process is executed corresponding to the arrangement of the actuators for actually controlling the vehicle.

Figure 11A:
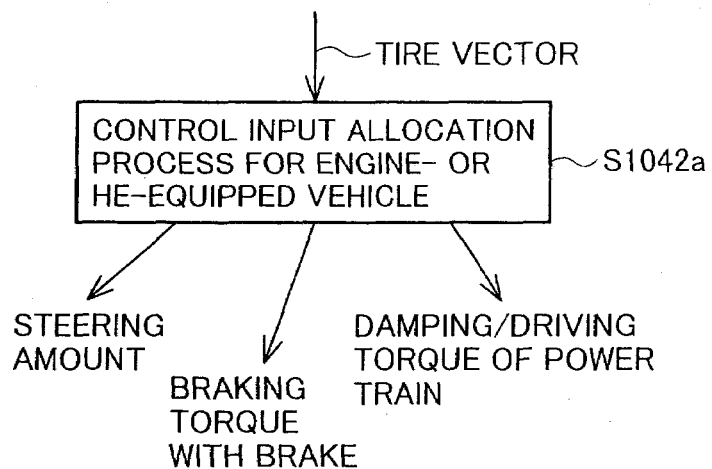
FIGS. 11A and 11B are each a representation for explaining an operation amount allocation process.
Figure 11B:
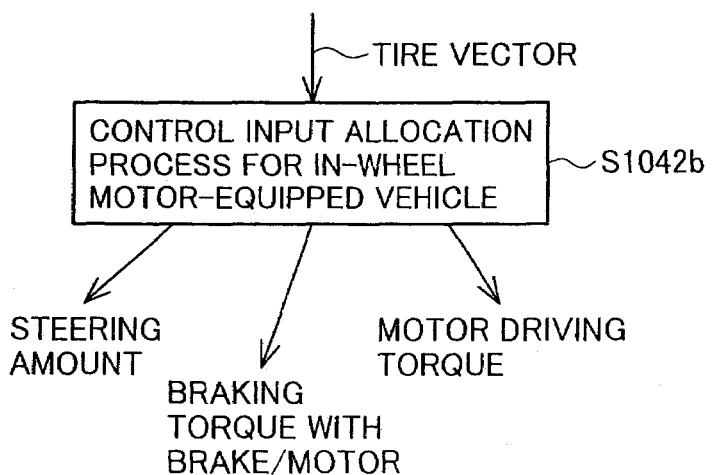

FIGS. 11A and 11B show details of the operation amount allocation process.

FIG. 11A shows the operation amount allocation process (step S1042*a*) when the vehicle 50 has a power train for driving an internal combustion engine or a hybrid engine (HE). This operation amount allocation process outputs, based on the tire vectors as inputs, steering amounts as the target values for the SBW/VRG driver ECU 81 and the SBW driver ECU 82, braking torques as the target values for the BBW driver ECU's 83A-83D, and power train damping/driving torques as the target values for the DBW-system integrated control ECU 20.

FIG. 11B shows the operation amount allocation process (step S1042*b*) when the vehicle 50 has a power train of the known in-wheel electric motor type. This operation amount allocation process outputs steering amounts as the target values for the SBW/VRG driver ECU 81 and the SBW driver ECU 82, braking torques as the target values for regenerative control of in-wheel electric motors and brake pad control ECU's (not shown), and electric motor driving torques as the target values for in-wheel electric motor control ECU's (not shown) are outputted based on the tire vectors as inputs.

By executing the operation amount allocation process corresponding to the arrangement of the actuators for actually controlling the vehicle, modifications of the actuator arrangement are adaptable with replacement of a unit for executing the operation amount allocation process, and therefore the development efficiency of the vehicle control system can be increased.

The configuration of the DBW-system integrated control ECU 20 will be described with reference to FIG. 12.

A front-right wheel driving torque receiving section 201 receives the driving torque to be generated on the front right wheel 72R. A front-left wheel driving torque receiving section 202 receives the driving torque to be generated on the front left wheel 72L. A rear-right wheel driving torque receiving section 203 receives the driving torque to be generated on the rear right wheel 75R. A rear-left wheel driving torque receiving section 204 receives the driving torque to be generated on the rear left wheel 75L.

A power train operation amount computing section 205 computes values used as the target values in respective ECU's for controlling the actual actuators, and instruct the operation amounts for the engine control ECU 21, the transmission control ECU 22, the electric motor control ECU 23, and the battery control ECU 24.

In a known torque-based vehicle control system, a torque to be generated on a drive axle of a driving means is used as a target value for executing control. Therefore, the known control system is not compatible with the DBW-system integrated control ECU 20 for the in-wheel electric motor type in which the driving force can be controlled for each wheel.

In view of the above, a driving system with a driving means for generating a driving force in a concentrated manner, such as an engine- or hybrid engine-equipped system, is also designed so as to receive, as the control target value, the driving force for each wheel and to redistribute respective target values to the driving actuators in the DBW-system integrated control ECU 20. As a result, a command value receiving scheme (interface) can be shared by both the DBW-system integrated control ECU for the hybrid system and the DBW-system integrated control ECU for the in-wheel electric motor system.

Second Embodiment

Figure 13:
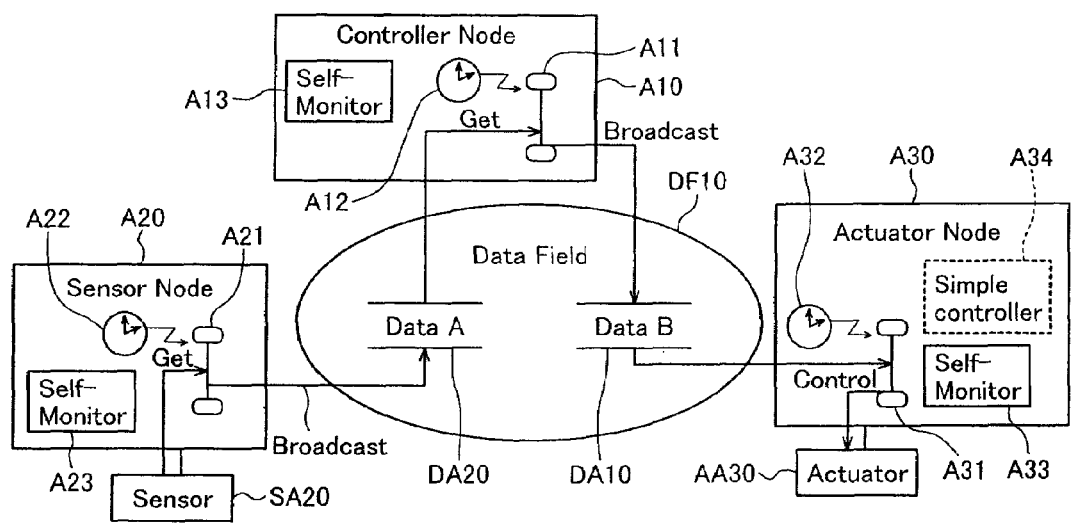
FIG. 13 is a block diagram of an autonomous decentralized control platform (second embodiment) oriented for an integrated vehicle control system in a next-generation vehicle to which the vehicle control system according to the present invention is applied.

An autonomous decentralized control platform oriented for an integrated vehicle control system in a next-generation vehicle, to which the vehicle control system according to the present invention is applied, will be described below with reference to FIG. 13.

The purpose of the autonomous decentralized control platform is to realize high reliability, real-time processing, and expandability in vehicle control at a low cost.

The term "autonomous decentralized" means one of highly reliable decentralized system models used in the control field. In other words, it represents a system in which computing nuclei called nodes corresponding to cells in an organism are loosely coupled with one another via a field, called a data field, where common data is placed.

For details of "autonomous decentralized", reference should be made on Kinji Mori, Tsugu Miyamoto, and Koichi Ihara; "Proposal of Autonomous Decentralized Concept", Journal C of the Institute of Electrical Engineers of Japan, Vol. 104, No. 12, pp. 303-310 (1984), and K. Mori: "Autonomous Decentralized Systems; Concept, Data Field Architecture and Future Trends", IEEE International Symposium on Autonomous Decentralized Systems (ISADS), pp. 28-34 (1993-March).

In an autonomous decentralized control system, by using a program enabling each node to autonomously operate independently of other nodes, it is possible to realize a configuration in which a failure in a part of the system does not affect the entire system, and to realize a decentralized system with high reliability and expandability. However, a difficulty is faced in application of the autonomous decentralized concept to an actual system based on the biological model, and a generalized application method has not yet been established up to now. Accordingly, studies must be made on architecture for each application system.

The autonomous decentralized control platform comprises a data field DF10 providing one feature, i.e., 1) common use of data, and nodes (including a sensor node A20, an actuator node A30, and a controller node A10) capable of providing other three features, i.e., 2) autonomous operation, 3) autonomous management, and 4) autonomous backup. The nodes A10, A20 and A30 contain self-monitors (self-monitoring functions) A13, A23 and A33, respectively.

The controller node A10 starts up a processing routine A11 under a time condition A12 (at a period of, e.g., 10 ms). The controller node A10 gets sensor data DA20 from the data field DF10, computes a control target value for the actuator node A30, and broadcasts the computed control target value, as controller data DA10, to the data field DF10.

The data field DF10 is a common memory space virtually formed on the control network. In the normal state, the data field DF10 holds therein the sensor data DA20 outputted from the sensor node A20 and the controller data (control target values) DA10 outputted from the controller node A10.

The term "autonomous operation" in each node means the function of voluntarily executing processing in accordance with the time condition or its own status without receiving any processing request from the other nodes.

The term "autonomous management" in each node means the function of monitoring its own operation and status by itself, which are concealed from the other nodes.

The term "autonomous backup" in each node means the function of incorporating a capability of simplified control and computing necessary data by itself with the simplified control when there is an abnormality in data required for processing to be executed in it, thereby realizing the least necessary processing.

The following description is made to show that the data field DF10 can realize an improvement of expandability adapted for the vehicle control system, the autonomous operation can realize time-dependently activated operation adapted for the real-time decentralized control, and the autonomous management function and the autonomous backup function can realize status monitoring and trouble resistance of the system to ensure reliability.

Of the autonomous decentralized control platform, the data field will be described below with reference to FIGS. 14A and 14B.

The data field is intended to improve expandability of the vehicle control system. The purpose of introducing the data field is to standardize interfaces among the nodes and to facilitate replacement and addition of parts.

In the autonomous decentralized control platform, data exchange between the nodes is performed via a data field DF20 that is a virtual common memory defined on the network. Stated another way, each node recognizes data itself as an object without being conscious of what units are connected to the network.

Therefore, data defined in the data field DF20 is highly abstractive data that can be standardized at a sensor/actuator level. In sensor measurement, for example, a physical value obtained by multiple measurements and subjected to filtering and floating-point arithmetic is defined in the data field instead of primitive data such as a voltage value. Also, in actuator control, standardized data, e.g., a target braking force applied from a brake, is defined in the data field.

Looking at an example shown in FIG. 14A, a brake pedal sensor node A200 measures the step-down amount of a brake pedal SA200 and broadcasts the measured result, as a brake pedal status variable (brake step-down amount) DA200, to the data field DF20 after conversion to a standardized physical quantity.

By referring to the brake pedal status variable DA200, a controller node A100 computes target braking forces (only a front-right wheel target braking force DA100 and a front-left wheel target braking force DA101 being shown) for respective wheels, and then broadcasts the computed target braking forces to the data field DF20.

By referring to the front-right wheel target braking force DA100 and the front-left wheel target braking force DA101, a front wheel brake actuator node A300 controls a front-left wheel brake actuator AA300 and a rear-left wheel brake actuator AA301.

In an example shown in FIG. 14B, the vehicle-to-vehicle distance control function is added to the control architecture shown in FIG. 14A, and the brake controller is modified correspondingly.

A radar SA210 for measuring the distance between the relevant vehicle and a vehicle running ahead and a radar node A210 for controlling the radar SA210 are added, and a measured vehicle-to-vehicle distance DA210 is broadcast to the data field DF20.

By referring to the brake pedal status variable DA200 and the vehicle-to-vehicle distance DA210, the controller node A100 computes target braking forces (only a front-right wheel target braking force DA100 and a front-left wheel target braking force DA101 being shown) for the respective wheels, and then broadcasts the computed target braking forces to the data field DF20.

By referring to the front-right wheel target braking force DA100, a front-right wheel brake actuator node A310 controls a front-right wheel brake actuator AA310.

By referring to the front-left wheel target braking force DA101, a front-left wheel brake actuator node A320 controls a front-left wheel brake actuator AA320.

Thus, as shown in FIGS. 14A and 14B, the radar node A210 can be added as a vehicle-to-vehicle distance measuring node just by adding the data of the "vehicle-to-vehicle distance" in the data field DF20 without affecting the other sensors and actuators.

Also, although the brake actuator node is modified from the front wheel control type to the each wheel independent type, no effects are imposed on the other nodes and the data field DF20. In other words, by using the data field DF20, the nodes can loosely be coupled with one another and a decentralized system with high expandability can easily be realized.

Figure 15:
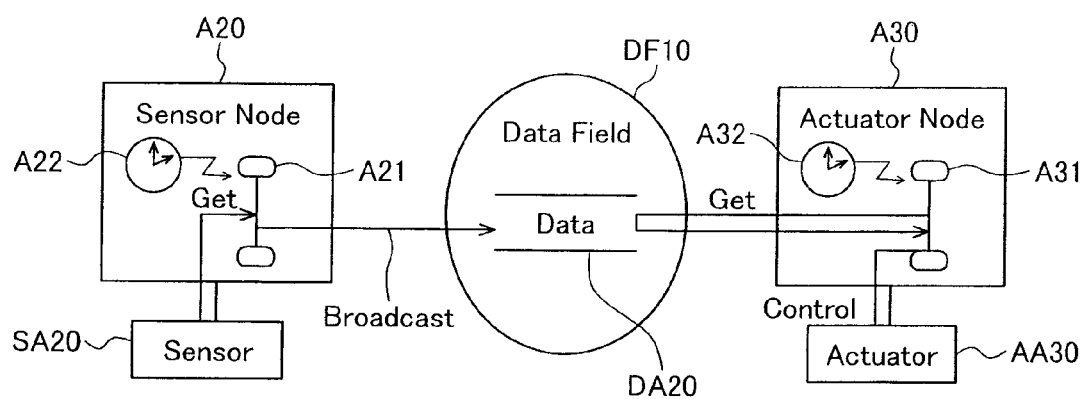
FIG. 15 is a block diagram showing an outline of autonomous operation of the decentralized control platform.

Of the autonomous decentralized control platform, the autonomous operation will be described with reference to FIG. 15 (and FIG. 13).

The intent of the autonomous operation is to realize the operation based on time-dependent activation, which is easy to predict processing in terms of time, for adaptation to the decentralized real-time processing.

With the autonomous operation in the autonomous decentralized control platform, each node voluntarily starts to execute processing in accordance with a time condition or its own status. In other words, each node is able to start up the processing in accordance with node operating conditions including not only reception of a message, but also the time condition (time-of-day or period) and a status change (interrupt) of itself.

In a real-time system, it is essential to recognize the status of a system as a control target and to reflect the recognized result on control within a certain time. For that reason, control design is required to be able to design the processing execution time on the end-to-end basis. On the other hand, each node is required to have the function of continuing its own processing without being affected from an abnormality in any other node. To realize such a decentralized real-time system with high reliability, the node operation must be made autonomous.

The sensor node A20 starts up a processing routine A21 under a time condition A22 (at a period of, e.g., 10 ms).

The sensor node A20 reads a measured value of the sensor SA20, converts the measured value to a physical quantity through pre-processing such as filtering and floating-point arithmetic, and broadcasts a resulting sensor data DA20 to the data field DF10.

Also, the actuator node A30 starts up a processing routine A31 under a specific time condition A32 (at a period of 20 ms).

The actuator node A30 acquires the sensor data DA20 from the data field DF10, computes a control target value for itself A30, and controls an actuator AA30 so that the computed control target value is realized.

The time conditions A22, A32, i.e., startup conditions, may be each given as a change of its own node status, e.g., an interrupt depending on the engine revolution. Thus, the autonomous operation of each node can be realized by enabling the node to voluntarily start up the processing, to acquire necessary data by itself and to execute computation in itself.

With the autonomous operation, the node operation is of the type activated depending on time or the type activated upon a change of its own node status. In other words, event-based activation from any other node is no longer required, and design of the worst execution time can very easily be made. Further, since the processing can be continued without being affected by an abnormality in any other node, a highly reliable system can be realized.

Of the autonomous decentralized control platform, the autonomous management will be described below. The intent of the autonomous management is to ensure high reliability required in the vehicle control. More specifically, the autonomous management enables each of nodes constituting a decentralized system to monitor its own operation and to execute processing (fail-operative/fail-silent) in the event of an abnormality per node. Also, to realize both of high reliability and low cost, the fail-operative function (operation capability in the event of a failure) and the fail-silent function (runaway protection in the event of a failure) are selectively performed as the processing in the event of a failure depending on a target node.

In the known configuration, an ECU per subsystem executes the sensor measurement, computation of vehicle controlled variables, and actuator control. When trying to realize a highly reliable system, therefore, many ECU's are required to have the fail-operative function, thus resulting in an increase of the cost. Another problem is that, when the mutual monitoring function among ECU's is provided, the coupling among the ECU's becomes too close, thus resulting in a deterioration of the expandability and the development efficiency.

Figure 16:
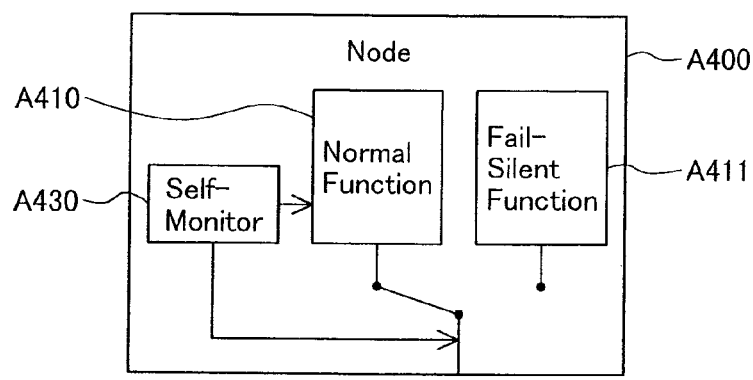
FIG. 16 is a block diagram showing an outline of autonomous monitoring.

FIG. 16 shows an outline of the autonomous monitoring.

In the configuration of FIG. 16, a self-monitor A430 is provided in a node A400 to monitor the operation in the normal state (normal function) A410. Then, if there occurs an abnormality, a function stopping process (fail-silent function) A411 is executed.

Those nodes which are difficult to back up, such as nodes for the brake pedal and the steering wheel, are given with the fail-operative function to be able to continue the operation. Further, when the self-monitoring function is itself failed, the node function is stopped to prevent runaway of the node.

With the autonomous monitoring described above, a highly reliable system can be constructed as an assembly of fail-silent nodes that are comparatively low in cost. In addition, the fail-operative function at a system level can be realized with a combination with the autonomous backup described below.

Of the autonomous decentralized control platform, the autonomous backup will be described. The intent of the autonomous backup is to ensure high reliability required in the vehicle control. More specifically, the autonomous backup provides a simplified control function to compensate for a failure occurred in the nodes constituting the decentralized vehicle control system.

Thus, the term "autonomous backup" means the function of realizing the least necessary control with data sharing among slave nodes when a node having the master function is failed in a logical configuration in which control nodes operate in master-slave relation in a normal state.

Figure 17:
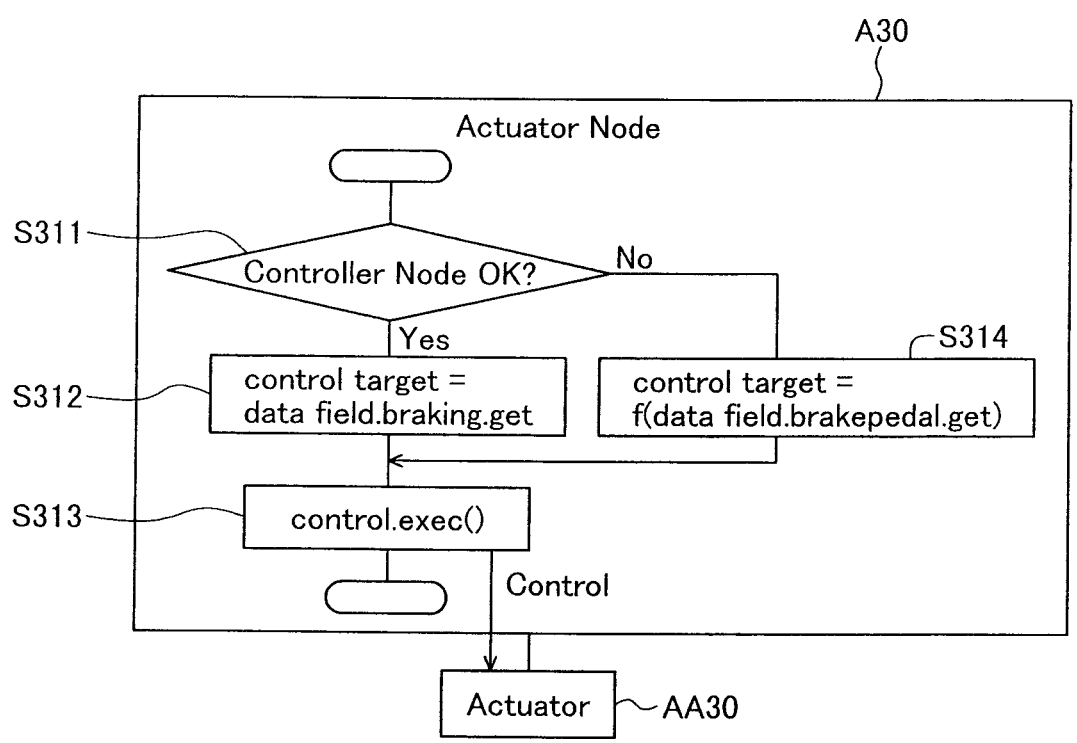
FIG. 17 is a flowchart showing an operation flow in an actuator node.

FIG. 17 shows an operation flow in an actuator node.

Normally, the controller node A10 computes the control target value using the measured value from the sensor node A20, and the actuator node A30 controls the actuator AA30 in accordance with the computed control target value (i.e., in a sequence of Yes in step S311→step S312→step S313).

On the other hand, the actuator node A30 incorporates a simplified version of the control function of the master node (controller node A10), i.e., a simple controller, A34 (see FIG. 13) and computes a simple control target value based on the measured sensor value while referring to the control target value and the measured sensor value at the same time. If an abnormality occurs in the master node, the function is stopped with the above-described self-monitoring function, and the actuator node A30 determines, in step S311, the occurrence of a failure in the master node by confirming, e.g., an event that the data in the data field DF10 is not updated. If the actuator node A30 determines the failure of the master node, processing is executed in a sequence of No in step S311→step S314→step S313. As a result, the actuator node A30 backs up the processing, which is required to realize its own function, by itself with the simplified control function A34.

With that autonomous backup function and the autonomous monitoring function described before, a highly reliable fail-operative system can be realized as an assembly of fail-silent nodes that are comparatively low in cost.

An example of operation of the autonomous decentralized control architecture will be described below in connection with, e.g., the brake control function. The following description is particularly intended to show that a fail-operative system can be constructed in a combination of failsafe nodes according to this embodiment.

Figure 18A:
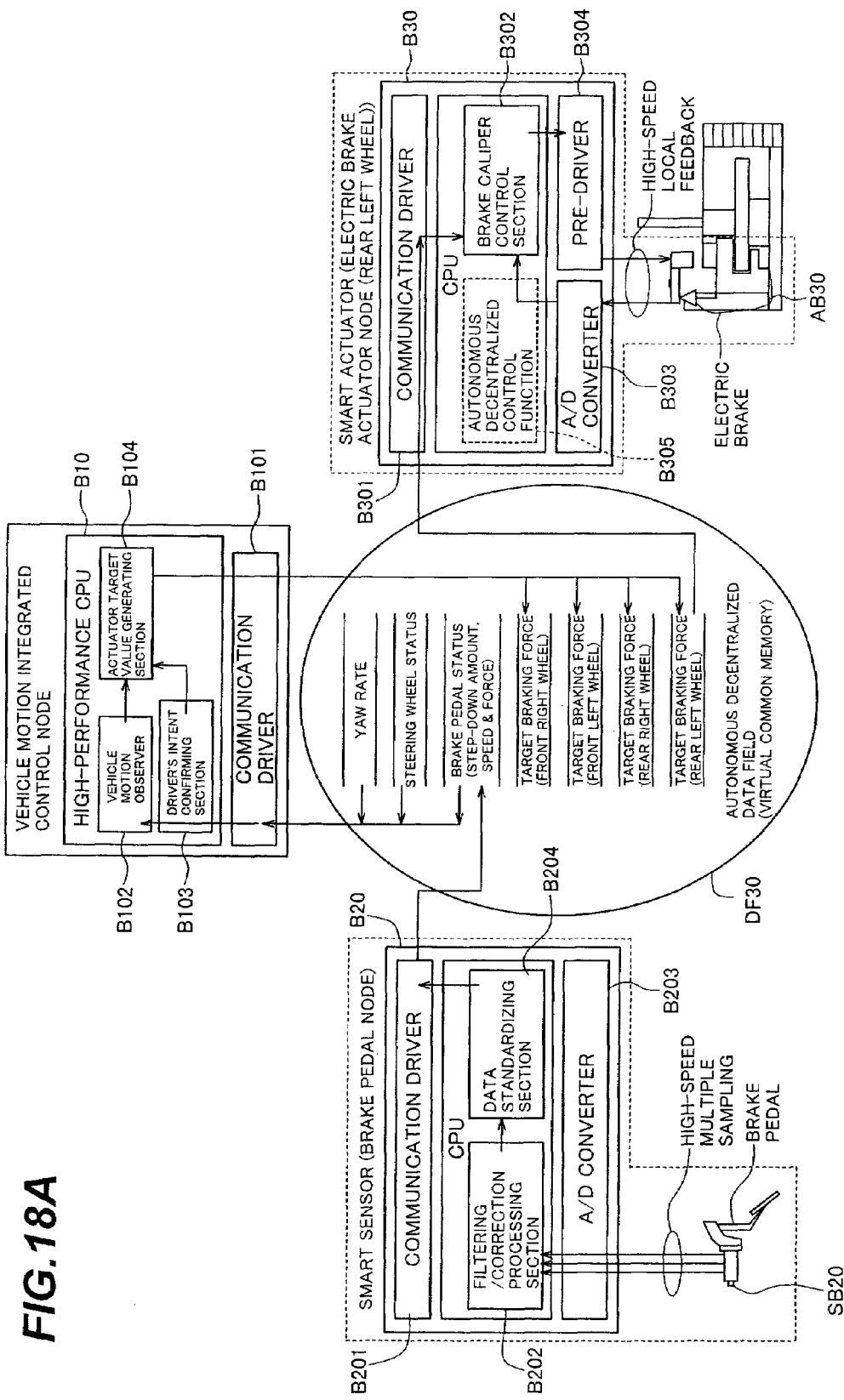

FIGS. 18A and 18B show a configuration example of the XBW vehicle control system. In the example of FIGS. 18A and 18B, an attention is focused on a vehicle motion integrated control ECU, a brake pedal position sensor, a brake actuator (BBW driver ECU), and a data field. The data field is provided on a vehicle control network that is installed according to, e.g., "FlexRay".

First, the operation of the brake control function in the autonomous decentralized control platform in the normal state will be described with reference to FIG. 18A.

The brake control function in the autonomous decentralized control platform is made up of a brake pedal node (smart sensor) B20, a vehicle motion integrated control node (ECU) (high-performance CPU) B10, and a brake actuator node (smart actuator) B30.

The brake pedal node B20 autonomously starts up periodically and measures the status of the brake pedal position sensor SB20 by using an A/D converter B203.

In the brake pedal node B20, the measured value is subjected to filtering and correction processes, etc. in a filtering/correction processing section B202, and then to data standardization in a data standardizing section B204. Thereafter, the brake pedal node B20 broadcasts the data "brake pedal status" to an autonomous decentralized data field DF30 by using a communication driver B201.

The vehicle motion integrated control node B10 starts up periodically. After the startup, the vehicle motion integrated control node B10 refers to the brake pedal status and other data (such as the yaw rate and the steering angle) in the autonomous decentralized data field DF30 by using the communication driver B101, and estimates the vehicle motion status in a vehicle motion observer B102 and the intent of operation applied from the driver in a driver's intent confirming section B103. Based on the estimation results, an actuator target value generating section B104 computes actuator control target values such as the braking force, the drive axle torque, and the steering angle. Then, the vehicle motion integrated control node B10 broadcasts the computed control target values to the autonomous decentralized data field DF30 by using the communication driver B101.

The operation of the brake actuator node B30 is described here, taking the rear left wheel as an example. As with the other nodes, the brake actuator node B30 also starts up periodically. After the startup, the brake actuator node B30 refers to the control target value, i.e., the target braking force, in the autonomous decentralized data field DF30 by using the communication driver B301. Then, a brake actuator AB30 is controlled in accordance with the target braking force. More specifically, the brake actuator node B30 observes the brake status through an A/D converter B303, and computes a value of the brake control variable in a brake caliper control section B302 based on the difference between the braking force actually generated by the brake and the braking force in the target state, followed by controlling the brake actuator AB30 with a pre-driver B304.

The period of the operation referring to the data field and the period of the actuator control operation are not always required to be the same, and the period of the actuator control operation may be set so as to execute the control at a higher speed. This enables the control to be executed in a more appropriate manner adapted for the control time constant of the actuator as a control target.

Next, the operation of the brake control function in the event of a failure of the vehicle motion integrated control node B10 will be described with reference to FIG. 18B.

As in the normal state, the brake pedal node B20 autonomously starts up and executes the processing. The processing of the brake pedal node B20 is not affected by the failure of the vehicle motion integrated control node B10. Upon detecting its own failure with the autonomous management function, the vehicle motion integrated control node B10 executes the fail-silent process. In other words, the node B10 comes into a state where the processing therein is all stopped, looking from the exterior. Accordingly, the actuator control target values in the autonomous decentralized data field DF30 are no longer updated.

The operation of the brake actuator node B30 in this case is described here, taking the rear left wheel as an example. The brake actuator node B30 starts up periodically. After the startup, the brake actuator node B30 refers to the control target value, i.e., the target braking force, in the autonomous decentralized data field DF30. At this time, it detects the failure of the vehicle motion integrated control node B10 based on the fact that data of the target braking force is no longer updated. Detection of the failure causes an autonomous decentralized control function B305 in the brake pedal node B20 to start up. The autonomous decentralized control function B305 refers to the brake pedal status in the autonomous decentralized data field DF30 and computes a simple target value.

Then, the brake caliper control section B302 controls the brake actuator AB30 in accordance with the simple target value computed by the autonomous decentralized control function B305 instead of the control target value computed by the vehicle motion integrated control node B10.

Incidentally, the simple target value provides a value computed using only the brake pedal status, and differs from the value that is computed by the vehicle motion integrated control node B10 and is adapted for controlling the vehicle behavior.

The operation of the brake control function using the autonomous decentralized control platform has been described above. As seen from the above description, even if the controller node for computing the target value is failed, the vehicle control system can continue the operation with the respective functions of the data field, the autonomous operation, the autonomous management, and the autonomous backup, i.e., the features of the autonomous decentralized control platform.

Such an effect is advantageous in realizing a fail-operative vehicle control system in combination with fail-silent nodes, and in constructing a highly reliable system at a lower cost.

Figure 19:
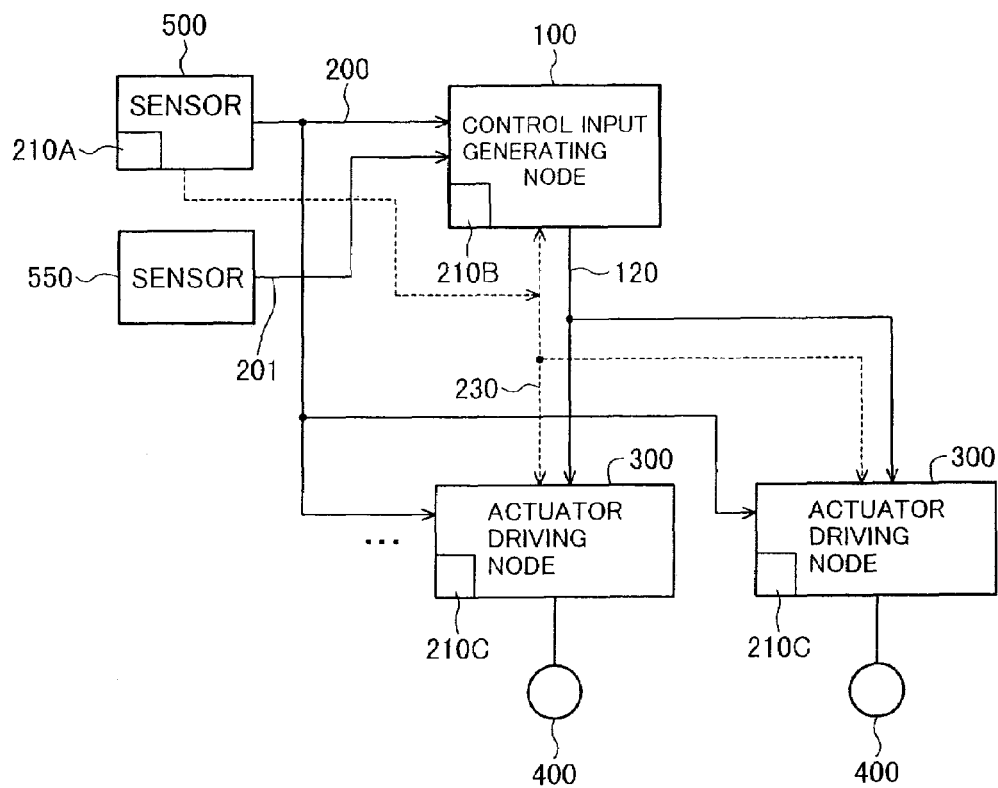
FIG. 19 is a block diagram showing a basic configuration of a vehicle control system according to a second embodiment of the present invention.

A basic configuration of the vehicle control system according to the second embodiment of the present invention will be described below with reference to FIG. 19.

The vehicle control system comprises a sensor 500 for detecting the driver's demand, a sensor 550 for detecting the vehicle status, an actuator 400, an operation amount generating node 100, and an actuator driving node 300.

Among those components, the sensor 500 for detecting the driver's demand, the operation amount generating node 100, and the actuator driving node 300 have failure detecting functions 210A, 210B and 210C, respectively. The failure detecting function 210C of the actuator driving node 300 has not only the self-diagnosis function, but also the function of detecting a failure of the actuator 400.

The operation amount generating node 100 computes an operation amount command value 120 based on a driver's demand signal 200 and a vehicle status signal 201.

The actuator driving node 300 receives the operation amount command value 120 and controls the actuator 400, thereby performing the driving, steering, braking, etc. of the vehicle.

When any of the failure detecting functions 210A, 210B and 210C detects a failure in the corresponding node or the actuator 400, it outputs, to the exterior of the node, a failure detection notification 230 for notifying that the relevant node is in a failed state. All of the nodes with the failure detecting functions are designed so as to stop all outputs to the exterior, i.e., so as to become fail-silent, except for outputting the failure detection notification 230 when they are in the failed state.

Figure 20:
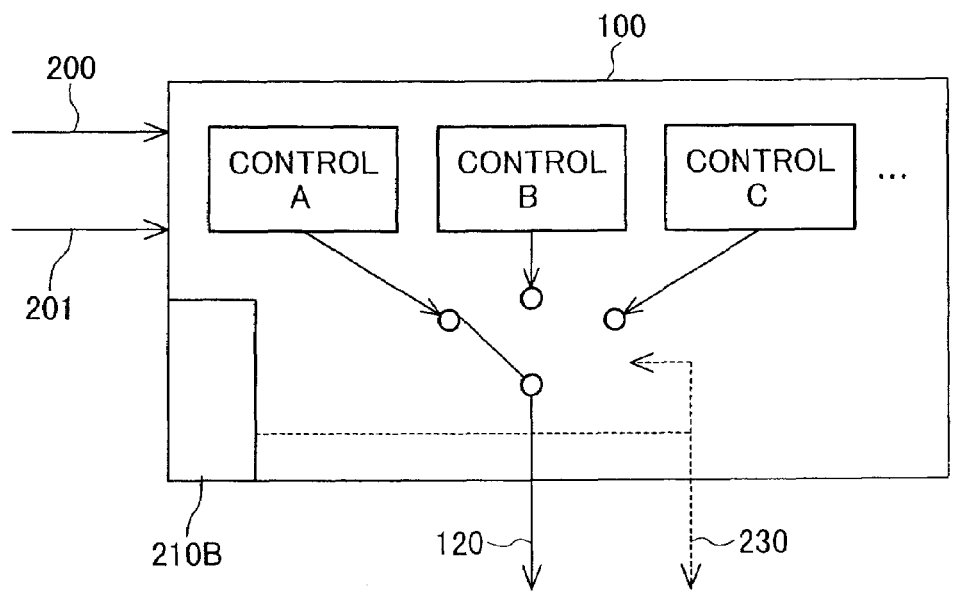
FIG. 20 is a block diagram showing the function of an operation amount generating node.

FIG. 20 is a functional block diagram of the operation amount generating node 100. The operation amount generating node 100 stores a plurality of control logics (control A, control B, and control C) for the vehicle control and is designed to switch over the control logic depending on the position and severity of a failure when it receives the failure detection notification 230 from any other node.

Figure 21:
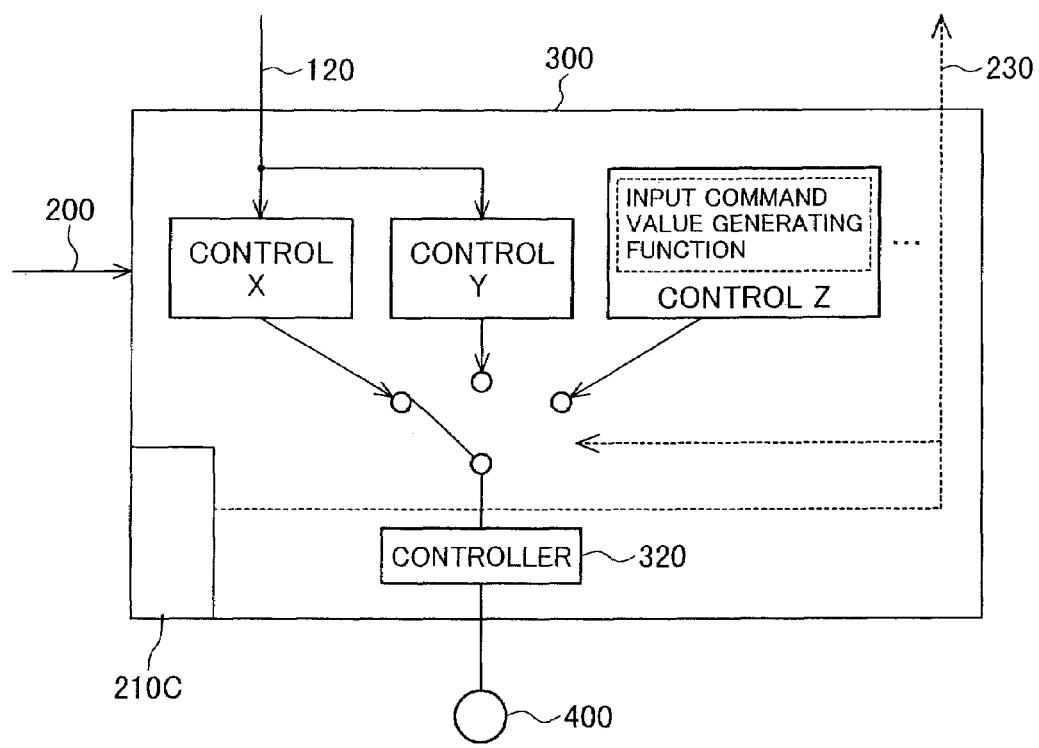
FIG. 21 is a block diagram showing the function of an actuator driving node.

FIG. 21 is a functional block diagram of the actuator driving node 300. The actuator driving node 300 stores a plurality of control logics (control X, control Y, and control Z) for computing the operation target value of the actuator 400 based on the operation amount command value 120 generated by the operation amount generating node 100. A controller 320 drives the actuator 400 so that the operation target value is obtained.

The actuator driving node 300 is designed to switch over the control logic depending on the position and severity of a failure when it receives the failure detection notification 230 from any other node. When the operation amount command value 120 is receivable, the actuator driving node 300 executes the control X or Y in accordance with the received operation amount command value 120. However, when the operation amount command value 120 is not receivable due to a failure of the operation amount generating node 100 or a communication path, the actuator driving node 300 makes switching-over to execute the control Z for taking in the driver's demand signal 200 and computing the operation amount command value by itself.

Third Embodiment

Figure 22:
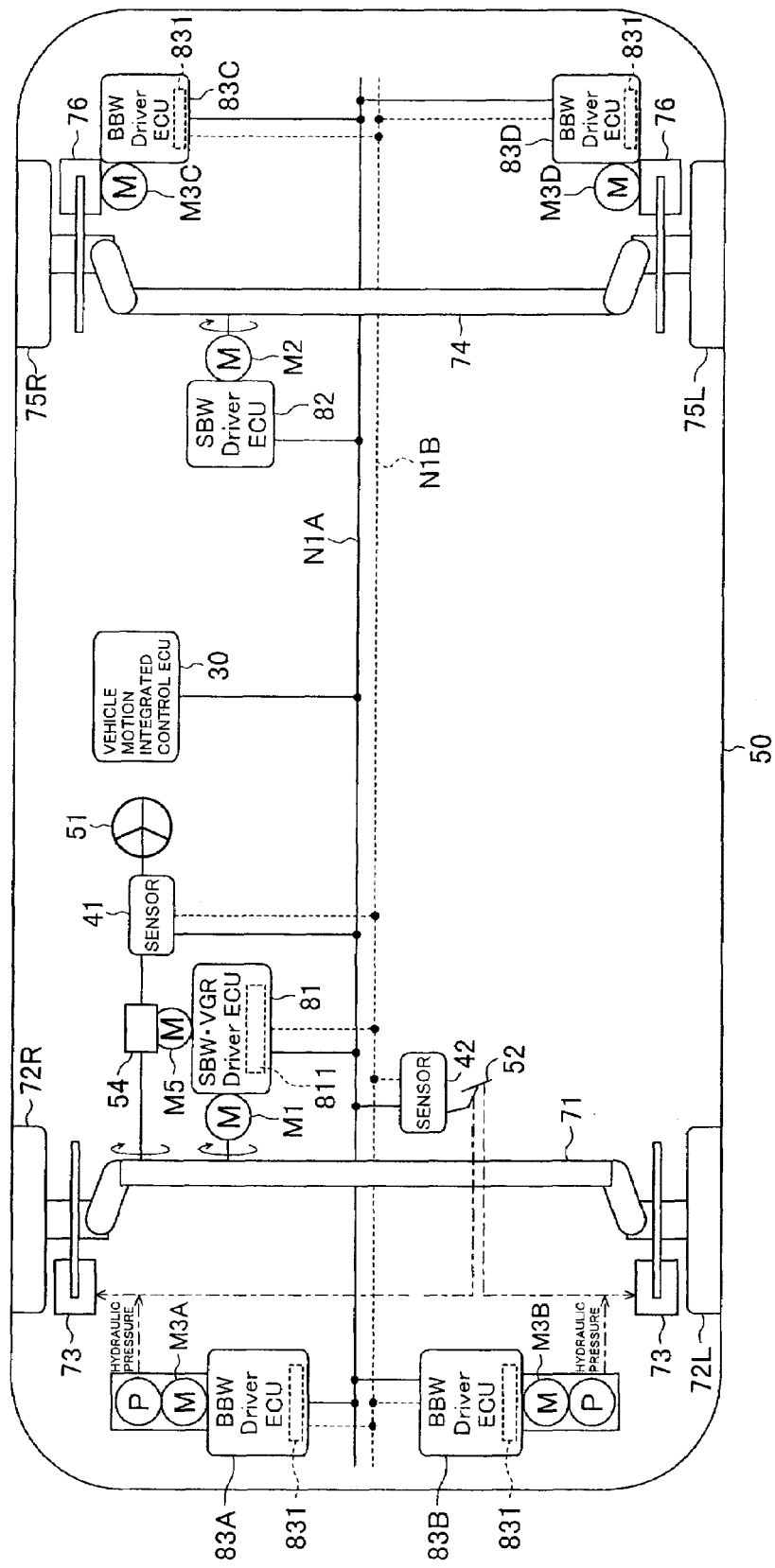
FIG. 22 is a schematic view of a vehicle to which a vehicle control system according to a third embodiment of the present invention is applied.

A vehicle control system according to a third embodiment of the present invention will be described below with reference to FIG. 22. FIG. 22 shows an extracted portion of the vehicle control system, which is in particular related to the brake control and the steering control.

The vehicle control system of this embodiment includes, as sensors for detecting the driver's demands, a steering angle sensor 41 for measuring the rotational angle of a steering wheel 51 and a brake pedal position sensor 42 for measuring the step-down amount of a brake pedal 52. Also, the vehicle control system includes, as an operation amount generating node, a vehicle motion integrated control ECU 30 for interpreting the driver's intent based on signals from the driver's demand detecting sensors and for controlling the vehicle motion in an integrated manner in combination with signals from other sensors (not shown) for detecting the vehicle status, such as an acceleration sensor, a yaw rate sensor, and a wheel speed sensor.

The vehicle control system further includes, as actuator driving nodes, an SBW/VGR driver ECU 81 for controlling an electric motor M1 which generates a front wheel steering force and an electric motor M5 which acts on a variable gear ratio (VGR) mechanism mounted to a steering column shaft, an SBW driver ECU 82 for controlling a steering electric motor M2 which generates a rear wheel steering force, and BBW driver ECU's 83A-83D for controlling brake motors M3A-M3D which generate braking forces for four wheels.

The sensor for measuring the operation amount applied to the brake pedal from the driver can also be given as a hydraulic sensor for measuring the hydraulic pressure generated upon the brake pedal 52 being stepped down by the driver.

The above-mentioned nodes are all constituted to be fail-silent. A communication network comprises a main bus N1A and a backup bus N1B. The main bus N1A is connected to all the nodes, and the backup bus N1B is connected to the least necessary nodes related to safety in running of the vehicle, i.e., all other nodes than the vehicle motion integrated control ECU 30 and the rear wheel SBW driver ECU 82. Though not shown, all the nodes connected to the backup bus N1B are supplied with at least dual source powers.

The front wheel SBW/VGR driver ECU 81 and the four wheel BBW driver ECU's 83A-83D incorporate simplified control logic sections 811, 831, respectively. Here, the term "simplified control" means control with a comparatively small processing load, e.g., control for making an electric motor torque command value simply proportional to a sensor signal value.

In the normal state, the front wheel SBW/VGR driver ECU 81, the rear wheel SBW driver ECU 82, and the four wheel BBW driver ECU's 83A-83D receive a steering angle command and braking force commands from the vehicle motion integrated control ECU 30 via the communication network, and then control the associated electric motors in accordance with the received command values.

In this embodiment, the steering wheel 51 is mechanically coupled to a front wheel steering mechanism 71, and the brake pedal 52 is connected to front wheel brakes 73 through a hydraulic system as well. Therefore, when electronic control is failed, the driver can directly steer and brake the vehicle by using those backup mechanisms.

Taking the vehicle control system shown in FIG. 22 as an example, a description is made of the feature that, even when a failure occurs anywhere in the vehicle control system, the vehicle can stably be driven without losing the braking and steering functions.

Prior to starting the description, it is assumed that two or more failures will not occur at the same time, and that if there occurs a failure, the occurrence of the failure is alarmed to the driver and the failure is repaired in a comparatively short time to prevent the occurrence of a second failure.

(1) In Event of Failure of Vehicle Motion Integrated Control ECU 30

In this event, the vehicle motion integrated control ECU 30 outputs a failure detection notification to the main bus N1A. By constituting the communication network to be adapted for time division multiple access (TDMA) such that each node issues an output to the network in a predetermined time slot, the absence of output can be used as indicating the occurrence of a failure instead of the failure detection notification.

Figure 23:
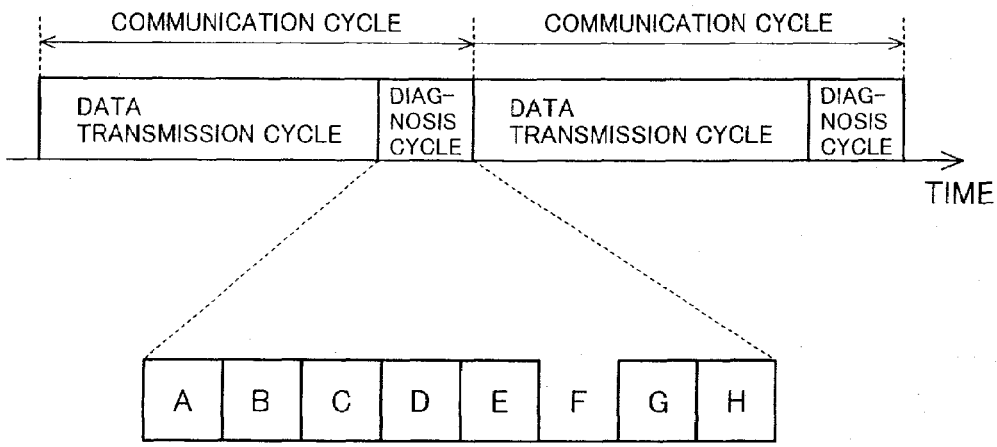
FIG. 23 is a diagram for explaining a node failure detecting method in TDMA communication.

Such a scheme can be realized, for example, by dividing a communication cycle into a data transmission cycle and a diagnosis cycle, and causing all the nodes to output some respective data in order in the diagnosis cycle, as shown in FIG. 23. In the example of FIG. 23, because no output is issued to the network in the time slot within the diagnosis cycle allocated for a node F, the other nodes can recognize that the node F is failed.

Upon receiving the failure detection notification from the vehicle motion integrated control ECU 30, the front wheel SBW/VGR driver ECU 81 and the rear wheel SBW driver ECU 82 take in the value measured by the steering angle sensor 41 via the network and execute the simplified control.

Also, each of the four wheel BBW driver ECU's 83A-83D takes in the value measured by the brake pedal position sensor 42 and executes the simplified control in a simplified control logic section 831.

(2) In Event of Failure in Main Bus N1A of Communication Network

In this event, the front wheel SBW/VGR driver ECU 81, and the four wheel BBW driver ECU's 83A-83D execute the simplified control by using the backup bus N1B in a similar manner to the event that the vehicle motion integrated control ECU 30 is failed.

(3) In Event of Failure in One of Front Wheel BBW/VGR Driver ECU 83A, 83B or Failure of One of Front Wheel Brake Motors M3A, M3B In this event, power supply to the front wheel brake motor on the failed side is stopped, thus bringing the relevant wheel into a brake disabled state. Then, the vehicle motion integrated control ECU 30 executes control such that the vehicle is stably stopped with the remaining three wheels. As an alternative, the driver may directly stop the vehicle by using the backup mechanism.

Here, though not shown, the failure of the electric motor is assumed to include failures of a motor rotational position sensor, a current sensor, etc. which are required for the motor control. In the event that one of the rear wheel BBW driver ECU 83C, 83D or one of the rear wheel brake motors M3C, M3D is failed, the processing is executed in a similar manner.

(4) In Event of Failure in One of Front Wheel SBW/VGR Driver ECU 81 and Front Wheel Steering Motor M1 (Including Sensors Necessary for Motor Control)

In this event, power supply to the front wheel steering motor M1 and the electric motor M5 acting on the VGR mechanism 54 is stopped, and the driver directly steer the vehicle by using the backup mechanism.

(5) In Event of Failure of Steering Angle Sensor 41 or Brake Pedal Position Sensor 42

In this event, power supply to the steering motors M1, M2, the electric motor M5 acting on the VGR mechanism 54, and the brake motors M3A-M3D is stopped, and the driver directly steer or brake the vehicle by using the backup mechanism.

Incidentally, it is assumed in this embodiment that a single failure does not cause a situation where both the backup mechanisms for steering and braking must be used at the same time.

With this embodiment, as described above, since an error is backed up through coordination in the entire system, a sufficiently high-reliable vehicle control system can be realized just by providing all the nodes with the fail-silent function in the vehicle control system including the backup mechanisms without increasing redundancy of each node beyond the least necessary level.

The fail-silent node is simpler in hardware configuration than the fail-operative node capable of continuing the normal operation even if a failure occurs. Accordingly, this embodiment can provide the vehicle control system having higher reliability and a lower cost than the known system.

Further, since only the least necessary nodes related to safety in running of the vehicle are connected to the backup bus N1B, the number of nodes requiring redundancy in communication interface can be reduced and hence the cost can be cut.

Figure 24:
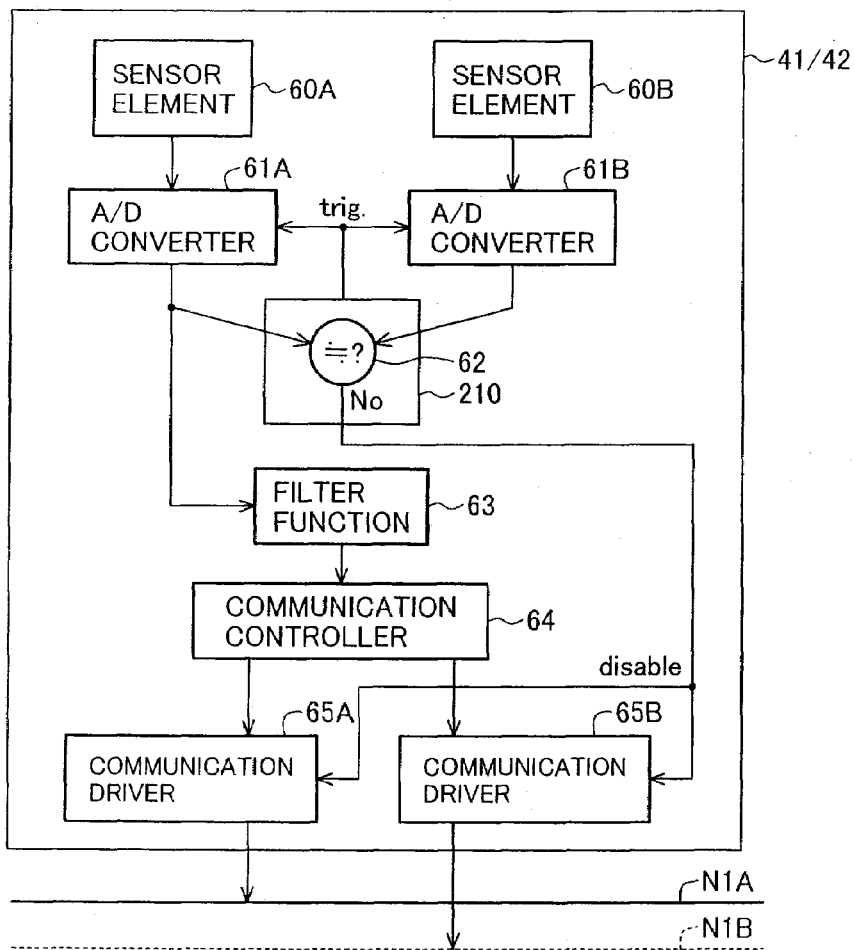
FIG. 24 is a functional block diagram of a fail-silent sensor node.

An example of functional configuration of the fail-silent steering angle sensor 41 or brake pedal position sensor 42 will be described with reference to FIG. 24.

The steering angle sensor 41 or the brake pedal position sensor 42 comprises two sensor elements 60A, 60B, A/D converters 61A, 61B for converting respective analog outputs of the sensor elements 60A, 60B to digital values, a failure detecting function 210, a filter function 63, a communication controller 64, a communication driver 65A for outputting a signal to the main bus N1A, and a communication driver 65B for outputting a signal to the backup bus N1B.

The failure detecting function 210 has a match checking function 62 for determining whether two A/D-converted values from the A/D converters 61A, 61B are matched with each other within a predetermined error range. If the two values are not matched with each other, the communication driver 65A and the communication driver 65B are deactivated to become fail-silent.

Also, the failure detecting function 210 outputs a trigger signal to the A/D converters 61A, 61B so that A/D conversions of the analog outputs from the sensor elements 60A, 60B are executed at the same time.

With the configuration example described above, since the sensor includes the filter function 63, the following advantage is obtained. Even when a sensor signal is sampled at a short period and is subjected to a filtering process such as oversampling, it is no longer required to output data to the communication network in match with the sampling period, whereby traffic of the communication network can be reduced.

An example of hardware configuration of the fail-silent steering angle sensor 41 or the brake pedal position sensor 42 will be described with reference to FIG. 25.

The steering angle sensor 41 or the brake pedal position sensor 42 comprises a main sensor element 60A, a reference sensor element 60B, a failsafe LSI 600, and two communication drivers 65A, 65B.

The failsafe LSI 600 comprises A/D converters 61A, 61B, CPU's 66A, 66B, communication controllers 64A, 64B, and comparators 62A, 62B, these components being arranged with redundancy, as well as one unit of ROM-RAM 67.

In the failsafe LSI 600, after A/D-converting signals from the sensor elements 60A, 60B, the A/D-converted values are exchanged between the CPU's 66A, 66B so that they are matched with each other. Each of the CPU's 66A, 66B executes a filtering process on the A/D-converted values having been made matched with each other.

A match between the results of the filtering processes is checked by inputting the outputs of the communication controllers 64A, 64B to the comparators 62A, 62B.

In this hardware example, because there are two communication buses, the communication controllers 64 are provided in two channels, and outputs of the two channels are compared with each other in each of the comparators 62A, 62B.

According to this hardware example, since the failsafe function is realized in the form of one chip, the fail-silent sensor node can be constituted at a low cost.

Fourth Embodiment

Figure 26:
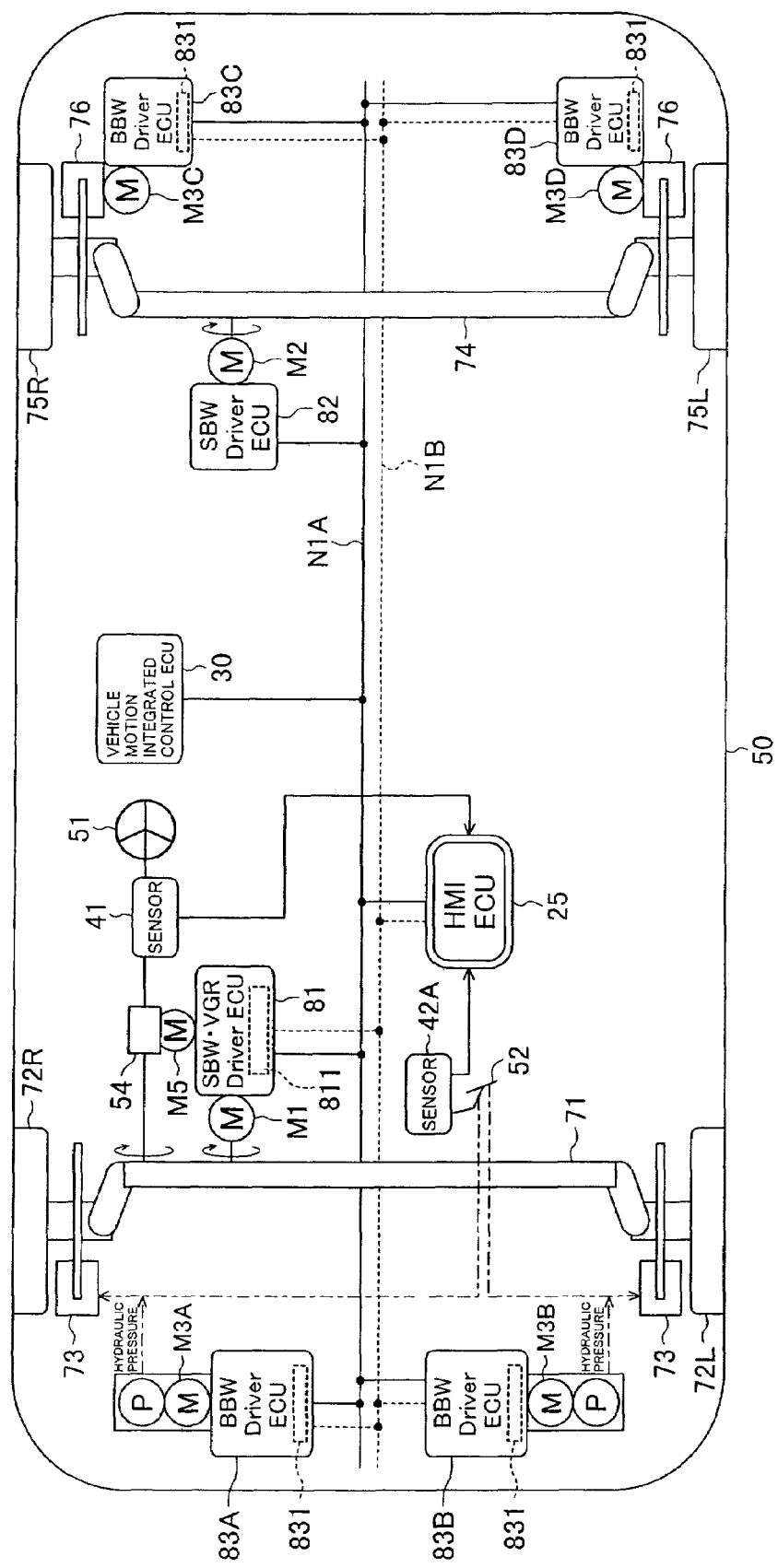
FIG. 26 is a schematic view of a vehicle to which a vehicle control system according to a fourth embodiment of the present invention is applied.

A vehicle control system according to a fourth embodiment of the present invention will be described below with reference to FIG. 26. Note that components in FIG. 26 corresponding to those in FIG. 22 are denoted by the same reference numerals as those in FIG. 22 and a description thereof is omitted here.

While the sensors are directly connected to the network in the third embodiment shown in FIG. 22, this fourth embodiment is constituted such that sensor signals are inputted to an HMI ECU 25, which executes comparison and filtering processes of sensor values and outputs the processed sensor data to the network.

In this fourth embodiment, a steering angle sensor 41A and a brake pedal position sensor 42A are each made up of only two sensor elements.

Additionally, to avoid a situation where the driver must operate both the backup mechanisms for steering and braking in the event of a single failure, the HMI ECU 25 is required to be fail-operative.

Fifth Embodiment

Figure 27:
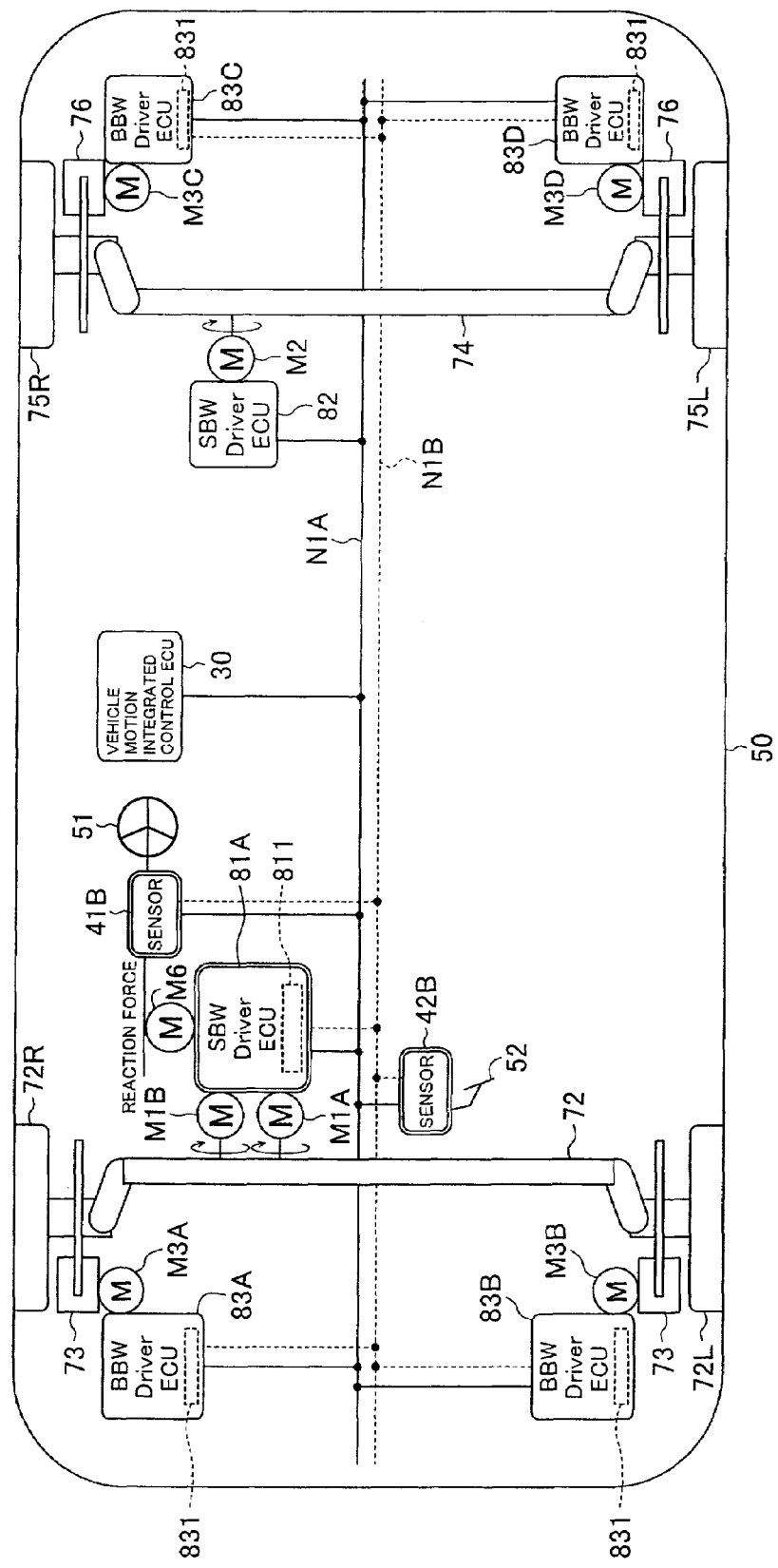
FIG. 27 is a schematic view of a vehicle to which a vehicle control system according to a fifth embodiment of the present invention is applied.

A vehicle control system according to a fifth embodiment of the present invention will be described below with reference to FIG. 27. Note that components in FIG. 27 corresponding to those in FIG. 22 are denoted by the same reference numerals as those in FIG. 22 and a description thereof is omitted here.

The vehicle control system of the fifth embodiment has the same node and network configurations as those of the third embodiment, but it differs from the latter in that mechanical coupling is not present between the steering column (steering wheel 51) and the steering force generating mechanism and between the brake pedal 52 and the braking force generating mechanism. Accordingly, the driver cannot steer and brake the vehicle by using the mechanical backup mechanisms as in the third embodiment.

In the vehicle control system of the fifth embodiment, therefore, a steering angle sensor 41B, a brake pedal position sensor 42B, and a SBW driver ECU 81A for the front wheels 72R, 72L are each constituted as a fail-operative node capable of continuing the normal operation in the event of a failure.

Further, the steering motor for the front wheels 72R, 72L is doubled (as indicated by M1A, M1B).

Though not shown, the front wheel SBW driver ECU 81A comprises two fail-silent nodes, and these fail-silent nodes control the doubled steering motors M1A, M1B independently of each other. The front wheel SBW driver ECU 81A includes a simplified control logic section 811.

An increase of the cost resulting from doubling the electric motor can be suppressed by using, as the steering motors M1A, M1B, electric motors each of which has a capability of producing a smaller torque than the steering motor used in the system where the steering wheel and the steering force generating mechanism are mechanically coupled to each other (when a torque comparable to that in the mechanically coupled system should be produced, each of the electric motors used in this embodiment must have a capability of producing a ½ or larger torque as compared with the undoubted steering motor).

Further, the front wheel SBW driver ECU 81A controls an electric motor M6 acting on a mechanism that generates a reaction force from the road surface on the steering column in a pseudo manner.

Figure 25:
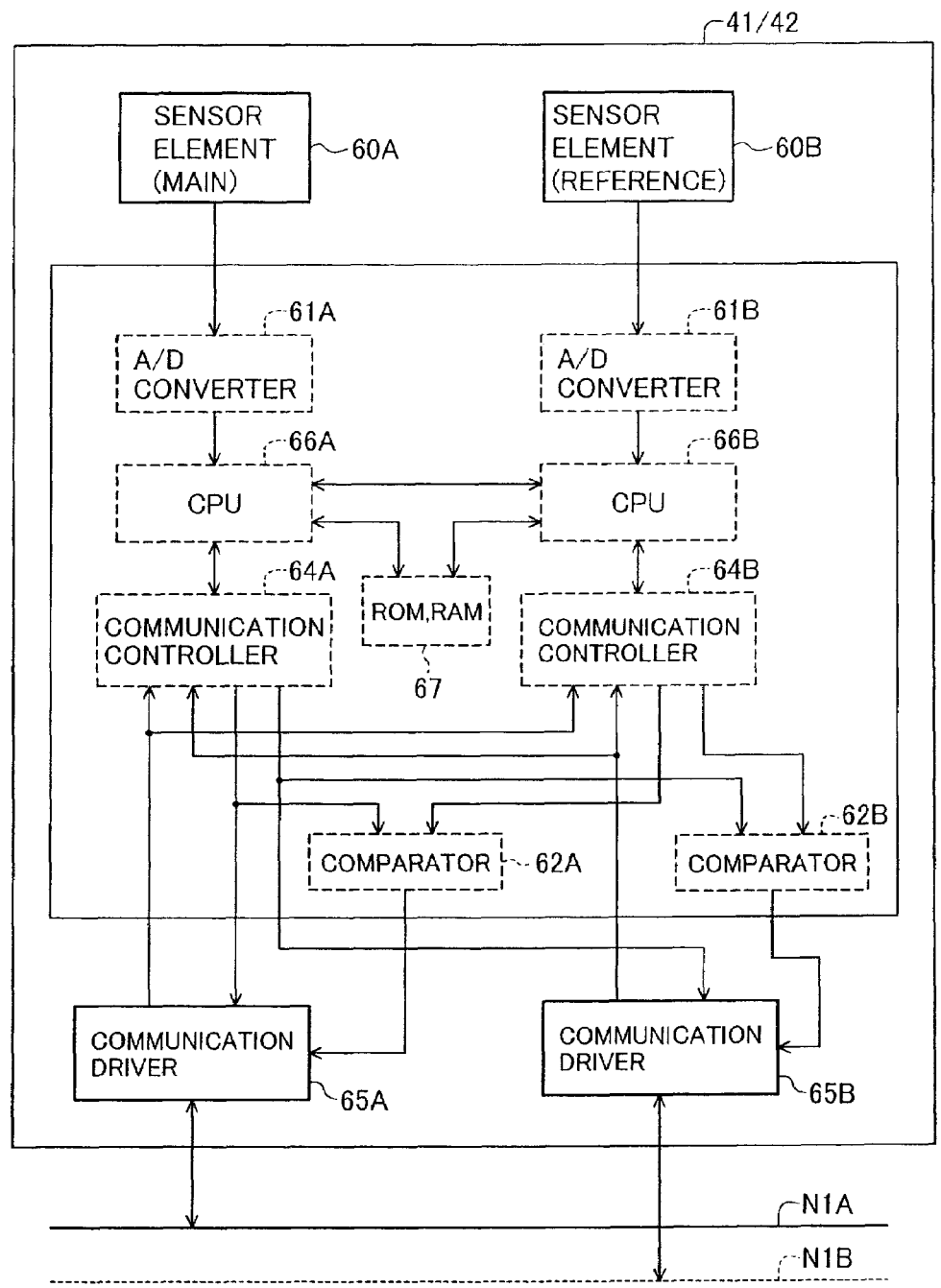
FIG. 25 is a block diagram showing a hardware configuration of the fail-silent sensor node.

The steering angle sensor 41B and the brake pedal position sensor 42B are each constituted in the doubled form of the fail-silent sensor shown in FIG. 25. Alternatively, the fail-silent sensor shown in FIG. 25 may be replaced with a single fail-operative sensor having higher reliability in which the sensor element is tripled and the majority decision function for three sensor signals is additionally provided.

In the event that one fail-silent node of the front wheel SBW driver ECU 81A or one of the steering motors M1A, M1B (including the sensors necessary for the motor control) is failed, either node stops power supply to the steering motor on the failed side and outputs a failure detection notification.

Upon receiving the failure detection notification, the vehicle motion integrated control ECU 30 switches over the control so that the vehicle can stably be steered with the remaining steering motor.

If there occurs a failure in any other location, the vehicle is controlled to be able to run stably without disabling the braking and steering functions in the same manner as that described in the third embodiment.

With the fifth embodiment, since an error is backed up through coordination in the entire system, a sufficiently high-reliable vehicle control system can be realized at a low cost just by introducing the least necessary number of the fail-operative nodes even in the vehicle control system in which the backup mechanisms for steering and braking are not provided.

Sixth Embodiment

Figure 28:
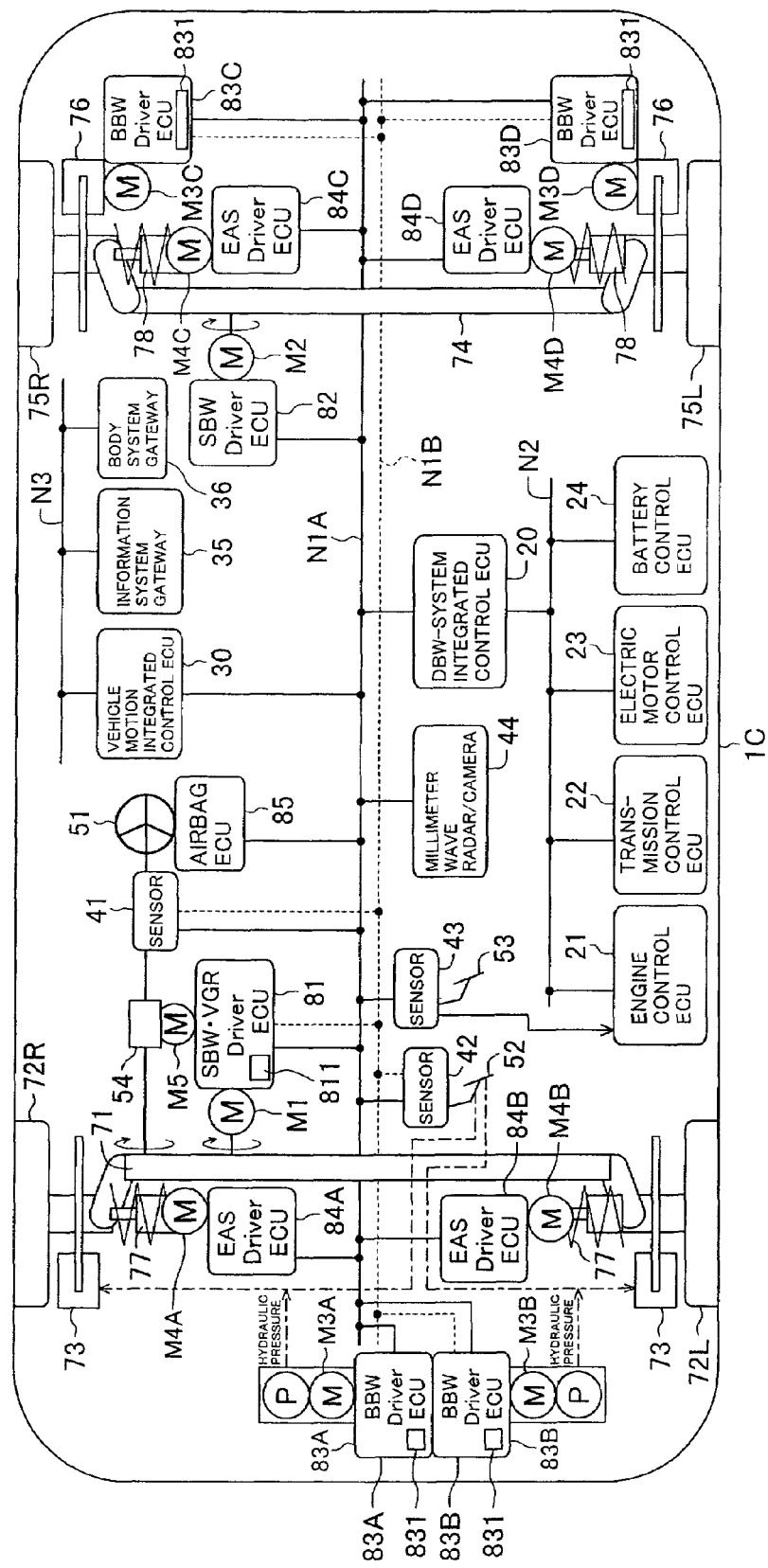
FIG. 28 is a schematic view of a vehicle to which a vehicle control system according to a sixth embodiment of the present invention is applied.

A vehicle control system according to a sixth embodiment of the present invention will be described below with reference to FIG. 28. Note that components in FIG. 28 corresponding to those in FIGS. 3 and 22 are denoted by the same reference numerals as those in FIG. 22 and a description thereof is omitted here.

In this sixth embodiment, nodes related to the driving system, the safety system, etc. are added to the vehicle control system of the third embodiment so as to represent an entire control system for running of the vehicle. While the illustrated sixth embodiment includes the backup mechanisms for steering and braking, even the vehicle control system not provided with the backup mechanisms for steering and braking can also be constituted in a similar way.

Connected to a main bus N1A are not only the nodes related to the steering control and the braking control, which have been described above in connection with the third embodiment, but also a DBW-system integrated control ECU 20 for controlling the driving system of the vehicle in an integrated manner, EAS driver ECU's 84A-84D for controlling respectively suspension motors M4A-M4D to adjust damping forces, an accelerator pedal position sensor 43 for measuring the step-down amount of an accelerator pedal 53, a millimeter wave (EHF) radar/camera 44 for detecting external conditions of the vehicle, and an airbag ECU 85 for controlling expansion of an airbag.

A front wheel SBW/VGR driver ECU 81 and four wheel BBW driver ECU's 83A-83D incorporate respectively simplified control logic sections 811, 831 therein.

The DBW-system integrated control ECU 20 is connected to an engine control ECU 21, a transmission control ECU 22, an electric motor control ECU 23, and a battery control ECU 24 via a network N2.

The vehicle motion integrated control ECU 30 is connected via a network N3 to an information system gateway 35 that serves as a gateway to the network for controlling devices in an information system, such as a car navigation unit, and to a body system gateway 36 that serves as a gateway to the network for controlling devices in an body system, such as door locks, door mirrors and various meters, thereby transferring data to and from those nodes.

Though not shown, the airbag ECU 85 is also connected at a not-illustrated end to a safety system network for integration of various sensors and an actuator, which are required for expansion control of the airbag.

In this embodiment, the vehicle motion integrated control ECU 30 interprets the driver's intent based on signals from a steering angle sensor 41, a brake pedal position sensor 42 and the accelerator pedal position sensor 43, and computes the steering angle, the braking forces and the driving forces for realizing an optimum vehicle motion in combination with signals from other sensors (not shown) for detecting the vehicle status, such as an acceleration sensor, a yaw rate sensor, and a wheel speed sensor. Then, the vehicle motion integrated control ECU 30 sends steering angle commands to a front wheel SBW/VGR driver ECU 81 and a rear wheel SBW driver ECU 82, sends braking force commands to four wheel BBW driver ECU's 83A-83D, and sends a driving force command to the DBW-system integrated control ECU 20.

The DBW-system integrated control ECU 20 receives the driving force command, computes the driving forces to be generated from driving force generators, such as an engine and an electric motor, taking into account energy efficiency, etc., and sends the computed driving force commands to the engine control ECU 21, the electric motor control ECU 23, etc. via the network N2.

The vehicle motion integrated control ECU 30 can execute control, such as running to follow a vehicle running ahead, lane keeping running, and risk avoiding operation, by employing not only information from the sensors for detecting the driver's demand, but also information from the millimeter wave radar/camera 44 for detecting external conditions of the vehicle.

Looking at reliability, the nodes connected to the main bus N1A of the communication network are all constituted to be fail-silent. On the other hand, as described above in connection with the third embodiment, only the least necessary nodes related to safety in running of the vehicle are connected to the backup bus N1B. It is therefore possible to reduce the number of nodes that are each required to have a redundant communication interface, and to reduce the cost.

The accelerator pedal position sensor 43 is also directly connected to the engine control ECU 21 so that the vehicle can be driven even when one of the main bus N1A, the DBW-system integrated control ECU 20, and the network N2 is failed.

A manner for backing up an error in this embodiment and resulting advantages are the same as those described above in connection with the third embodiment.

Seventh Embodiment

Figure 29:
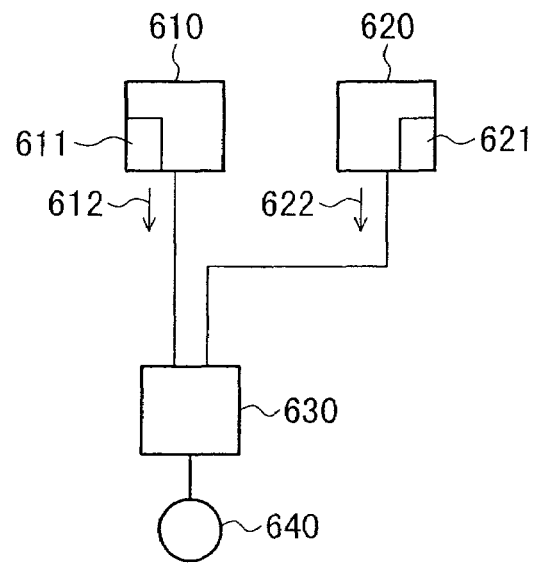
FIG. 29 is a schematic view of a vehicle to which a vehicle control system according to a seventh embodiment of the present invention is applied.

A vehicle control system according to a seventh embodiment of the present invention will be described below with reference to FIGS. 29 and 30.

An operation amount generating node 610 generates an operation amount 612, and the generated operation amount 612 is sent to an actuator driving node 630.

A correction amount generating node 620 generates a correction amount 622, and the generated correction amount 622 is sent to the actuator driving node 630.

Figure 30:
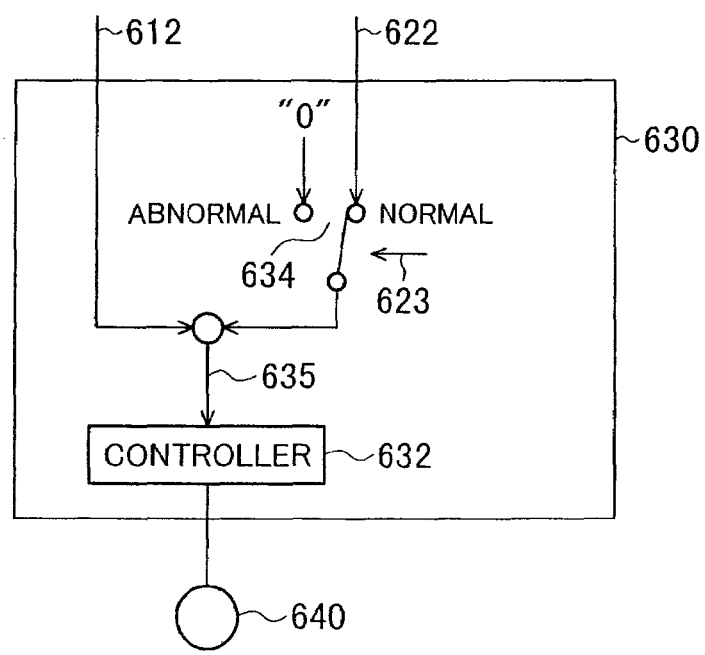
FIG. 30 is a block diagram showing the configuration of the actuator driving node.

As shown in FIG. 30, the actuator driving node 630 includes a controller 632 and a switch 634. When the correction amount generating node 620 is normal, the correction amount 622 from the correction amount generating node 620 is added to the operation amount 612 from the operation amount generating node 610, to thereby produce a control target value 635 for control of an actuator 640. On the other hand, when the correction amount generating node 620 is abnormal, the operation amount 612 from the operation amount generating node 610 is used as the control target value 635 for control of an actuator 640.

With this embodiment, when the correction amount generating node 620 is normal, the control can be performed in a finer manner by using the correction amount, and when the correction amount generating node 620 is failed, the control can be continued without using the correction amount while the function is contracted.

Because it is required to know whether the correction amount generating node 620 is normal, the correction amount generating node 620 preferably includes a failure detecting function 621. The switch 634 of the actuator driving node 630 performs switching operation in accordance with a failure detection result 623 obtained with the failure detecting function 621.

While a high level of information processing is required to generate the correction amount, comparatively simple information processing is required to generate the operation amount. Therefore, the correction amount generating node 620 requires higher processing performance than the operation amount generating node 610. This makes it essential in the correction amount generating node 620 to increase the number of parts, to raise the operation frequency (i.e., the processor's clock frequency), and to operate with less electrical and thermal allowances. As a result, the correction amount generating node 620 has a higher failure rate (total of failure rates (in units of "fit") of the parts) than the operation amount generating node 610.

In other words, the correction amount generating node 620 is constituted as a node having a higher processing capability than the operation amount generating node 610. For example, the correction amount generating node 620 is constituted as a computer (node) having a higher operation frequency than the operation amount generating node 610.

Accordingly, the operation amount generating node 610, i.e., the least necessary node to continue the control, is expected to have a lower failure rate than the correction amount generating node 620. Stated another way, the operation amount generating node 610 is constituted as a node having the configuration with a lower failure rate than that of the correction amount generating node 620.

Further, because the operation amount generating node 610 must be kept normal even when the correction amount generating node 620 is failed, the operation amount generating node 610 preferably has a failure withstand function 611.

Figure 31:
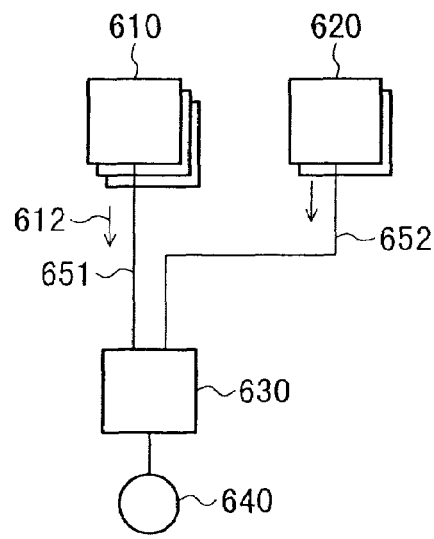
FIG. 31 is a block diagram showing an example in which the operation amount generating node and a correction amount generating node are provided plural with redundancy.

The failure detecting function 621 provided in the correction amount generating node 620 can be practiced in various ways. As shown in FIG. 31, by way of example, the failure detecting function 621 can be realized by providing the correction amount generating node 620 double and comparing outputs of two nodes with each other.

Figure 32:
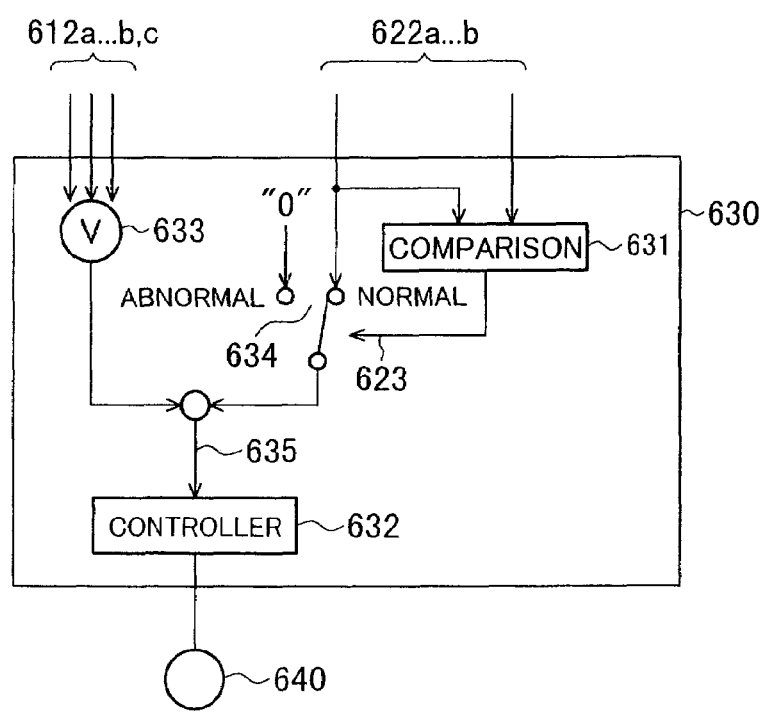
FIG. 32 is a block diagram showing an example of the actuator driving node having the majority decision function and the comparison function.

Such a case can be practiced by a method of comparing correction amounts 622*a*, 622*b* outputted from the doubled correction amount generating nodes 620 with each other on the side of the correction amount generating node 620, and transmitting one of the correction amounts 622*a*, 622*b* and a failure detection result to the actuator driving node 630, or by a method of, as shown in FIG. 32, transmitting the correction amounts 622*a*, 622*b* outputted from the doubled correction amount generating nodes 620 to the actuator driving node 630, and comparing the correction amounts 622*a* and 622*b* with each other by a comparison function 631 in the actuator driving node 630, thereby obtaining a failure detection result 623.

The failure withstand function 611 provided in the operation amount generating node 610 can also be practiced in various ways. As shown in FIG. 31, by way of example, the failure withstand function 611 can be realized by providing the operation amount generating node 610 in triple and selecting one of outputs from three nodes based on the majority decision.

Such a case can be practiced by a method of selecting one of operation amounts 612a, 612b and 612c outputted from the tripled operation amount generating nodes 610 based on the majority decision beforehand on the side of the operation amount generating node 610, and transmitting the selected operation amount to the actuator driving node 630, or by a method of, as shown in FIG. 32, transmitting the operation amounts 612a, 612b and 612c outputted from the tripled operation amount generating nodes 610 to the actuator driving node 630, and selecting one of the three operation amounts based on the majority decision by a majority decision function 633 provided in the actuator driving node 630.

Figure 33:
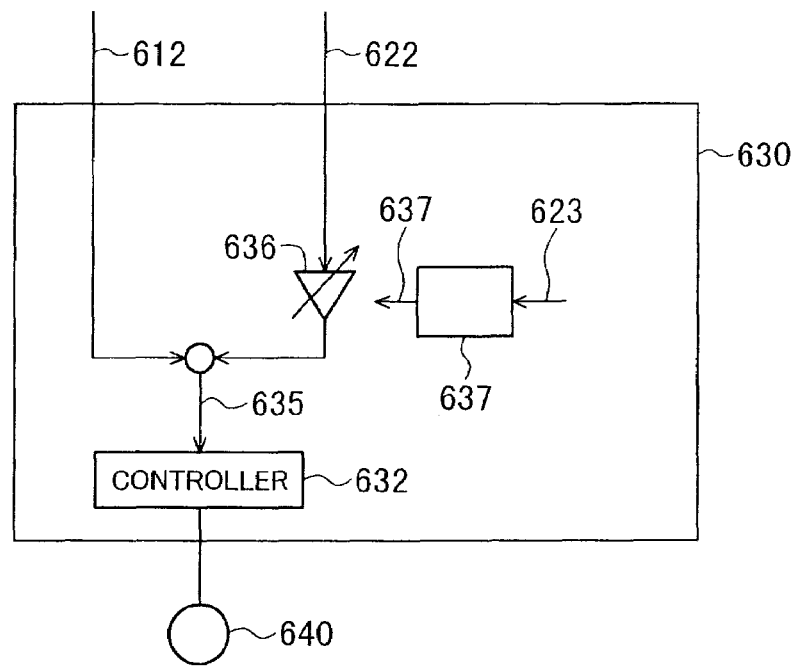
FIG. 33 is a block diagram showing an example of the actuator driving node that performs a gradually changing operation in the event of a failure.

Alternatively, the configuration may be modified as shown in FIG. 33. More specifically, a gain varying unit 636 and a ramp generator 637 for controlling a gain of the gain varying unit 636 are provided in the actuator driving node 630. The failure detection result 623 is inputted to the ramp generator 637. Then, the correction amount 622 from the correction amount generating node 620 is multiplied by the variable gain in the gain varying unit 636, and the multiplied value is added to the operation amount 612 from the operation amount generating node 610, thereby producing the control target value 635 for control of an actuator 640. With this modification, in an abnormal state of the correction amount generating node 620, the control target value 635 is gradually changed without abrupt changes.

Figure 34:
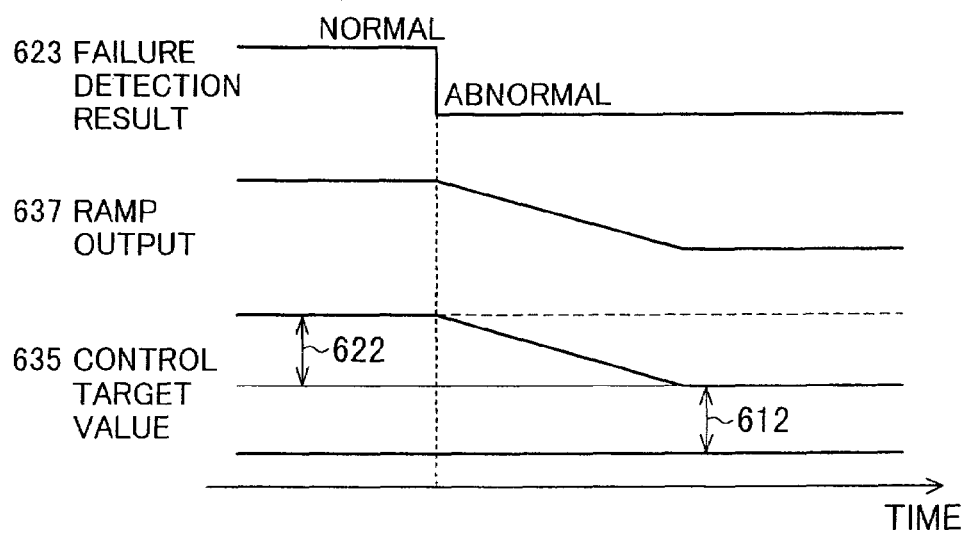
FIG. 34 is a time chart showing the gradually changing operation in the event of a failure.

FIG. 34 represents the operation of this modification. When the correction amount generating node 620 is normal, a ramp output 637' from the ramp generator 637 takes a high-level value. Therefore, the correction amount 622 from the correction amount generating node 620 is multiplied by a predetermined high-level gain in the gain varying unit 636, and the multiplied value is added to the operation amount 612 from the operation amount generating node 610, thereby producing the control target value 635 for control of the actuator 640.

On the other hand, when the correction amount generating node 620 comes into an abnormal state, the ramp output 637' starts to gradually change from the high-level value to a low-level value with time upon the change of the failure detecting result 623 from "normal" to "abnormal".

Accordingly, the variable gain to be multiplied by the correction amount 622 from the correction amount generating node 620 in the gain varying unit 636 is also gradually changed from a high-level gain to a low-level gain with time. As a result, the correction amount 622 from the correction amount generating node 620, which is added to the operation amount 612 for computing the control target value 635, is gradually decreased with time.

While the low-level gain is set to 0 in this modification shown in FIG. 34, a value of the low-level gain may be decided depending on the severity of a failure occurred in the correction amount generating node 620. Also, while the ramp output 637' is linearly changed from the high-level value to the low-level value in the illustrated modification, the change pattern is not limited to a linear form, but it may be set to any suitable form including a curve. In addition, it is desirable that the change pattern be a monotonously decreasing one.

With this modification described above, since the control target value 635 is gradually changed without undergoing abrupt changes in the abnormal state of the correction amount generating node 620, the driver can be kept away from an unusual feeling in the operation. Also, since there occurs no stepped difference in the control target value 635 with the switching-over of the control, a deterioration of controllability can also be avoided which is otherwise caused due to a delay in response of the driver to the stepped difference in the control target value 635.

Figure 35:
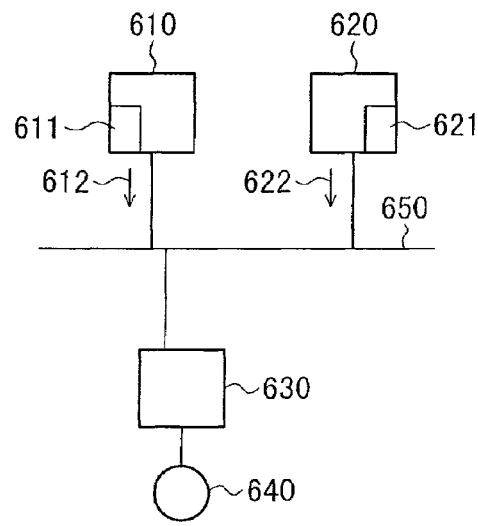
FIG. 35 is a block diagram showing an example in which the nodes are connected to the same communication path.

Further, as shown in FIG. 35, the network configuration may be modified such that the operation amount 612 from the operation amount generating node 610 and the correction amount 622 from the correction amount generating node 620 are transmitted to the actuator driving node 630 via a single communication path (communication bus) 650.

With this modification, the communication paths are not required to be wired on the node-to-node basis, and hence savings in wiring are resulted. Correspondingly, the system cost can be cut and a weight reduction can be realized.

Figure 36:
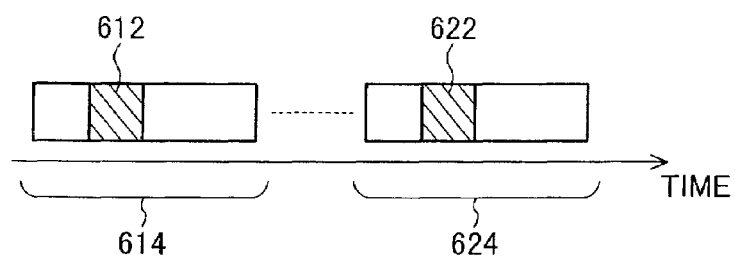
FIG. 36 is a representation showing a flow of information transmitted via the same communication path.

Information transmitted via a communication path 650 in this modification is, as shown in FIG. 36, subjected to time-division and allocated into a plurality of time slots in one-to-one relation to the nodes from which the information is transmitted. More specifically, the operation amount 612 is transmitted while it is placed in a time slot 614 allocated to the operation amount generating node 610, and the correction amount 622 is transmitted while it is placed in a time slot 624 allocated to the correction amount generating node 620.

When the above-mentioned method of separately transmitting the correction amounts 622a, 622b outputted from the correction amount generating nodes 620 in redundant arrangement to the actuator driving node 630 is employed, separate time slots are allocated to the correction amount generating nodes 620, and the correction amounts 622a, 622b are transmitted using the respective time slots.

Also, when the above-mentioned method of separately transmitting the operation amounts 612a, 612b and 612c generated from the operation amount generating nodes 610 in redundant arrangement to the actuator driving node 630 is employed, separate time slots are allocated to the operation amount generating nodes 610, and the operation amounts 612a, 612b and 612c are transmitted using the respective time slots.

Figure 37:
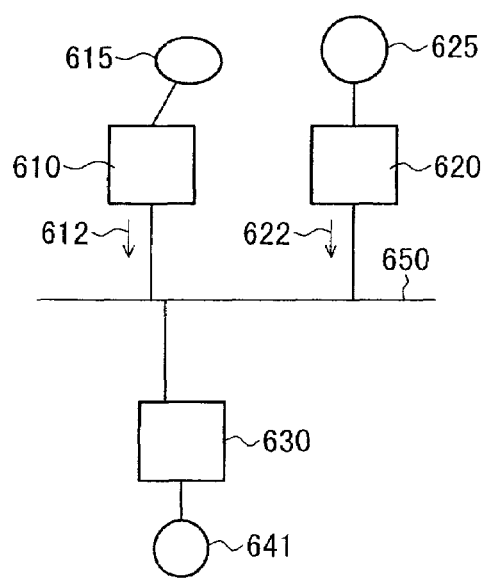
FIG. 37 is a block diagram showing a practical example in which the seventh embodiment is applied to a "Steer-by-Wire" system.

FIG. 37 shows a practical example in which the seventh embodiment is applied to the "Steer-by-Wire" system.

A steering column (steering wheel) 615 is connected to the operation amount generating node 610 to generate an operation amount 612 that is a steering angle corresponding to the angle by which the steering column 615 is operated by the driver. The generated operation amount 612 is transmitted to the actuator driving node 630 via the communication path 650.

An acceleration sensor/yaw rate sensor 625 is connected to the correction amount generating node 620 to generate a correction amount 622 based on information including a signal from the acceleration sensor/yaw rate sensor 625 and the operation amount 612. The generated correction amount 622 is transmitted to the actuator driving node 630 via the communication path 650.

When the correction amount generating node 620 is normal, the actuator driving node 630 controls a steering device 641 by using, as the control target value, a value resulting from adding the correction amount 622 to the operation amount 612.

In the case of the driver overly turning the steering column 615, the front wheels come out of the grip range and stability of the vehicle is deteriorated if the correction amount 622 is not added. With the example described above, however, since the acceleration sensor/yaw rate sensor 625 detects a sideslip or a spin of the vehicle and the correction amount generating node 620 generates the correction amount 622 so as to suppress the sideslip or the spin, driving stability of the vehicle is improved.

Figure 38:
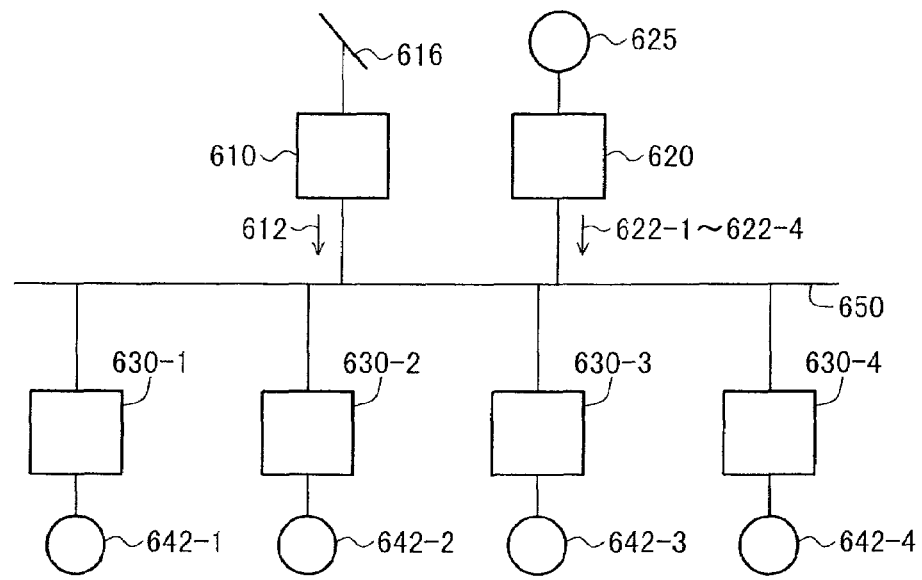
FIG. 38 is a block diagram showing a practical example in which the seventh embodiment is applied to a "Brake-by-Wire" system.

FIG. 38 shows a practical example in which the seventh embodiment is applied to the "Brake-by-Wire" system.

A brake pedal 616 is connected to the operation amount generating node 610 to generate an operation amount 612 that is a brake stepping-down force corresponding to the operation of the brake pedal 616 applied from the driver. The generated operation amount 612 is transmitted to actuator driving nodes 630-1 through 630-4 via the communication path 650.

An acceleration sensor/yaw rate sensor 625 is connected to the correction amount generating node 620 to generate correction amounts 622-1 through 622-4 for the respective brakes based on information including a signal from the acceleration sensor/yaw rate sensor 625 and the operation amount 612. The generated correction amount 622 is transmitted to the actuator driving nodes 630-1 through 630-4 via the communication path 650.

When the correction amount generating node 620 is normal, the actuator driving nodes 630-$i$ (i=1-4) control respective brakes 642-$i$ (i=1-4) of the four wheels by using, as the control target values, values resulting from adding the correction amounts 622-$i$ (i=1-4) to the operation amount 612.

In the case of the driver overly stepping down the brake pedal 616, the four wheels come out of the grip range and stability of the vehicle is deteriorated if the correction amounts 622-$i$ (i=1-4) are not added. With the example described above, however, since the acceleration sensor/yaw rate sensor 625 detects a sideslip or a spin of the vehicle and the correction amount generating node 620 generates the correction amounts 622-$i$ (i=1-4) so as to suppress the sideslip or the spin, driving stability of the vehicle is improved.

Figure 39:
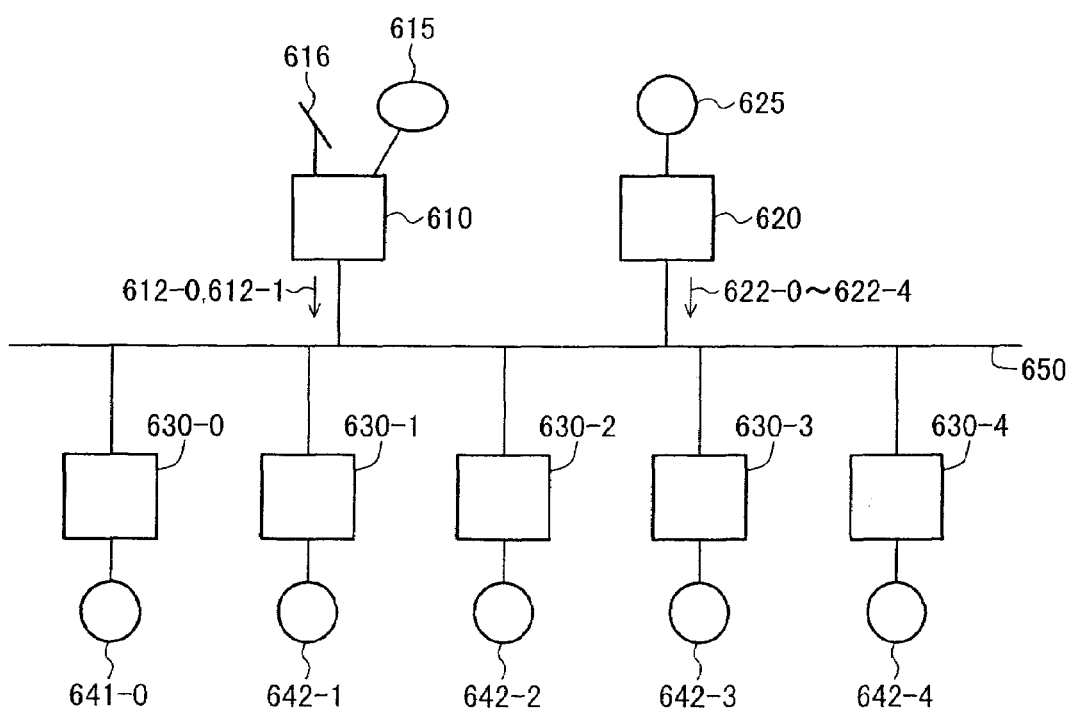
FIG. 39 is a block diagram showing a practical example in which the seventh embodiment is applied to a "Steer-by-Wire" and "Brake-by-Wire" integrated system.

FIG. 39 shows a practical example in which the seventh embodiment is applied to an integrated system of "Steer-by-Wire" and "Brake-by-Wire".

The steering column 615 and the brake pedal 616 are connected to the operation amount generating node 610 to generate an operation amount 612-0 that is a steering angle corresponding to the angle by which the steering column 615 is operated by the driver, and also to generate an operation amount 612-2 that is a brake stepping-down force corresponding to the operation of the brake pedal 616 applied from the driver. The generated operation amounts 612-0, 612-2 are transmitted to the actuator driving nodes 630-0 through 630-4 via the communication path 650. Correction amounts 622-0 through 622-4 are generated and transmitted to the actuator driving nodes 630-0 through 630-4 in a similar manner to that in the above-described example.

When the correction amount generating node 620 is normal, the actuator driving node 630-0 controls the steering device 641 by using, as the control target value, a value resulting from adding the correction amount 622-0 to the operation amount 612-0.

When the correction amount generating node 620 is normal, the actuator driving nodes 630-$i$ (i=1-4) control respective brakes 642-$i$ (i=1-4) of the four wheels by using, as the control target values, values resulting from adding the correction amounts 622-$i$ (i=1-4) to the operation amount 612-2.

In the case of the driver overly turning the steering column 615 or overly stepping down the brake pedal 616, the front wheels or the four wheels come out of the grip range and stability of the vehicle is deteriorated if the correction amounts 622-$i$ (i=1-4) are not added. With the example described above, however, since the acceleration sensor/yaw rate sensor 625 detects a sideslip or a spin of the vehicle and the correction amount generating node 620 generates the correction amounts 622-$i$ (i=1-4) so as to suppress the sideslip or the spin, driving stability of the vehicle is improved.

Eighth Embodiment

Figure 40:
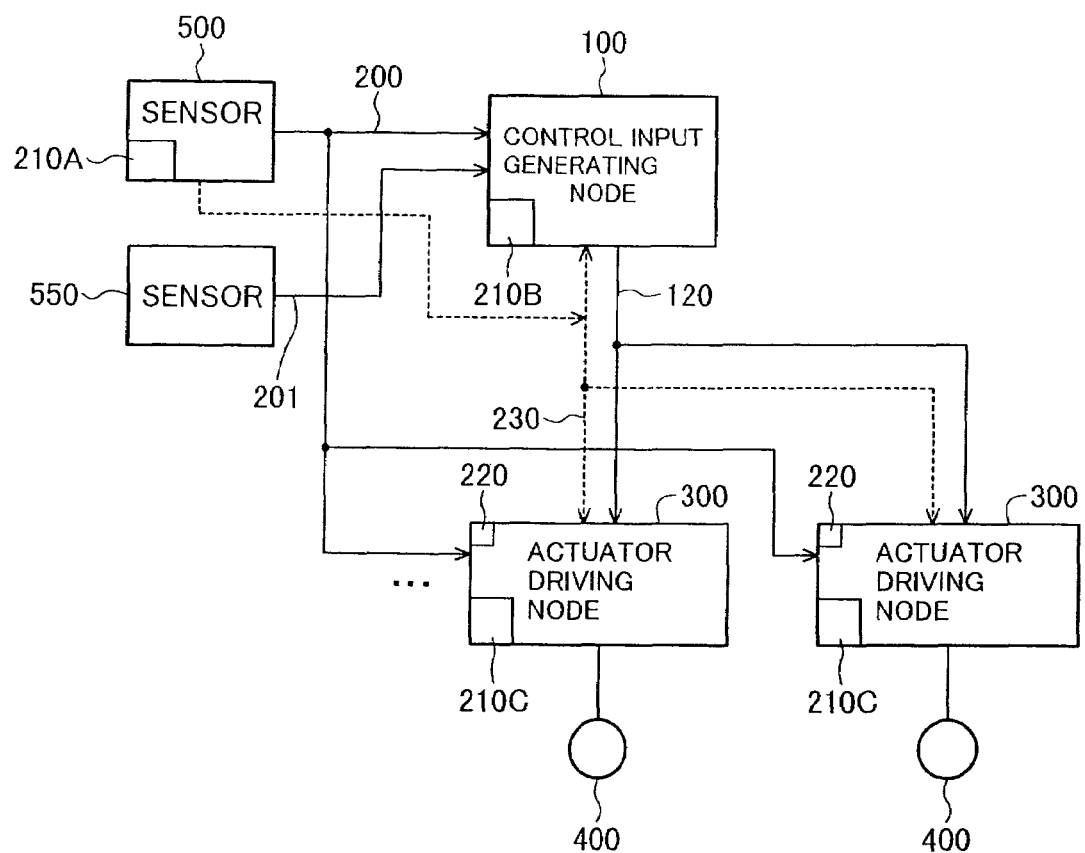
FIG. 40 is a block diagram showing a basic configuration of a vehicle control system according to an eighth embodiment of the present invention.

A vehicle control system according to an eighth embodiment of the present invention will be described below with reference to FIG. 40.

The vehicle control system according to this eighth embodiment comprises at least one sensor 500 for detecting an operation amount that is applied to an accelerator pedal, a brake pedal, a steering wheel, etc. and represents the driver's demand for the vehicle motion; at least one sensor 550 for detecting a vehicle speed, an acceleration or a yaw rate that represents the vehicle status, or information indicating an external situation, which is acquired using, e.g., electric waves or an image; a plurality of actuators 400 corresponding to a motive power source, brakes, and a steering wheel for realizing driving, braking and steering operations, respectively; an operation amount generating node 100 for generating target operation amounts to control the actuators 400; and a plurality of actuator driving nodes 300 for controlling the actuators 400 in accordance with the target operation amounts generated by the operation amount generating node 100.

The operation amount generating node 100 may be constituted, though not specifically shown, as a general microcomputer comprising a central processing unit (CPU) for executing programs, a nonvolatile memory (ROM) and a volatile memory (RAM) for storing the programs and data, and an input/output unit (I/O) for connection to the sensor 500, the sensor 550 and the actuator driving nodes 300, these components being interconnected via a two-way bus.

The operation amount generating node 100 may further comprise an analog/digital converter (ADC) to which the sensor 500 and the sensor 550 are connected, or comprise a serial communication interface (SCI) to which the sensor 500, the sensor 550 and the actuator driving nodes 300 are connected. Further, those components may be realized as one or a plurality of semiconductor integrated circuits.

The operation amount generating node 100 computes the target operation amount for each actuator 400 based on a driver's demand signal 200 outputted from the sensor 500 and a vehicle status signal 201 outputted from the sensor 550, and then transmits the computed target operation amount, as an operation amount command value 120, to the corresponding actuator driving node 300 via a network. The operation amount command value 120 is decided depending on the type of each actuator 400, and it is a target driving force when the actuator 400 is the power source, a target braking force applied to one of four wheels when the actuator 400 is the brake, and a target steering angle when the actuator 400 is the steering wheel.

Each of the actuator driving nodes 300 may be constituted, though not specifically shown, as a general microcomputer comprising a central processing unit (CPU) for executing programs, a nonvolatile memory (ROM) and a volatile memory (RAM) for storing the programs and data, an input/output unit (I/O) for connection to the sensor 500 and the operation amount generating node 100, these components being interconnected via a two-way bus, and driving circuits connected to the I/O and driving the actuators.

The actuator driving node 300 may further comprise an analog/digital converter (ADC) to which the sensor 500 is connected, or comprise a serial communication interface (SCI) to which the sensor 500 and the operation amount generating node 100 are connected. Further, those components may be constituted as one or a plurality of semiconductor integrated circuits.

The actuator driving node 300 includes, though not shown, a sensor for detecting one of the driving force, the braking force and the steering angle to be applied from the actuator 400, or for obtaining information required to estimate one of them, and executes driving control of the actuator 400 so that the driving force, the braking force or the steering angle applied from the actuator 400 is matched with the operation amount command value 120 received from the operation amount generating node 100.

Further, the actuator driving nodes 300 transmits, to the operation amount generating node 100, the driving force, the braking force or the steering angle that is applied from the actuator 400 and is detected by the sensor. By referring to the thus-transmitted driving force, braking force and steering angle applied from the actuator 400, the operation amount generating node 100 can compute the target operation amount of each actuator 400.

The sensor 500, the operation amount generating node 100, and the actuator driving nodes 300 include respectively failure detecting functions 210A, 210B and 210C for detecting their own failures.

Detection of a failure in the sensor 500 with the failure detecting function 210A can be realized by determining whether the value detected by the sensor 500 departs from a predetermined range, or by employing a plurality of sensors and evaluating detection results through comparison check or majority decision.

Detection of a failure in the operation amount generating node 100 with the failure detecting function 210B can be realized by resorting to timeout of the CPU with a watch dog timer, bit error detection in the ROM, the RAM and the two-way bus with redundant code, or I/O comparison check, or by employing a plurality of operation amount generating nodes 100 and evaluating respective node outputs through comparison check or majority decision.

Detection of a failure in the actuator driving node 300 with the failure detecting function 210C can be realized by resorting to timeout of the CPU with a watch dog timer, bit error detection in the ROM, the RAM and the two-way bus with redundant code, or I/O comparison check, or by employing a plurality of operation amount generating nodes 100 and evaluating respective node outputs through comparison check or majority decision.

In addition, the failure detecting function 210C has the function of detecting a failure of the actuator 400 based on a change amount of the driving force, the braking force or the steering angle applied from the actuator 400 or the difference between the operation amount command value 120 and the actual value.

When each of the failure detecting functions 210A, 210B and 210C detects a failure in the relevant node or the associated actuator 400, it outputs, to the operation amount generating node 100 and the other actuator driving nodes 300, a failure detection notification 230 for notifying that the relevant node is in a failed state.

When any of the sensor 500, the operation amount generating node 100, and the actuator driving nodes 300 comes into a failed state, it preferably outputs only the failure detection notification 230 and stops the other outputs. Further, it is preferable that, when the failure detection notification 230 cannot be outputted in a normal manner, the output of the failure detection notification 230 is also stopped.

In addition, each actuator driving node 300 has the control program selecting function (control method selecting means) 220 for selecting a control program (i.e., an actuator control method) in accordance with the failure detection results made by itself, the other actuator driving node(s) 300, and the operation amount generating node 100.

In the normal state, the control program selecting function 220 selects a control program for controlling the actuator 400 in accordance with the operation amount command value 120 transmitted from the operation amount generating node 100. However, when the operation amount generating node 100 is failed, the control program selecting function 220 selects a control program for controlling the actuator 400 in accordance with the driver's demand signal 200 from the sensor 500. Also, when the relevant actuator driving node 300 or the other particular actuator driving node 300 is failed, the control program selecting function 220 selects a control program for safely stopping the control of the actuator 400.

As a result, even if the operation amount generating node 100 or the actuator driving node 300 is failed, the vehicle control can be continued by using the actuator driving node 300 in the normal state.

Figure 41A:
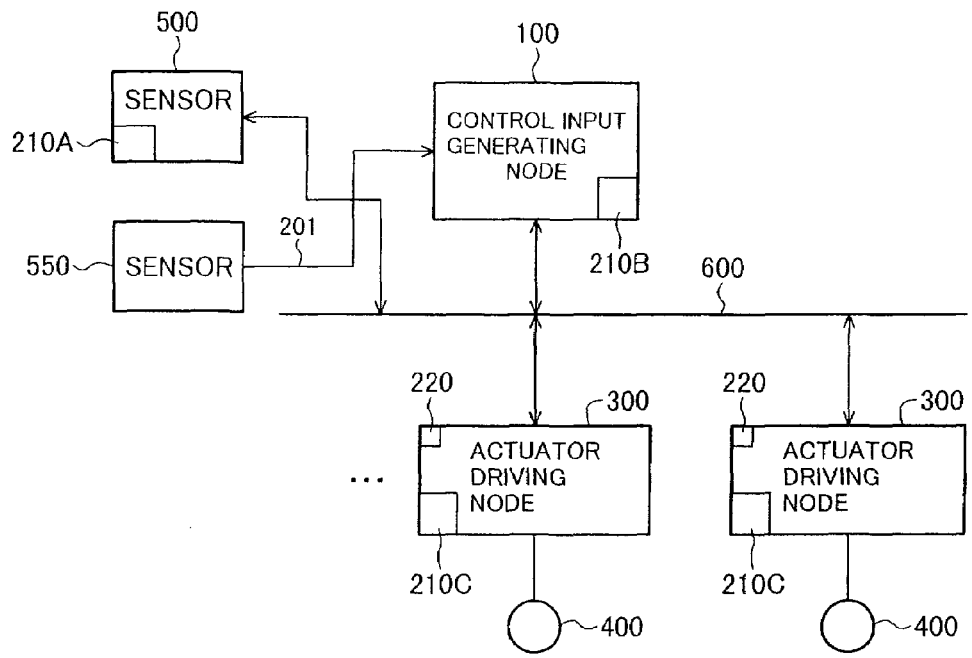
FIG. 41 is a block diagram showing one modification of the vehicle control system according to the eighth embodiment of the present invention.
Figure 41B:
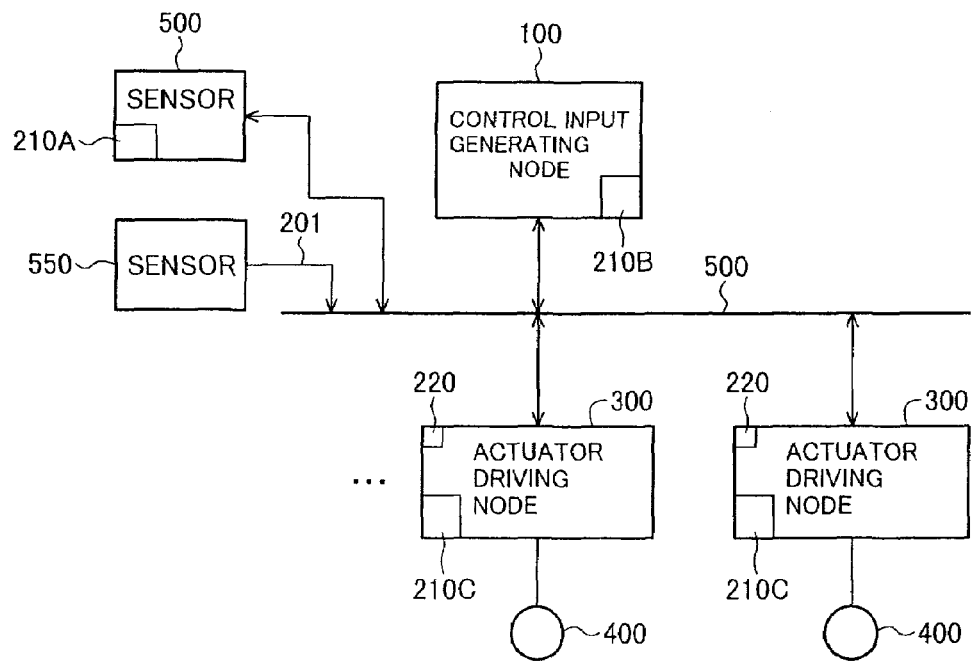

The vehicle control system according to this eighth embodiment may be modified, as shown in FIG. 41, such that the operation amount generating node 100, the actuator driving nodes 300, and the sensor 500 are interconnected via a network 600, such as a CAN, for communication among them. The operation amount generating node 100, the actuator driving nodes 300, and the sensor 500 can send the operation amount command value 120, the failure detection notification 230, the driver's demand signal 200, and other messages to the desired nodes via the network 600. Further, the plurality of nodes can receive the message sent from each node.

Figure 42:
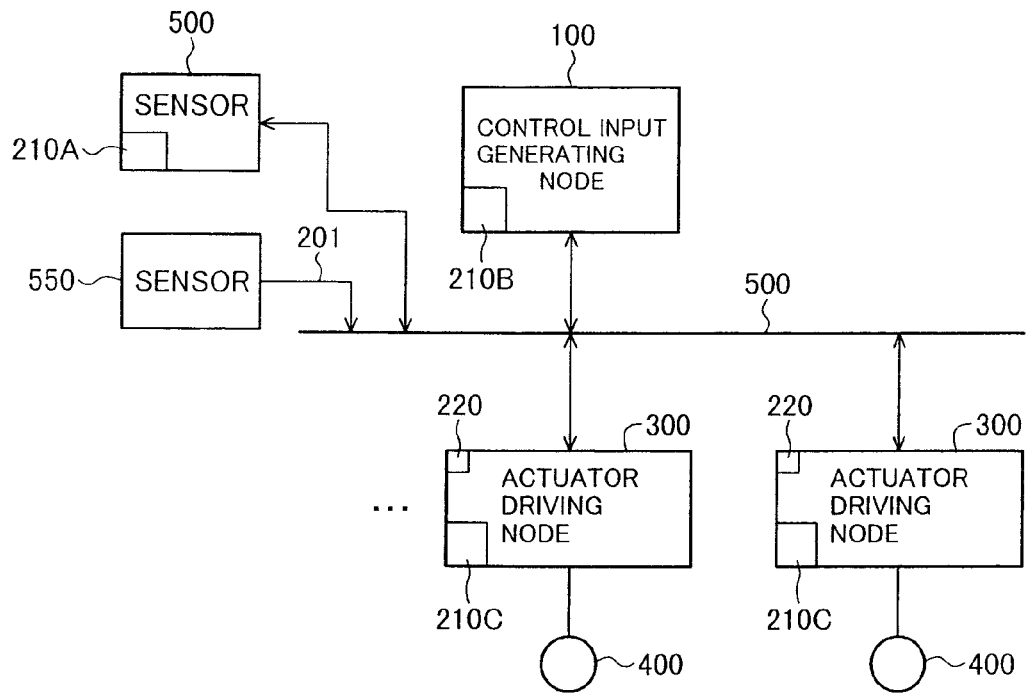
FIG. 42 is a block diagram showing another modification of the vehicle control system according to the eighth embodiment of the present invention.

Alternatively, the vehicle control system according to the eighth embodiment may be constituted, as shown in FIG. 42, such that the sensor 550 is also connected as one node to the network 600. This enables the sensor 550 to send the vehicle status signal 201 to the desired node via the network 600. Further, the plurality of nodes can receive the message sent from the sensor 550.

The vehicle control systems shown in FIGS. 41 and 42 may be modified such that a plurality of networks 600 are included for the purpose of improving network reliability with redundancy.

Figure 43:
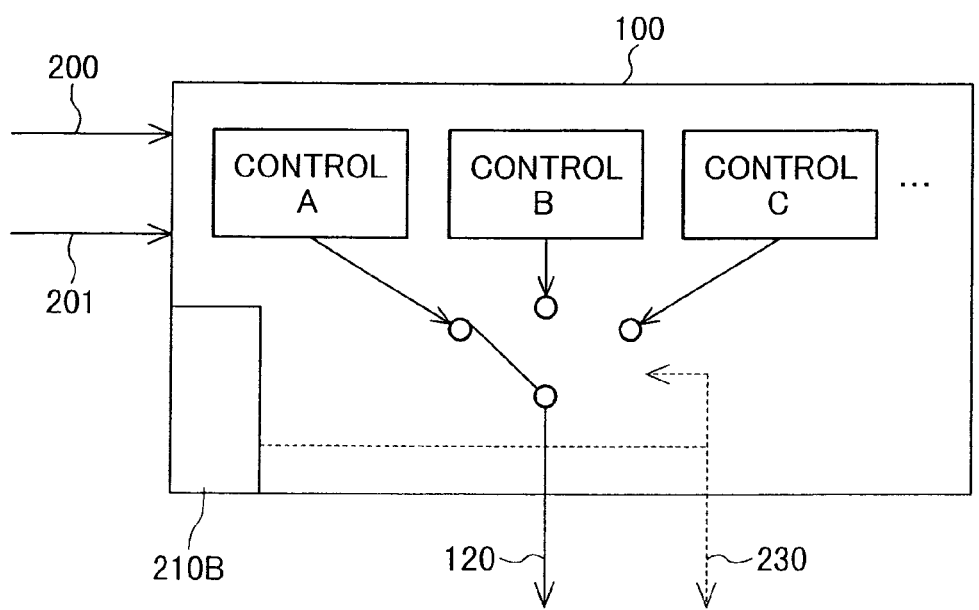
FIG. 43 is a block diagram showing the function of the operation amount generating node.

FIG. 43 is a functional block diagram of the operation amount generating node 100. The operation amount generating node 100 stores a plurality of control programs (A, B and C) for the vehicle control in the ROM or RAM and is designed so as to switch over the control program depending on the position and severity of a failure when the operation amount generating node 100 detects its own failure with the failure detecting function 210B or receives the failure detection notification 230 from the sensor 500, the sensor 550 and any of the actuator driving nodes 300.

Figure 44:
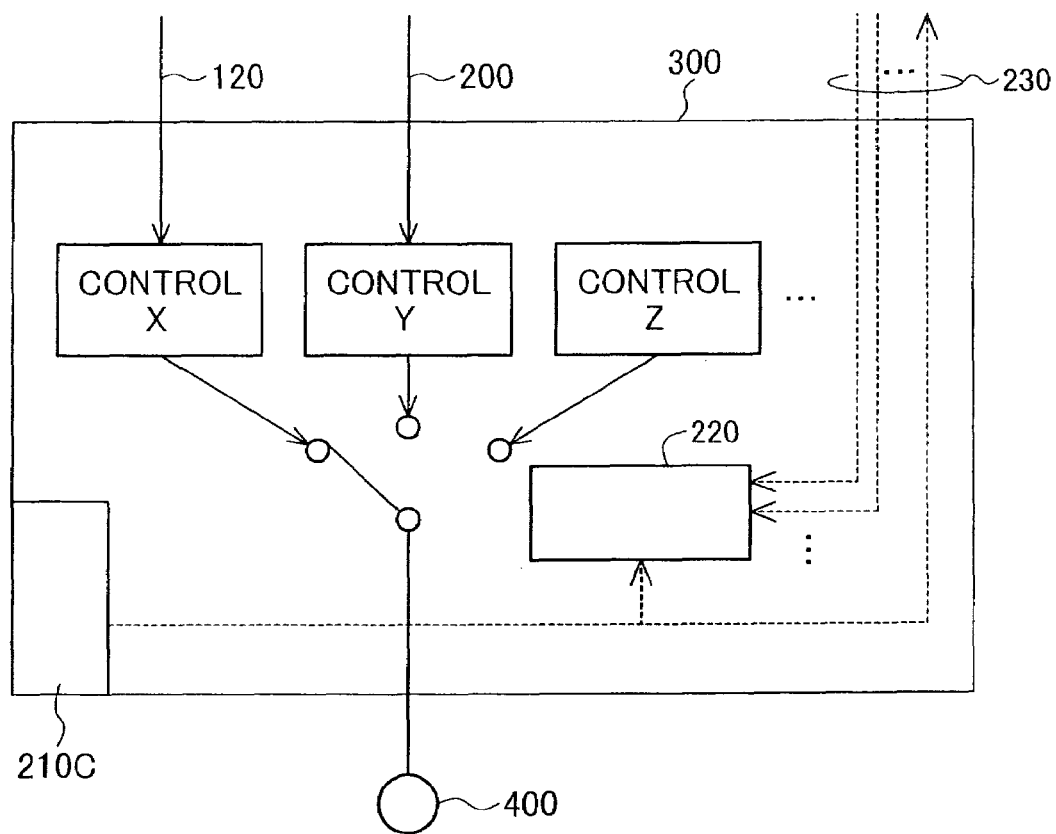
FIG. 44 is a block diagram showing the function of the actuator driving node.

FIG. 44 is a functional block diagram of the actuator driving node 300. The actuator driving node 300 stores a plurality of control programs (X, Y and Z) in the ROM or RAM for computing the operation target value of the actuator 400 based on the operation amount command value 120 received from the operation amount generating node 100. More specifically, the actuator driving node 300 stores the control program X for controlling the actuator 400 in accordance with the operation amount command value 120 outputted from the operation amount generating node 100, the control program Y for controlling the actuator 400 in accordance with the driver's demand signal 200 outputted from the sensor 500, and the control program Z for maintaining the actuator 400 in a predetermined state regardless of the operation amount command value 120 and the driver's demand signal 200. Then, the actuator driving node 300 is able to switch over the control program depending on the situation of its own failure or a failure in another node with the control program selecting function 220.

Basic processing to continue the vehicle motion in the event of a failure occurred in the vehicle control system will be described below in connection with, by way of example, the vehicle control systems shown in FIGS. 40 through 44.

A description is first made of the basic processing in the event of a failure of the operation amount generating node 100. When the operation amount generating node 100 detects its own failure with the failure detecting function, it stops the transmission of the operation amount command value 120 and transmits the failure detection notification 230. If the operation amount generating node 100 cannot transmit the failure detection notification 230 in a normal manner, it further stops the transmission of the failure detection notification 230 as well.

Accordingly, each of the actuator driving nodes 300 connected to the network 600 can detect the occurrence of a failure in the operation amount generating node 100 by receiving the failure detection notification 230 from the operation amount generating node 100, or detect the occurrence of any abnormality in the operation amount generating node 100 by confirming that the operation amount command value 120 is not received within a preset time.

By constituting the network 600 to be adapted for time division multiple access (TDMA) such that each node transmits a message to the network in a predetermined time slot, the occurrence of any abnormality in the operation amount generating node 100 can be detected by confirming whether data is received or not in the time slot allocated to the operation amount generating node 100 for the transmission of the operation amount command value 120.

When the actuator driving node 300 detects the failure detection notification 230 from the operation amount generating node 100 or detects non-reception of the operation amount command value 120, it switches over the control program from (X) to (Y) and takes in the driver's demand signal 200 from the sensor 500 via the network 600, thereby executing control of the vehicle motion control, i.e., control of the driving force, the braking force, the steering angle, etc.

As a result, the vehicle motion control can be continued even if the operation amount generating node 100 is failed.

Next, a description is made of the basic processing in the event of a failure of the actuator driving node 300 or the actuator 400. Note that, though not shown, the failure of the actuator 400 is assumed to include failures of a rotational position sensor, a current sensor, etc. which are required for the actuator control.

In the event of a failure in any of the actuator driving nodes 300 or the actuators 400 provided in one-to-one relation to the brakes of the four wheels, when the actuator driving node 300 detects its own failure with the failure detecting function, it transmits the failure detection notification 230 and switches over the control program from (X) to (Z), thereby releasing the brake for the relevant wheel.

Upon receiving the failure detection notification 230, the operation amount generating node 100 controls the braking force with two or three of the remaining wheels in the normal state. Alternatively, the driver may directly apply brake to the vehicle by using a mechanical backup mechanism, such as a hydraulic mechanism.

As a result, the vehicle motion control can be continued even if any of the actuator driving nodes 300 or the actuators 400 provided in one-to-one relation to the brakes of the four wheels is failed.

In the event of a failure of the actuator driving node 300 or the actuator 400 provided in association with the steering wheel, when the actuator driving node 300 detects its own failure with the failure detecting function 210C, it transmits the failure detection notification 230 and switches over the control program from (X) to (Z), thereby stopping the steering angle control.

Then, the driver directly steers the vehicle by using a mechanical backup mechanism, such as a steering column. When the mechanical backup mechanism is not provided, plural pairs of the actuator driving node 300 and the actuator 400 are provided in association with the steering wheel, and the steering angle control is continued using at least one pair of the actuator driving node 300 and the actuator 400.

As a result, the vehicle motion control can be continued even if the actuator driving node 300 or the actuator 400 provided in association with the steering wheel is failed.

In the event of a failure of the actuator driving node 300 or the actuator 400 provided in association with the driving force, when the actuator driving node 300 detects its own failure with the failure detecting function, it transmits the failure detection notification 230 and switches over the control program from (X) to (Z), thereby stopping the driving force control.

As a result, the vehicle can safely be stopped even if the actuator driving node 300 or the actuator 400 provided in association with the driving force is failed.

In the event of a failure of the sensor 500 for the brake pedal, the brakes for all the wheels are released and the driver directly applies a brake to the vehicle by using the mechanical backup mechanism, such as the hydraulic mechanism. When the mechanical backup mechanism is not provided, a plurality of brake pedal sensors 500 are provided such that the driver's demand can be detected by at least one of the brake pedal sensors 500.

As a result, the vehicle motion control can be continued even if the brake pedal sensor 500 is failed.

In the event of a failure of the sensor 500 for the steering wheel, the steering control is stopped and the driver directly steers the vehicle by using the mechanical backup mechanism, such as the steering column. When the mechanical backup mechanism is not provided, a plurality of steering wheel sensors 500 are provided such that the driver's demand can be detected by at least one of the steering wheel sensors 500.

As a result, the vehicle motion control can be continued even if the steering wheel sensor 500 is failed.

In the event of a failure of the sensor 500 for the accelerator pedal, the driving force control is stopped and the vehicle is stably stopped. Alternatively, a plurality of accelerator pedal sensors 500 are provided such that the driver's demand can be detected by at least one of the accelerator pedal sensors 500.

As a result, the vehicle motion control can be continued.

In the event of a failure of the sensor 550, the operation amount generating node 100 continues the vehicle motion control in accordance with the vehicle status signal 201 obtained in a normal manner and the driver's demand signal 200 obtained from the sensor 500.

With this embodiment, as described above, since the operation amount generating node 100 and the actuator driving nodes 300 back up mutually, there is no need of adding a redundant backup system.

If the operation amount generating node 100 is failed, the actuator driving nodes 300 execute respective control processes independently of one another.

To that end, the actuator driving nodes 300 are each required to be able to detect the failure of the operation amount generating node 100. It is also required that, even when a part of the actuator driving nodes 300 is failed in addition to the vehicle motion integrated control ECU 30, the vehicle can stably be controlled with the remaining actuator driving nodes 300. In particular, if there occurs a difference between the braking forces applied from the brakes for the left and right wheels, the vehicle is apt to spin under the braking in an unbalanced state.

An example of respective operations of the operation amount generating node 100 and the actuator driving node 300 to avoid such a risky state will be described below with reference to FIGS. 45 through 57. A description of those operations is made of, by way of example, brake control.

The operation amount generating node 100 repeatedly executes a brake control process at a certain control period (A). The control period is decided depending on a degree of accuracy required for the brake control in the vehicle. On the other hand, as described in detail below, each of the actuator driving nodes 300 repeatedly executes the braking force control of the actuator 400 at a control period (B) shorter than the control period (A) set for the operation amount generating node 100. The reason is that the actuator 400 requires higher accuracy in a current feedback control.

Accordingly, while the operation amount generating node 100 executes a series of processing steps at the control period (A), each actuator driving node 300 repeatedly executes the braking force control at the control period (B) in accordance with the latest operation amount command value 120, and the braking force control is not interrupted by, e.g., a communication process with respect to the operation amount generating node 100.

Figure 45:
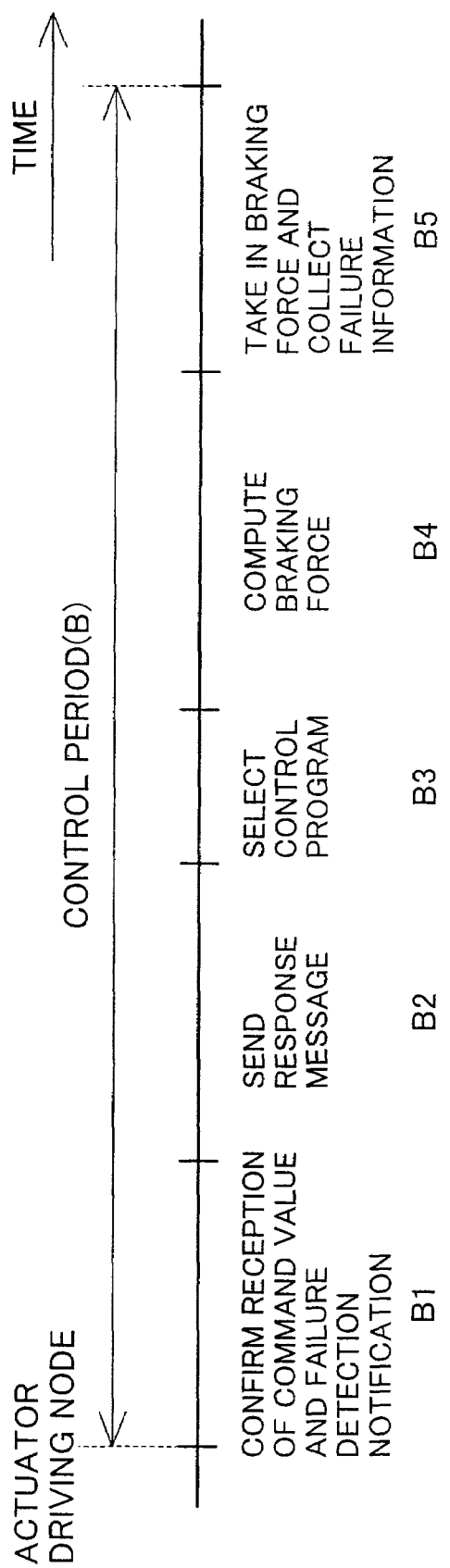
FIG. 45 is a time chart showing the operation of the actuator driving node.

FIG. 45 is a time chart showing the operation of the actuator driving node 300. The horizontal axis represents the lapse of time in a direction from the left to the right. Each actuator driving node 300 repeatedly executes the following process at the control period (B).

First, the actuator driving node 300 confirms whether it has received the operation amount command value 120 or the failure detection notification 230 from the operation amount generating node 100 and the driver's demand signal 200 from the sensor 500 (B1: confirmation of reception of the command value and the failure detection notification). Because those items are sent at intervals of the control period (A), it is possible to confirm the reception of the operation amount command value 120 and the driver's demand signal 200 by using a timer that measures the time of the control period (A). As an alternative, the reception of the operation amount command value 120 and the driver's demand signal 200 can also be confirmed by employing a network of the time division multiple access (TDMA) type, and sending and receiving those items in predetermined time slots.

Then, the actuator driving node 300 sends the braking force of the actuator 400 finally detected in the preceding control period and the diagnosis result of the failure detecting function 210C to the operation amount generating node 100 and the other actuator driving node(s) 300 (B2: sending of a response message). At this time, when the actuator driving node 300 does not receive the operation amount command value 120 in routine of B1 (confirmation of reception of the command value and the failure detection notification) and recognizes the non-reception of the operation amount command value 120 as the failure detection notification 230, it further acknowledges the reception of the failure detection notification 230 together. Those items are sent as one response message in the collected form.

Then, the actuator driving node 300 selects the control program based on the presence or absence of reception of the operation amount command value 120, the presence or absence of reception of the failure detection notification 230, the presence or absence of a failure of the actuator 400 and in itself, as well as the presence or absence of a response message from the other actuator driving node 300 and the contents of the response message (B3: selection of the control program). The control program includes the control program (X) for executing the braking force control in accordance with the operation amount command value 120, the control program (Y) for executing the braking force control in accordance with the driver's demand signal 200, and the control program (Z) for releasing the brakes regardless of the operation amount command value 120 and the driver's demand signal 200. One of these control programs is selected.

Figure 46:
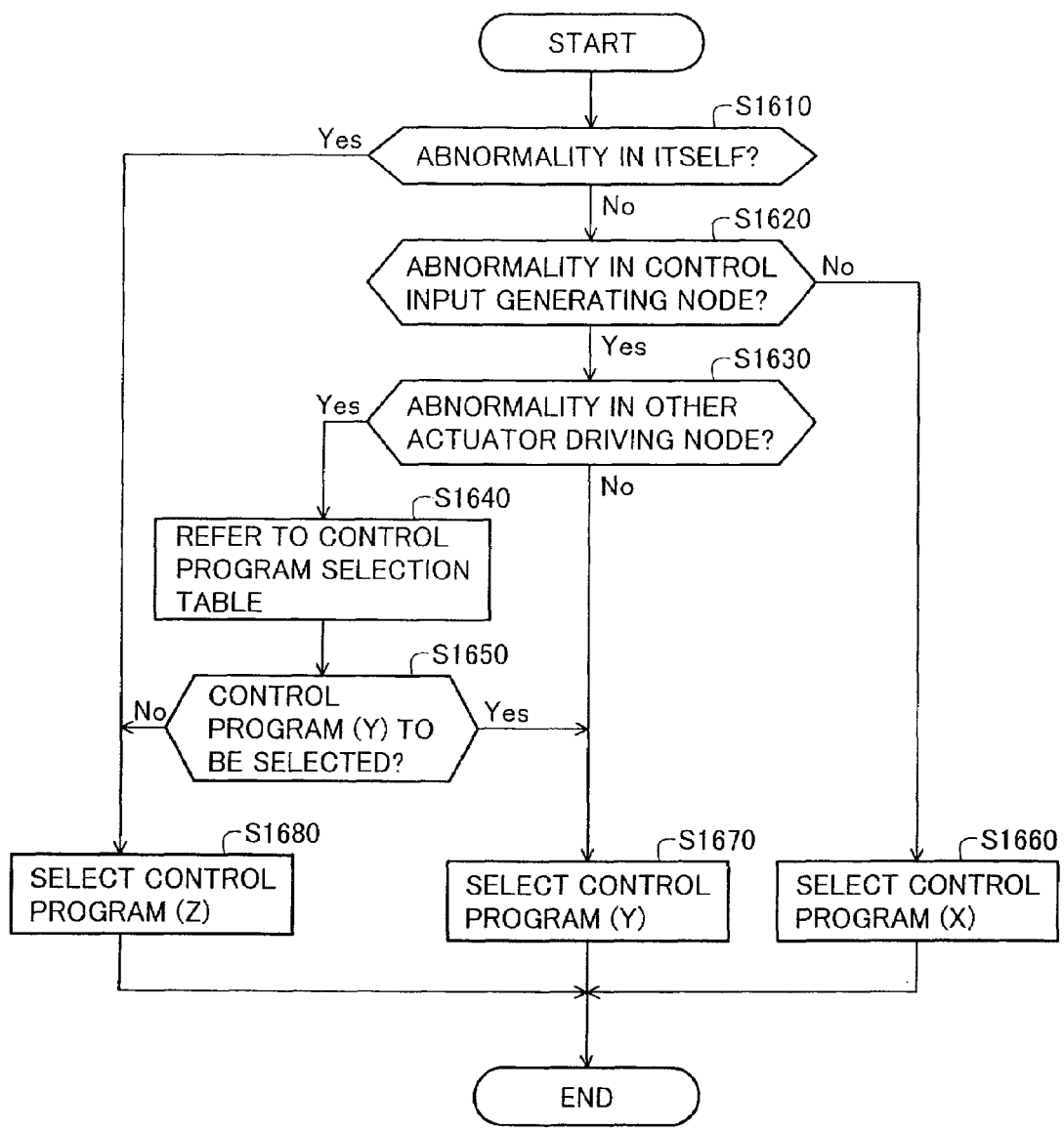
FIG. 46 is a flowchart showing a control program selection process.

That control program selection routine (B3) will be described with reference to a flowchart of FIG. 46.

First, the occurrence of an abnormality in the relevant actuator driving node 300 itself or the associated actuator 400 is determined based on conditions given below (step S1610).

Condition 1: a failure is detected as a result of diagnosis on itself or the actuator.

Condition 2: when the relevant actuator driving node 300 has received the failure detection notification 230 from the operation amount generating node 100, the other two or more actuator driving nodes 300 response that they have not received the failure detection notification 230.

Condition 3: when the relevant actuator driving node 300 has not received the failure detection notification 230 from the operation amount generating node 100, the other two or more actuator driving nodes 300 response that they have received the failure detection notification 230.

Condition 4: when the relevant actuator driving node 300 has received the operation amount command value 120 from the operation amount generating node 100, the other two or more actuator driving nodes 300 response that they have not received the operation amount command value 120.

Condition 5: when the relevant actuator driving node 300 has not received the operation amount command value 120 from the operation amount generating node 100, the other two or more actuator driving nodes 300 response that they have received the operation amount command value 120.

If at least one of the above conditions 1 through 5 is satisfied, the actuator driving node 300 determines its own abnormal state and selects the control program (Z), thereby releasing the brakes (step S1680).

Then, the occurrence of an abnormality in the operation amount generating node 100 is determined based on conditions given below (step S1620).

Condition 6: the relevant actuator driving node 300 has received the failure detection notification 230 from the operation amount generating node 100, and the other two or more actuator driving nodes 300 response that they have also received the failure detection notification 230.

Condition 7: the relevant actuator driving node 300 has not received the operation amount command value 120 from the operation amount generating node 100, and the other two or more actuator driving nodes 300 response that they have also not received the operation amount command value 120.

If neither the condition 6 nor the condition 7 is satisfied, the actuator driving node 300 determines that the operation amount generating node 100 is normal. Then, the node 300 selects the control program (X) (step S1660) to execute the braking force control in accordance with the operation amount command value 120.

On the other hand, if at least one of the conditions 6 and 7 is satisfied, the actuator driving node 300 determines that the operation amount generating node 100 is abnormal. Then, the node 300 determines the occurrence of an abnormality in the other actuator driving node 300 or the associated actuator 400 based on conditions given below (step S1630).

Condition 8: any other actuator driving node 300 notifies the occurrence of a failure.

Condition 9: the other one actuator driving node 300 sends no response message.

Condition 10: when the relevant actuator driving node 300 has received the failure detection notification 230 from the operation amount generating node 100, only the other one actuator driving node 300 responses that it has not received the failure detection notification 230.

Condition 11: when the relevant actuator driving node 300 has not received the failure detection notification 230 from the operation amount generating node 100, only the other one actuator driving node 300 responses that it has received the failure detection notification 230.

Condition 12: when the relevant actuator driving node 300 has received the operation amount command value 120 from the operation amount generating node 100, only the other one actuator driving node 300 responses that it has not received the operation amount command value 120.

Condition 13: when the relevant actuator driving node 300 has not received the operation amount command value 120 from the operation amount generating node 100, only the other one actuator driving node 300 responses that it has received the operation amount command value 120.

If none of the conditions 8 through 13 is satisfied, the relevant actuator driving node 300 determines that the other actuator driving nodes 300 and the associated actuators 400 are normal. Then, the node 300 selects the control program (Y) (step S1670) to execute the braking force control in accordance with the driver's demand signal 200.

On the other hand, if at least one of the conditions 8 through 13 is satisfied, the relevant actuator driving node 300 determines that the other actuator driving node 300 or the associated actuator 400 is abnormal. Then, the node 300 refers to a later-described control program selection table (step S1640) and selects the control program (Y) or (Z) (step S1650), thereby avoiding the braking in an unbalanced state.

As described above, the actuator driving node 300 determines, based on the conditions 1 through 13, the occurrence of an abnormality in itself or the associated actuator 400, the occurrence of an abnormality in the operation amount generating node 100, and the occurrence of an abnormality in the other actuator driving node 300 or the associated actuator 400, followed by selecting the control program.

Because the above conditions depend on detailed specifications of the vehicle system and its components, they may be modified corresponding to the specifications in practical use.

Also, instead of determining the occurrence of an abnormality immediately upon detecting the non-reception of the operation amount command value 120 or the relevant failure detection notification 230 from the operation amount generating node 100, the occurrence of an abnormality may be determined when the non-reception has been confirmed two or more times. In this case, the number of times of the non-reception may be coincident among the actuator driving nodes 300 by exchanging the data indicative of the number of times of the non-reception among the actuator driving nodes 300 and making the majority decision on values of the exchanged data.

FIGS. 47A and 47B each show a control program selection table.

The table shown in FIG. 47A is used in the case of selecting the control program so as to brake the vehicle by using, of the four wheel brakes, the brakes of two front or rear wheels when the other actuator driving node 300 or the associated actuator 400 is abnormal.

On the other hand, the table shown in FIG. 47B is used in the case of selecting the control program so as to brake the vehicle by using, of the four wheel brakes, the brakes of one front wheel and one rear wheel in diagonal relation when the other actuator driving node 300 or the associated actuator 400 is abnormal.

Those tables are premised on that, when the vehicle cannot be braked by using the brake for any of two front or rear wheels or any of one front wheel and one rear wheel in diagonal relation, the brakes applied from all the actuators 400 are released and the driver brakes the vehicle through the hydraulic mechanism.

Even in such a case, brake may of course be applied to the vehicle from the remaining normal actuators 400.

In the absence of the hydraulic backup mechanism, even when the vehicle cannot be braked by using the brake for any of two front or rear wheels or any of one front wheel and one rear wheel in diagonal relation, brake must be applied to the vehicle from the remaining normal actuators 400. In this case, preferably, the engine revolution speed is controlled to reduce the vehicle speed so that the influence of the braking in an unbalanced state is suppressed.

Returning to FIG. 45, after the completion of the control program selection, the actuator driving node 300 computes the braking force and executes the brake control (B4). Thereafter, it takes in the actual braking force and collects failure information (B5).

FIG. 48 is a time chart showing the operations of the operation amount generating node 100 and the actuator driving node 300 at the start timing of brake control. The horizontal axis represents the lapse of time in a direction from the left to the right.

First, upon detecting the step-down of the brake pedal by the driver, the operation amount generating node 100 sends a braking start notification to the actuator driving nodes 300 for the four wheels (1810).

Upon receiving the braking start notification, each of the actuator driving nodes 300 executes self-diagnosis on its own failure and failure diagnosis on the actuator 400 with the failure detecting function 210C (1820), and it sends the diagnosis result as a response message to the operation amount generating node 100 (1830). Each actuator driving node 300 receives the diagnosis results sent from the other actuator driving nodes 300 via mutual communication.

The operation amount generating node 100 receives the diagnosis results from the actuator driving nodes 300 and selects the wheels to be subjected to the brake control depending on the presence or absence of a failed node and the position of the failed node (1840). If any actuator driving node 300 has not sent the diagnosis result, that node is regarded as being failed. Alternatively, the braking start notification may be sent again for prompting the actuator driving nodes 300 to send the diagnosis results once more or several more times.

The operation amount generating node 100 computes the target operation amount for each of the wheels to be subjected to the brake control (1850), and sends the operation amount command value 120 to the corresponding actuator driving node 300 (1860).

Upon receiving the operation amount command value 120, each actuator driving node 300 updates a target value of the braking force control and executes the braking force control of the actuator 400 (1870).

Also, each actuator driving node 300 sends the results of detection of the braking force applied from the actuator 400 and periodic diagnosis with the failure detecting function 210C, as a response message, to the operation amount generating node 100 at a constant period (1880). At this time, each actuator driving node 300 receives the detection and diagnosis results sent from the other actuator driving nodes 300 via mutual communication.

Figure 49:
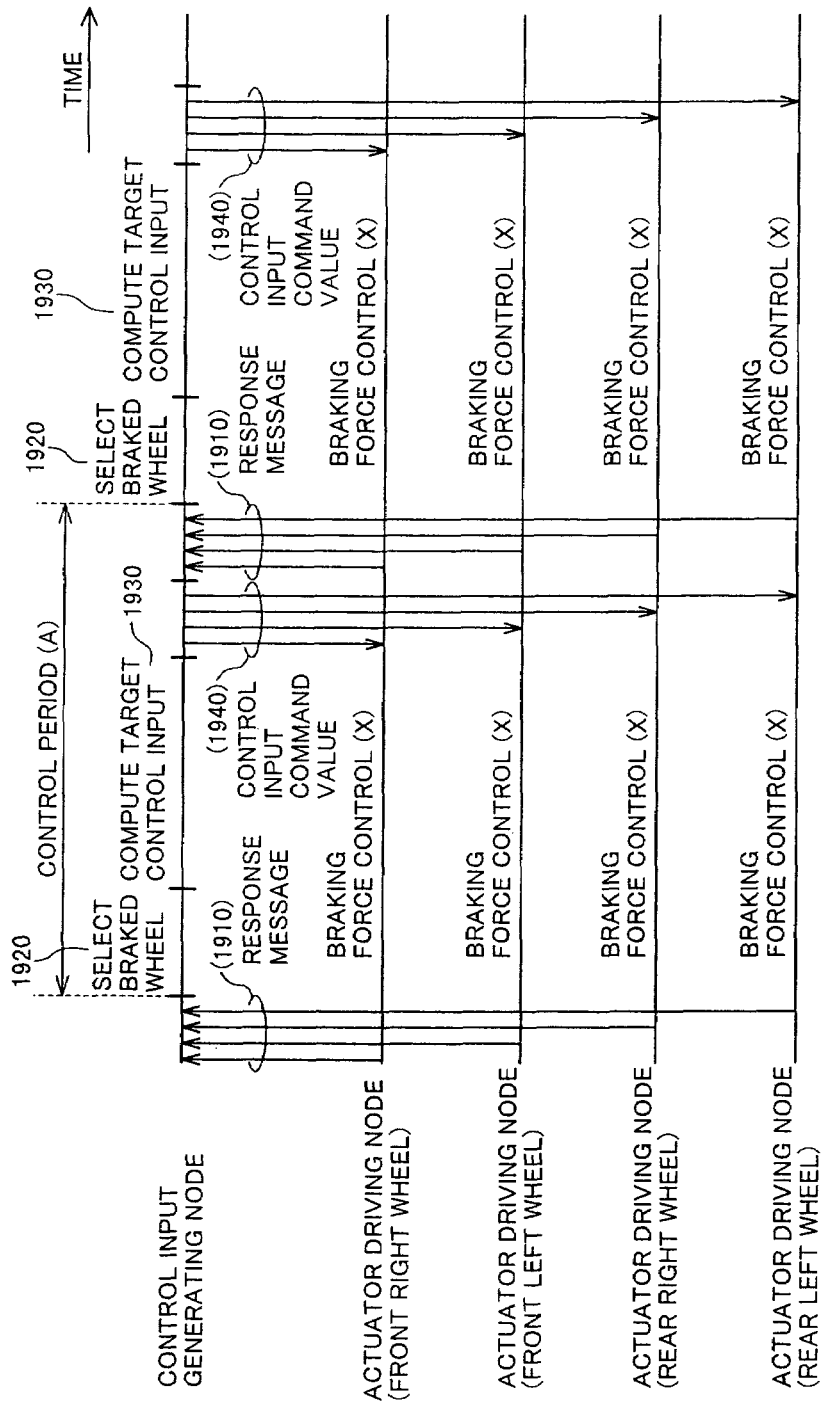
FIG. 49 is a time chart showing the operations of the operation amount generating node and the actuator driving node during the brake control.

FIG. 49 is a time chart showing the operations of the operation amount generating node 100 and the actuator driving node 300 during the brake control. The horizontal axis represents the lapse of time in a direction from the left to the right.

The operation amount generating node 100 executes a series of processing steps given below per control period (A).

First, the operation amount generating node 100 receives the response message from each actuator driving node 300 (1910). By referring to the failure diagnosis result of each actuator driving node 300, which is contained in the response message, the operation amount generating node 100 confirms the presence or absence of an abnormality and the position of the abnormality in each actuator driving node 300 and the actuator 400, and selects the actuator driving nodes 300 to be subjected to the brake control (1920).

Then, the operation amount generating node 100 computes the target operation amount for each of the wheels to be subjected to the brake control (1930), and sends the operation amount command value 120 to the corresponding actuator driving node 300 (1940).

In FIG. 49, the brake control is started after the operation amount generating node 100 has detected the step-down of the brake pedal by the driver and has sent the braking start notification to the actuator driving nodes 300 for the four wheels. By regarding that the presence or absence of the step-down of the brake pedal by the driver represents a difference in amount of the driver's demand, however, the operation amount generating node 100 may always repeatedly execute the series of processing steps at the control period (A), as shown in FIG. 49, regardless of the presence or absence of the step-down of the brake pedal by the driver.

Figure 50:
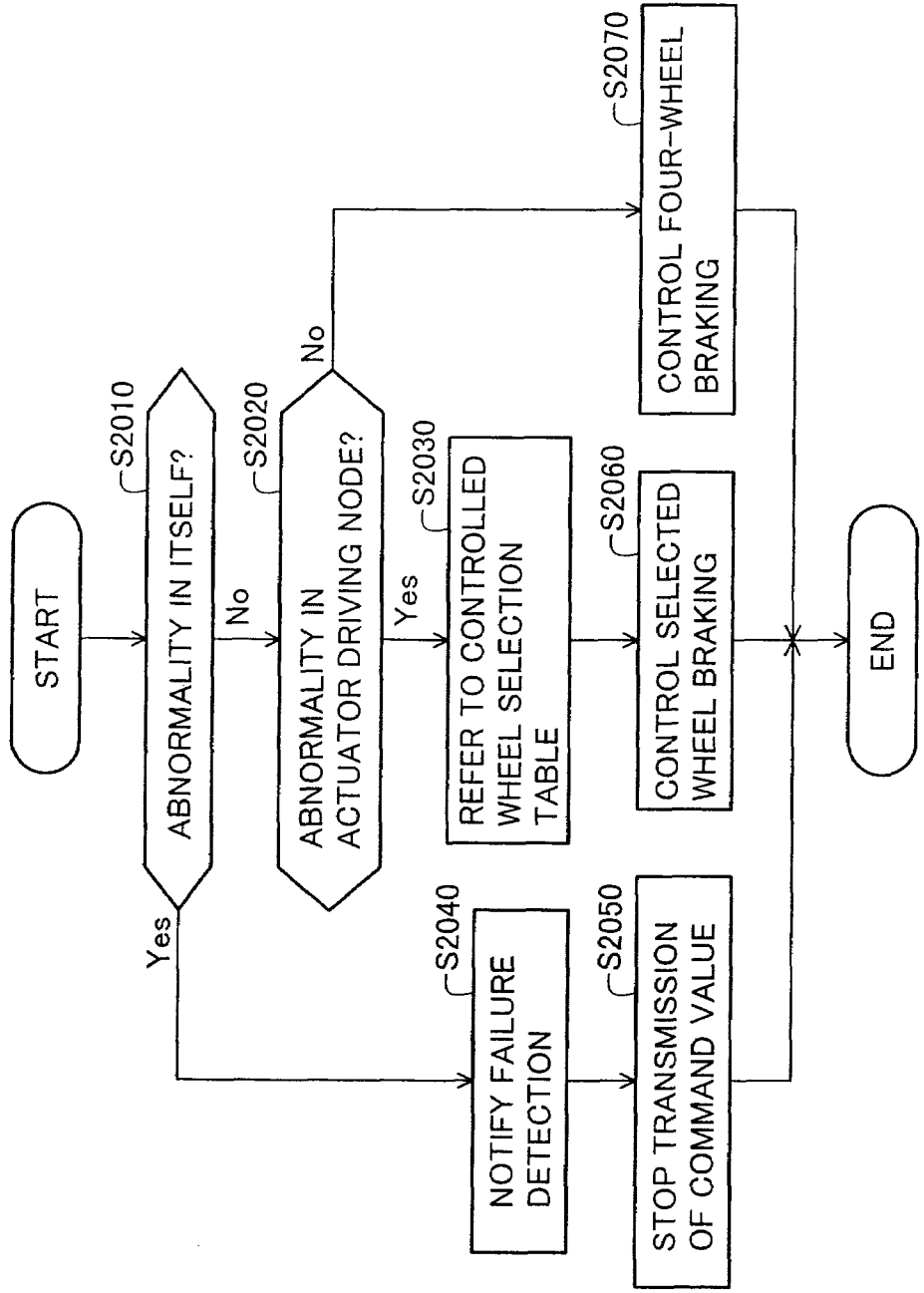
FIG. 50 is a flowchart showing a process for selecting wheels on which the brake control is to be executed.

FIG. 50 is a flowchart showing a process for selecting wheels on which the brake control is to be executed.

First, the operation amount generating node 100 determines the occurrence of an abnormality in itself or based on conditions given below (step S2010).

Condition 1: a failure is detected as a result of self-diagnosis with the failure detecting function 210B.

Condition 2: the operation amount generating node 100 does not receive the response messages from the three or more actuator driving nodes 300.

If at least one of the above conditions 1 and 2 is satisfied, the operation amount generating node 100 determines itself being abnormal. Then, the node 100 sends the failure detection notification 230 to the actuator driving nodes 300 (step S2040) and stops the transmission of the operation amount command value 120 (step S2050).

On the other hand, if neither the condition 1 nor the condition 2 is satisfied, the operation amount generating node 100 determines itself being normal and then determines the occurrence of an abnormality in the actuator driving nodes 300 or the actuators 400 based on conditions given below (step S2020).

Condition 3: the operation amount generating node 100 receives the failure detection notification 230 from any actuator driving node 300.

Condition 4: the operation amount generating node 100 does not receive the response message from the two or less actuator driving node 300.

If neither the condition 3 nor the condition 4 is satisfied, the operation amount generating node 100 determines that all of the actuator driving nodes 300 and the actuators 140 are normal. Then, the node 100 executes the braking force control for all the four wheels (step S2070).

On the other hand, if at least one of the conditions 3 and 4 is satisfied, the operation amount generating node 100 determines that any actuator driving node 300 or the associated actuator 400 is abnormal. Then, the node 100 refers to a later-described braked wheel selection table (step S2030), and executes the braking force control with the selected wheels (step S2060), thereby avoiding the braking in an unbalanced state.

As described above, the operation amount generating node 100 determines, based on the conditions 1 through 4, the occurrence of an abnormality in itself and the occurrence of an abnormality in any actuator driving node 300 or the associated actuator 400. If the operation amount generating node 100 is normal, it executes the brake control so as to avoid the braking in an unbalanced state by using the normal actuator driving nodes 300. If the operation amount generating node 100 is abnormal itself, it stops the brake control for transition to the autonomous brake control with the actuator driving nodes 300.

Because the above conditions depend on detailed specifications of the vehicle system and its components, they may be modified corresponding to the specifications in practical use. Also, instead of determining the occurrence of an abnormality immediately upon detecting the non-reception of the response message from any actuator driving node 300, the occurrence of an abnormality may be determined when the non-reception has been confirmed two or more times.

FIGS. 51A and 51B each show a braked wheel selection tables.

The table shown in FIG. 51A is used in the case of selecting the braked wheels so as to brake the vehicle by using, of the four wheel brakes, the brakes of two front or rear wheels when any actuator driving node 300 or the associated actuator 400 is abnormal.

On the other hand, the table shown in FIG. 51B is used in the case of selecting the braked wheels so as to brake the vehicle by using, of the four wheel brakes, the brakes of one front wheel and one rear wheel in diagonal relation when any actuator driving node 300 or the associated actuator 400 is abnormal.

Those tables are premised, though not shown, on that, when the vehicle cannot be braked by using the brake for any of two front or rear wheels or any of one front wheel and one rear wheel in diagonal relation, the operation amount generating node 100 computes the operation amount command value 120 so as to release the brakes applied from all the actuators 400, and the driver brakes the vehicle through the hydraulic mechanism.

Even in such a case, the operation amount command value 120 may of course be computed so that brake is applied to the vehicle from the remaining normal actuators 400.

In the absence of the hydraulic backup mechanism, even when the vehicle cannot be braked by using the brake for any of two front or rear wheels or any of one front wheel and one rear wheel in diagonal relation, brake must be applied to the vehicle from the remaining normal actuators 400. In this case, preferably, the engine revolution speed is controlled to reduce the vehicle speed so that the influence of the braking in an unbalanced state is suppressed.

Figure 52:
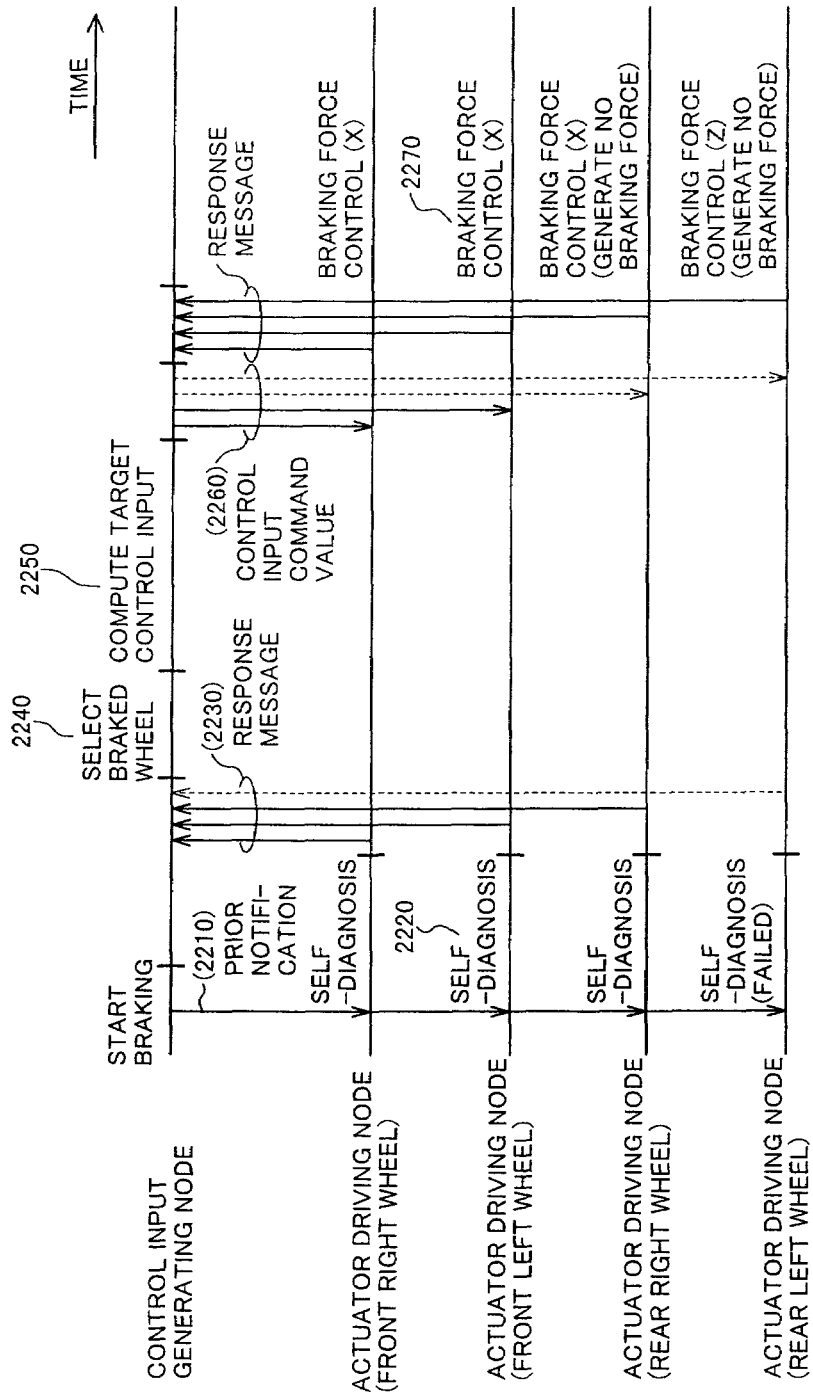
FIG. 52 is a time chart showing the operations of the operation amount generating node and the actuator driving node when the actuator driving node or an actuator for a rear left wheel is failed at the start timing of the brake control.

FIG. 52 is a time chart showing the operations of the operation amount generating node 100 and the actuator driving node 300 when the actuator driving node 300 or the actuator 400 for the rear left wheel is failed at the start timing of the brake control. The horizontal axis represents the lapse of time in a direction from the left to the right.

This time chart is premised on that the operation amount generating node 100 selects the wheels, on which the braking force control is executed, by referring to the braked wheel selection table shown in FIG. 51A.

First, upon detecting the step-down of the brake pedal by the driver, the operation amount generating node 100 sends a braking start notification to the actuator driving nodes 300 for the four wheels (2210).

Upon receiving the braking start notification, each of the actuator driving nodes 300 executes self-diagnosis on its own failure and failure diagnosis on the actuator 400 with the failure detecting function 210C (2220), and it sends the diagnosis result as a response message to the operation amount generating node 100 (2230). At this time, the actuator driving node 300 for the rear left wheel issues a response message to notify the operation amount generating node 100 of that a failure has been detected. Additionally, each actuator driving node 300 receives the diagnosis results sent from the other actuator driving nodes 300 via mutual communication.

The operation amount generating node 100 receives the diagnosis results from the actuator driving nodes 300, detects the failure of the actuator driving node 300 for the rear left wheel, and selects the wheels such that the brake control is executed with the two front wheels (2240).

The operation amount generating node 100 computes the target operation amounts for the two front wheels (2250). Further, the node 100 sends the operation amount command values 120 to the actuator driving nodes 300 for the two front wheels, and also sends the operation amount command values 120 to the actuator driving nodes 300 for the two rear wheels in order to command release of the braking forces (2260).

Upon receiving the operation amount command value 120, each of the actuator driving nodes 300 for the two front wheels updates a target value of the braking force control and executes the braking force control of the actuator 400. Also, upon receiving the operation amount command value 120, the actuator driving node 300 for the rear right wheel similarly updates a target value of the braking force control and executes the braking force control of the actuator 400. However, that node 300 does not actually generate the braking force because the received operation amount command value 120 has a value commanding release of the braking force.

On the other hand, the actuator driving node 300 for the rear left wheel selects the control program (Z) as a result of detecting its own failure, and therefore does not produce the braking force (2270).

Figure 53:
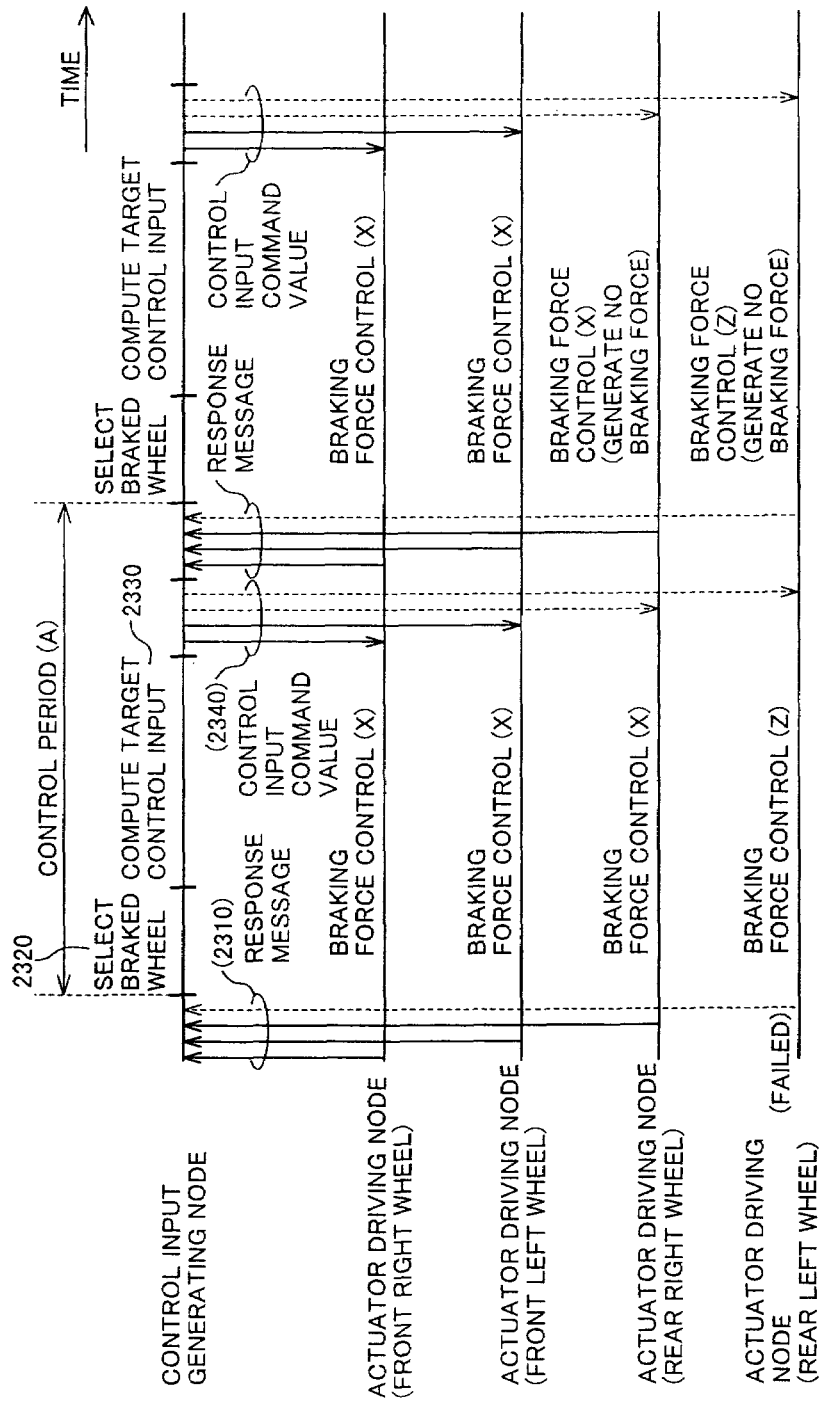
FIG. 53 is a time chart showing the operations of the operation amount generating node and the actuator driving node when the actuator driving node or the actuator for the rear left wheel is failed during the brake control.

FIG. 53 is a time chart showing the operations of the operation amount generating node 100 and the actuator driving node 300 when the actuator driving node 300 or the actuator 400 for the rear left wheel is failed during the brake control. The horizontal axis represents the lapse of time in a direction from the left to the right.

This time chart is premised on that the operation amount generating node 100 selects the wheels, on which the braking force control is executed, by referring to the braked wheel selection table shown in FIG. 51A.

First, the operation amount generating node 100 receives the response message from each actuator driving node 300. By referring to the failure diagnosis result of each actuator driving node 300, which is contained in the response message, the operation amount generating node 100 detects the occurrence of a failure in the actuator driving node 300 for the rear left wheel (2310), and selects the wheels such that the brake control is executed with the two front wheels (2320).

Then, the operation amount generating node 100 computes the target operation amount for each of the wheels to be subjected to the brake control (2330). Further, the node 100 sends the operation amount command values 120 to the actuator driving nodes 300 for the two front wheels, and also sends the operation amount command values 120 to the actuator driving nodes 300 for the two rear wheels in order command release of the braking forces (2340).

Upon receiving the operation amount command value 120, each of the actuator driving nodes 300 for the two front wheels updates a target value of the braking force control and executes the braking force control of the actuator 400. Also, upon receiving the operation amount command value 120, the actuator driving node 300 for the rear right wheel similarly updates a target value of the braking force control and executes the braking force control of the actuator 400. However, that node 300 does not actually generate the braking force because the received operation amount command value 120 has a value commanding release of the braking force.

On the other hand, the actuator driving node 300 for the rear left wheel selects the control program (Z) as a result of detecting its own failure, and therefore does not produce the braking force.

As described above with reference to FIGS. 52 and 53, if any actuator driving node 300 or the associated actuator 400 is failed, the operation amount generating node 100 generates the operation amount command values 120 so that the vehicle is braked using the normal actuator driving nodes 300 for the two front or rear wheels. Even in that case, therefore, the vehicle can be avoided from being affected by the braking in an unbalanced state.

Figure 54:
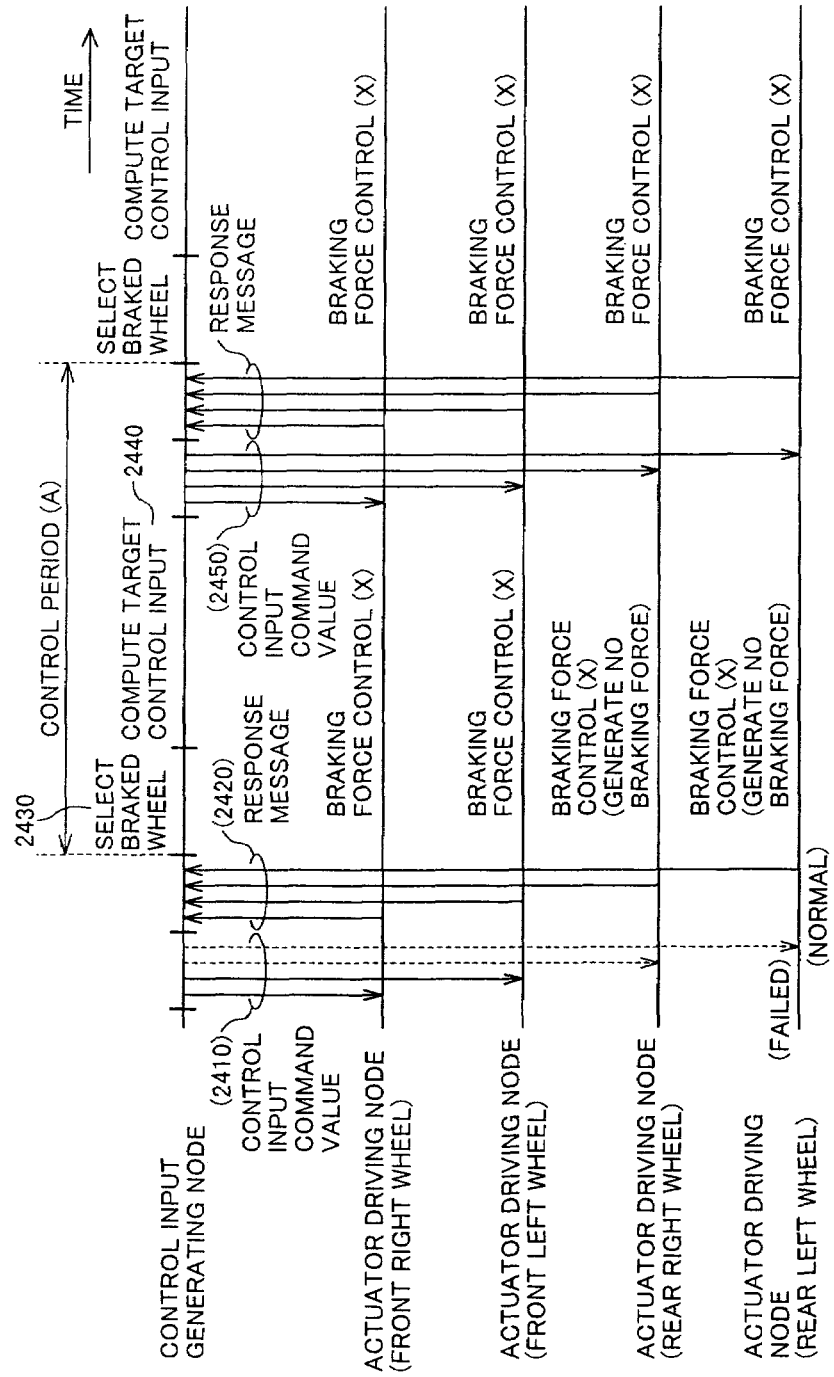
FIG. 54 is a time chart showing the operations of the operation amount generating node and the actuator driving node when the actuator driving node or an actuator for the rear left wheel, which has been temporarily failed, is recovered to the normal state during the brake control.

FIG. 54 is a time chart showing the operations of the operation amount generating node 100 and the actuator driving node 300 when the actuator driving node 300 or the actuator 400 for the rear left wheel, which has been temporarily failed, is recovered to the normal state during the brake control. The horizontal axis represents the lapse of time in a direction from the left to the right.

This time chart is premised on that the operation amount generating node 100 selects the wheels, on which the braking force control is executed, by referring to the braked wheel selection table shown in FIG. 51A.

Because the actuator driving node 300 for the rear left wheel is failed, the operation amount generating node 100 selects the wheels such that the brake control is executed with the two front wheels. Then, the node 100 sends the operation amount command values 120 to the actuator driving nodes 300 for the two front wheels, and also sends the operation amount command values 120 to the actuator driving nodes 300 for the two rear wheels in order to command release of the braking forces (2410).

Each of the actuator driving nodes 300 executes self-diagnosis on its own failure and failure diagnosis on the actuator 400 with the failure detecting function 210C, and it sends the diagnosis result as a response message to the operation amount generating node 100 (2420). At this time, when the actuator driving node 300 for the rear left wheel is recovered from the failed state, it switches over the control program from (Z) to (X), and maintains the braking force in the released state in accordance with the operation amount command value 120 to command release of the braking force. Also, the node 300 sends a response message to notify the operation amount generating node 100 of that the failure has been eliminated. Additionally, each actuator driving node 300 receives the diagnosis results sent from the other actuator driving nodes 300 via mutual communication.

The operation amount generating node 100 receives the diagnosis results from the actuator driving nodes 300, detects the restoration of the actuator driving node 300 for the rear left wheel from the failed state, and selects the wheels such that the brake control is executed with the four wheels (2430).

The operation amount generating node 100 computes the target operation amounts for the four front wheels (2440), and sends the operation amount command values 120 to the actuator driving nodes 300 for the four wheels (2450).

Upon receiving the operation amount command value 120, each of the actuator driving nodes 300 for the two front wheels updates a target value of the braking force control and executes the braking force control of the actuator 400. Also, upon receiving the new operation amount command value 120, the actuator driving node 300 for the rear right wheel updates a target value of the braking force control and executes the braking force control of the actuator 400. Similarly, upon receiving the new operation amount command value 120, the actuator driving node 300 for the rear left wheel updates a target value of the braking force control and executes the braking force control of the actuator 400.

As described above with reference to FIG. 54, even when the actuator driving node 300 or the actuator 400 having been temporarily failed is recovered to the normal state, the vehicle can be recovered to the normal control state without causing the braking in an unbalanced state because the operation amount generating node 100 generates the operation amount command values 120 depending on whether the actuator driving nodes 300 or the actuator 400 is normal or abnormal.

Figure 55:
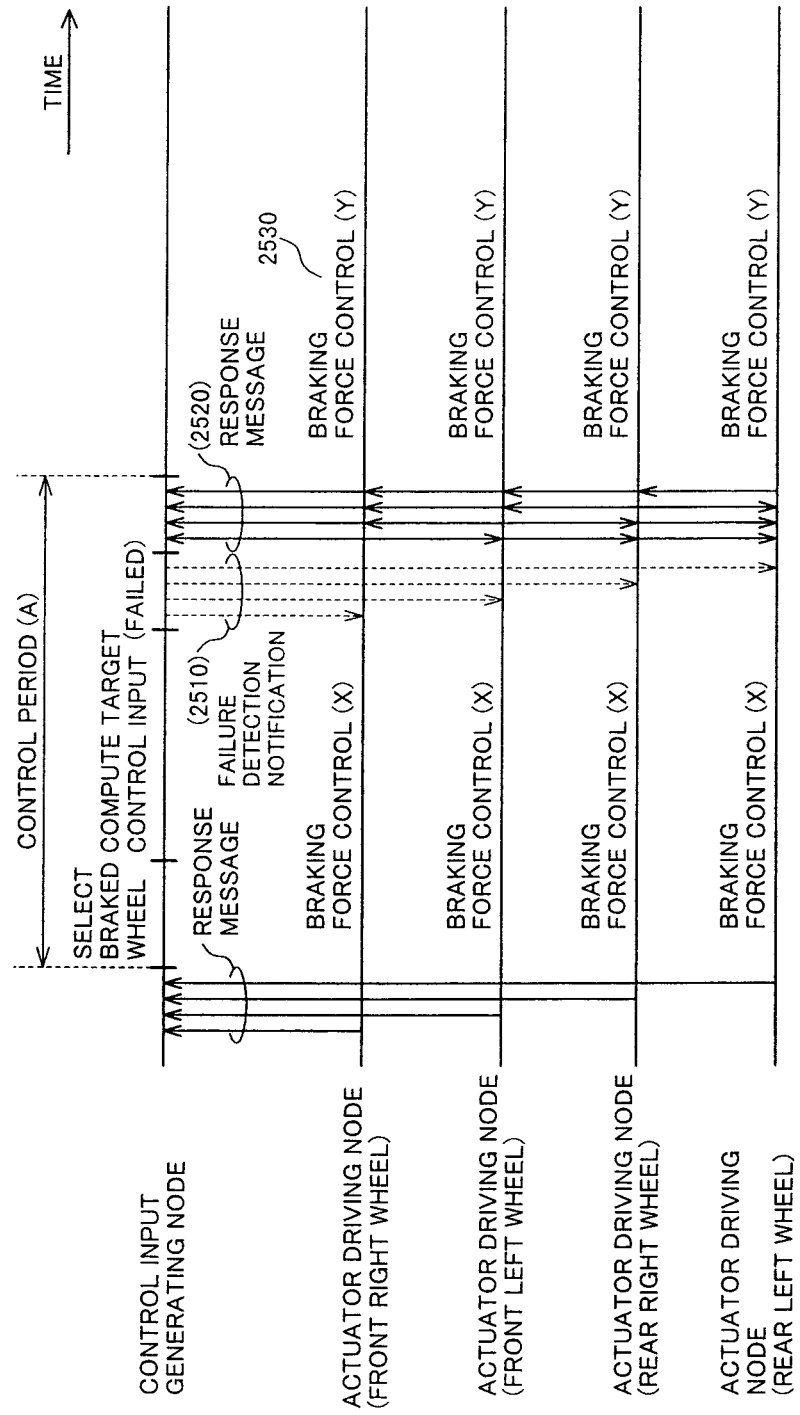
FIG. 55 is a time chart showing the operation of the actuator driving node when the operation amount generating node is failed during the brake control.

FIG. 55 is a time chart showing the operation of the actuator driving node 300 when the operation amount generating node 100 is failed during the brake control. The horizontal axis represents the lapse of time in a direction from the left to the right.

This time chart is premised on that the actuator driving node 300 selects the control program based on the control program selection table shown in FIG. 47A.

Upon detecting a failure with the failure detecting function 210B, the operation amount generating node 100 stops the transmission of the operation amount command value 120 and sends the failure detection notification 230 (2510).

Upon receiving the failure detection notification 230, each of the actuator driving nodes 300 sends a response message and confirms the reception of the failure detection notification 230 via mutual communication, thereby determining that the operation amount generating node 100 is abnormal (2520).

After determining that the operation amount generating node 100 is abnormal, each actuator driving node 300 switches over the control program from (X) to (Y) so that the braking force control is executed in accordance with the driver's demand signal 200.

As described above with reference to FIG. 55, if the operation amount generating node 100 is failed, each actuator driving node 300 confirms the occurrence of a failure in the operation amount generating node 100 via mutual communication, and all the actuator driving nodes 300 switch over the control program so as to brake the vehicle in accordance with the driver's demand signal 200. Even in that case, therefore, the brake control of the vehicle can be maintained.

Figure 56:
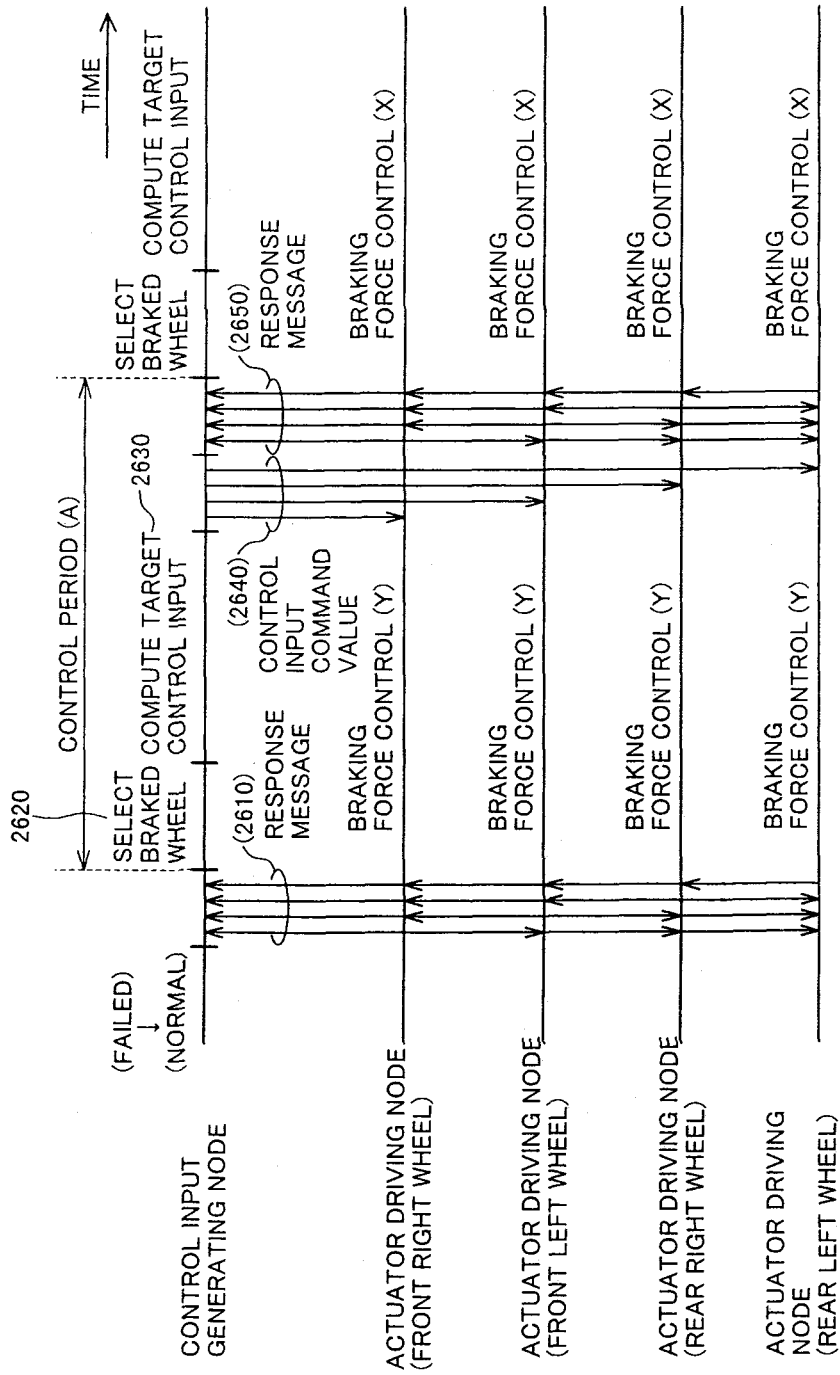
FIG. 56 is a time chart showing the operation of the operation amount generating node and the actuator driving node when the operation amount generating node, which has been temporarily failed, is recovered to the normal state during the brake control.

FIG. 56 is a time chart showing the operation of the operation amount generating node 100 and the actuator driving node 300 when the operation amount generating node 100, which has been temporarily failed, is recovered to the normal state during the brake control. The horizontal axis represents the lapse of time in a direction from the left to the right.

This time chart is premised on that the actuator driving node 300 selects the control program based on the control program selection table shown in FIG. 47A.

Because the operation amount generating node 100 is failed, each of the actuator driving nodes 300 executes the braking force control in accordance with the driver's demand signal 200 by using the control program (Y).

When the operation amount generating node 100 is recovered from the failed state, it receives the response message from each actuator driving node 300 (2610). By referring to the failure diagnosis result of each actuator driving node 300, which is contained in the response message, the operation amount generating node 100 confirms the presence or absence of an abnormality and the position of the abnormality in each actuator driving node 300 and the actuator 400, and selects the actuator driving nodes 300 to be subjected to the brake control (2620).

Then, the operation amount generating node 100 computes the target operation amount for each of the wheels to be subjected to the brake control (2630), and sends the operation amount command value 120 to the corresponding actuator driving node 300 (2640). At this time, the operation amount generating node 100 may send a failure recovery notification together to notify each actuator driving node 300 of that the failure has been eliminated.

Upon receiving the operation amount command value 120, each actuator driving node 300 sends a response message and confirms the reception of the operation amount command value 120 via mutual communication, thereby determining that the operation amount generating node 100 is normal (2650). At this time, the reception of the failure recovery notification may be used to determine whether the operation amount generating node 100 is normal.

After determining that the operation amount generating node 100 is normal, each actuator driving node 300 switches over the control program from (Y) to (X) so that the braking force control is executed in accordance with the operation amount command value 120.

As described above with reference to FIG. 56, even when the operation amount generating node 100 having been temporarily failed is recovered to the normal state, the vehicle can be recovered to the normal control state without causing the braking in an unbalanced state because each actuator driving node 300 switches over the control program depending on whether the operation amount generating node 100 is normal or abnormal.

Figure 57:
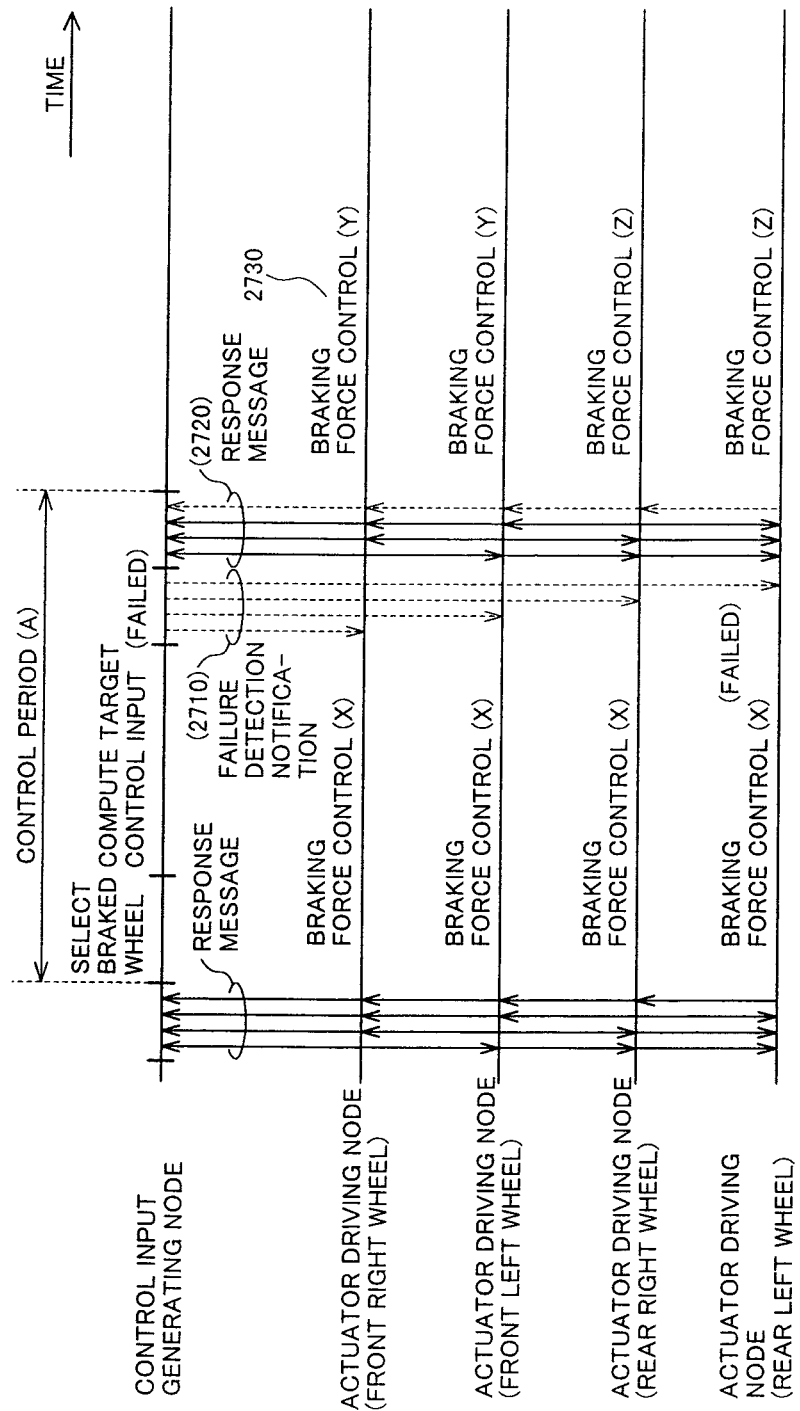
FIG. 57 is a time chart showing the operation of the actuator driving node when the operation amount generating node and the actuator driving node or the actuator for the rear left wheel are failed during the brake control.

FIG. 57 is a time chart showing the operation of the actuator driving node 300 when the operation amount generating node 100 and the actuator driving node 300 or the actuator 400 for the rear left wheel are failed during the brake control. The horizontal axis represents the lapse of time in a direction from the left to the right.

This time chart is premised on that the actuator driving node 300 selects the control program based on the control program selection table shown in FIG. 47A.

Upon detecting a failure with the failure detecting function 210B, the operation amount generating node 100 stops the transmission of the operation amount command value 120 and sends the failure detection notification 230 (2710). On the other hand, upon detecting a failure with the failure detecting function 210C, the actuator driving node 300 for the rear left wheel switches over the control program from (X) to (Z).

Upon receiving the failure detection notification 230, each of the actuator driving nodes 300 sends a response message and confirms the reception of the failure detection notification 230 via mutual communication. At this time, the failed actuator driving node 300 for the rear left wheel issues the response message to notify the other actuator driving nodes 300 of that the failure has been detected therein (2720)

Responsively, each of the other actuator driving nodes 300 determines that the operation amount generating node 100 and the actuator driving node 300 for the rear left wheel are abnormal, and then selects the control program based on the control program selection table shown in FIG. 47A.

More specifically, the actuator driving nodes 300 for the front left and right wheels switch over the control program from (X) to (Y) so that the braking force control is executed in accordance with the driver's demand signal 200. The actuator driving node 300 for the rear right wheel switches over the control program from (X) to (Z) so that the braking force is released.

As described above with reference to FIG. 57, if the operation amount generating node 100 and any actuator driving node 300 are failed, each actuator driving node 300 confirms the occurrence of a failure in the operation amount generating node 100 and any actuator driving node 300 via mutual communication, and the normal actuator driving nodes 300 switch over the control program depending on the location of the failed actuator driving nodes 300 so as to execute the braking force control in accordance with the driver's demand signal 200 or command release of the braking force in a proper manner. Even in that case, therefore, the brake control of the vehicle can be maintained while avoiding the braking in an unbalanced state.

While the operations of the operation amount generating node 100 and the actuator driving nodes 300 have been described above, by way of example, in connection with the braking, the present invention is similarly applied to the steering.

In the event of a failure in the actuator driving node 300 or the actuator 400 for the steering angle control, the actuator driving node 300 for the steering angle control sends the failure detection notification to the operation amount generating node 100 and the other actuator driving nodes 300.

Upon receiving the failure detection notification from the actuator driving node 300 for the steering angle control, the operation amount generating node 100 operates as follows. When the actuator driving node 300 or the actuator 400 for the steering angle control is provided with redundancy, the operation amount generating node 100 can continue the steering control by sending the operation amount command value 120 to the normal actuator driving node 300 for the steering angle control. Alternatively, the operation amount generating node 100 can also continue the steering control by sending the operation amount command values 120 to the actuator driving nodes 300 for the brake control so that the vehicle is caused to turn due to a difference in braking force between the brakes for the right wheel and the left wheel.

On the other hand, in the event of a failure in the operation amount generating node 100, the operation amount generating node 100 sends the failure detection notification to all the actuator driving nodes 300. Responsively, the actuator driving nodes 300 for the steering angle control can continue the steering control by taking in the driver's demand signal 200 from the sensor 500.

Also, in the event of a failure in the actuator driving node 300 or the actuator 400 for the steering angle control, the actuator driving nodes 300 for the brake control detects the failure of the actuator driving node 300 for the steering angle control by receiving the failure detection notification from the actuator driving node 300 for the steering angle control or by confirming non-reception of a response message from it. Then, the actuator driving nodes 300 for the brake control can make the steering control continued while modifying the respective operation amounts via mutual reference using response messages in accordance with the driver's demand signal 200 from the sensor 500 so that the vehicle is caused to turn due to a difference in braking force between the brakes for the right wheel and the left wheel.

Figure 58:
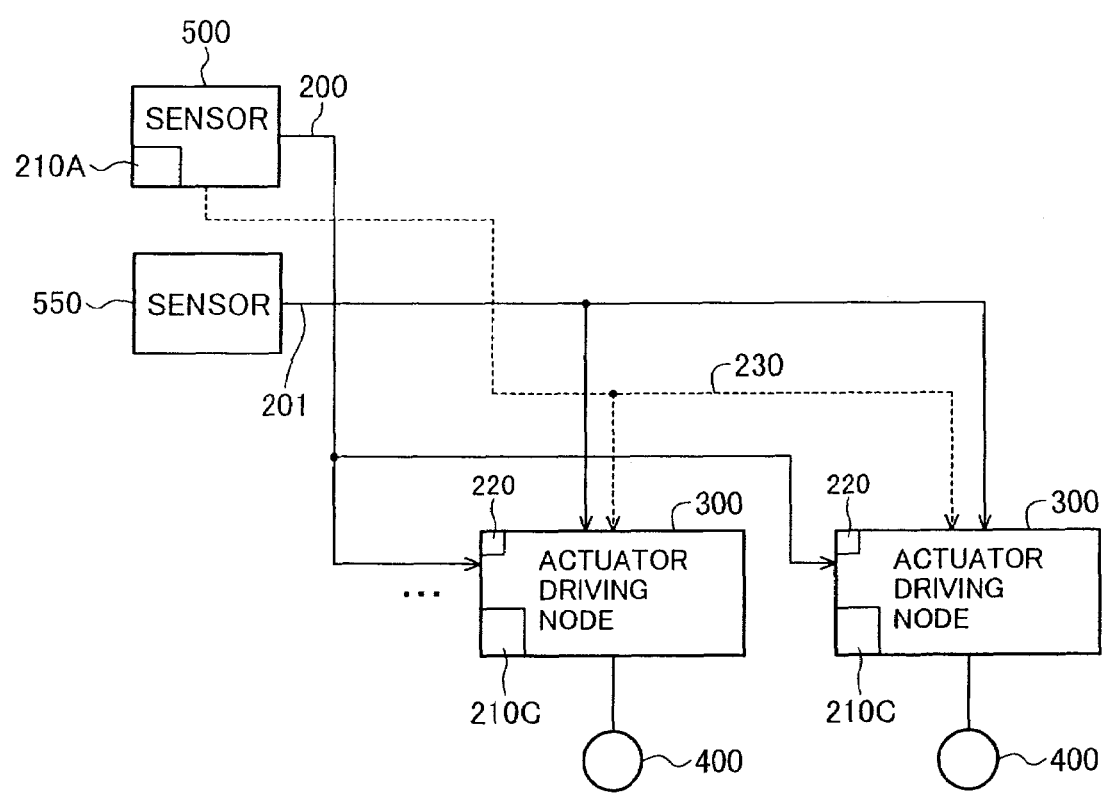
FIG. 58 is a block diagram showing still another modification of the vehicle control system according to the eighth embodiment of the present invention.

While the above description has been made of the vehicle control system including the operation amount generating node 100 and the actuator driving nodes 300, the present invention is also effectively applicable to a vehicle control system in which the vehicle is controlled only with the actuator driving nodes 300 without using the operation amount generating node 100, as shown in FIG. 58.

Each of the actuator driving nodes 300 used in the vehicle control system according to this modification controls an associated actuator 400 by selecting the control program (Y) or (Z). This selection of the control program is executed in the same manner as the case where the operation amount generating node 100 is failed in the vehicle control systems according to the above-described embodiments.

Thus, since the actuator driving nodes 300 operating independently of one another control their actuators 400 under coordination among them, a safe vehicle control system can be realized even in the vehicle not equipped with the operation amount generating node 100.

Ninth Embodiment

Figure 61:
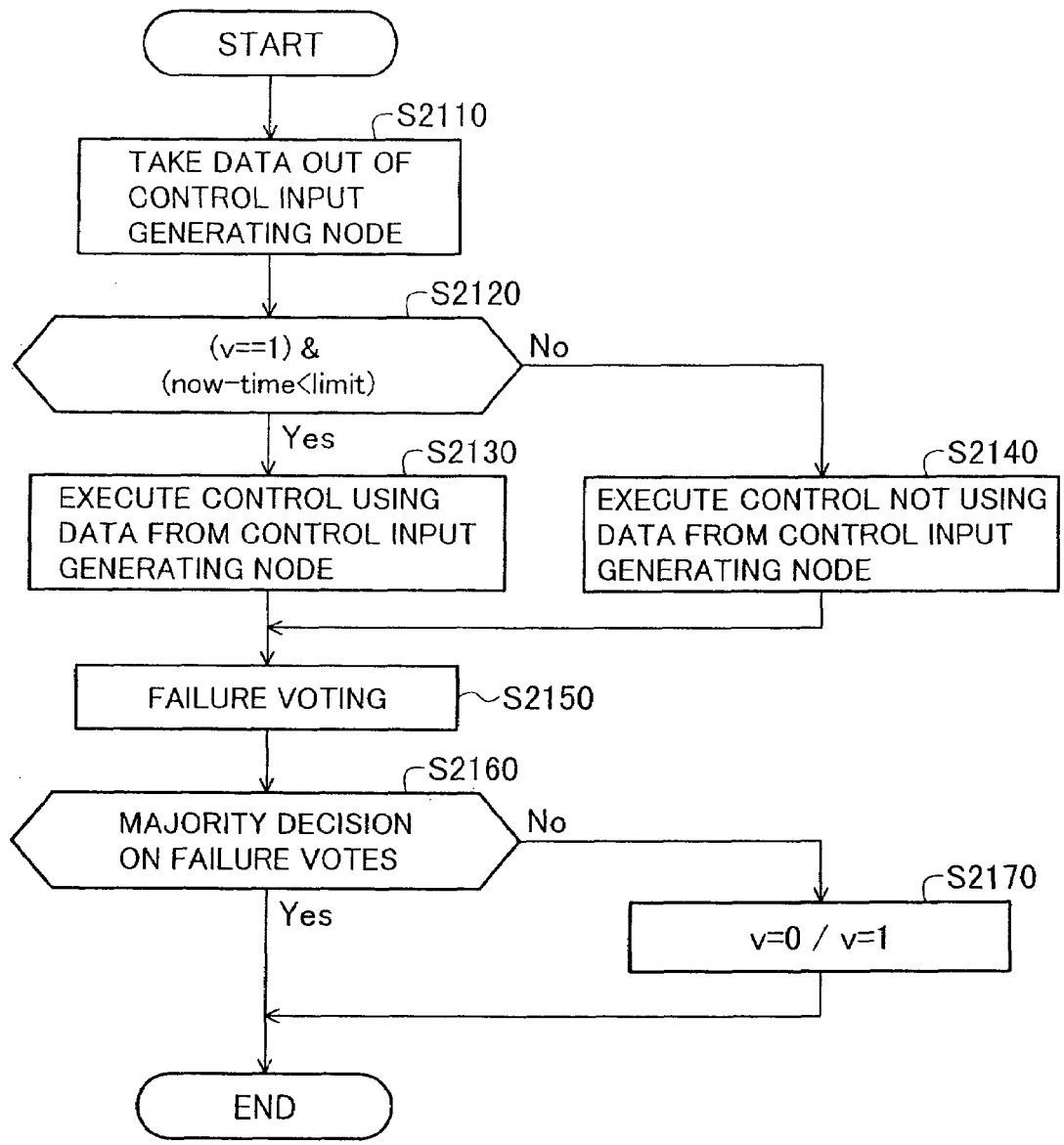
FIG. 61 is a flowchart showing failure diagnosis process for another node.

A vehicle control system according to a ninth embodiment of the present invention will be described below with reference to FIGS. 59 through 61.

Figures 59, 60:
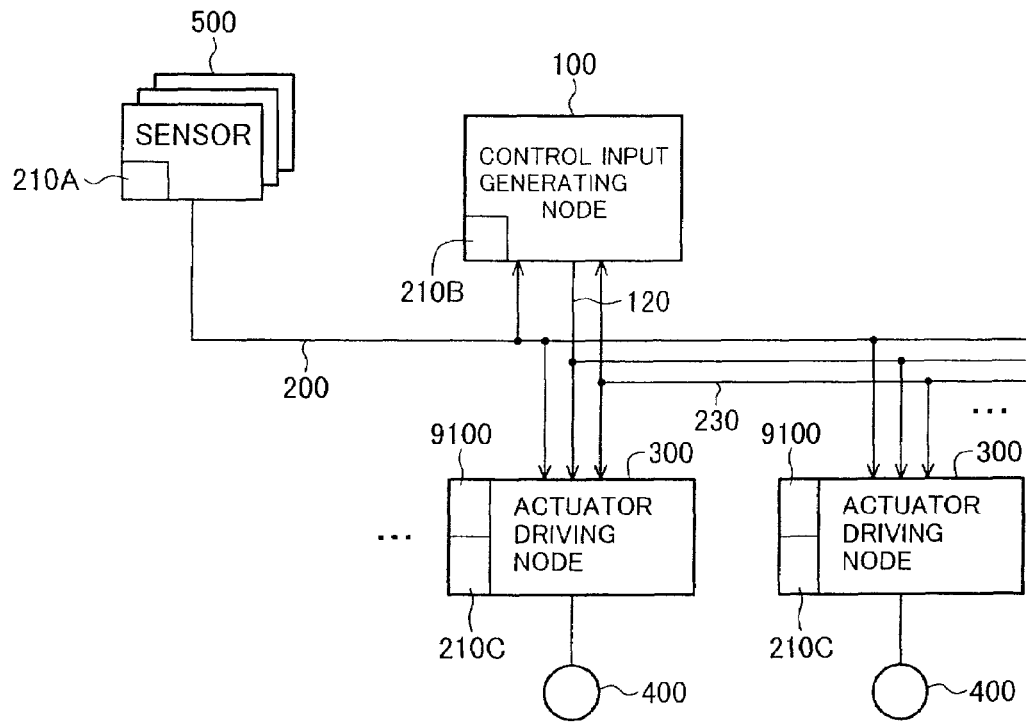
FIG. 59 is a block diagram showing a vehicle control system according to a ninth embodiment of the present invention.
FIG. 60 is a representation showing a practical example of a data reception table.

FIG. 59 shows a basic configuration of the vehicle control system according to the ninth embodiment. The vehicle control system comprises a sensor 500 for detecting the driver's demand, an actuator 400, an operation amount generating node 100, and actuator driving nodes 300.

Of those components, the sensor 500 for detecting the driver's demand, the operation amount generating node 100, and the actuator driving nodes 300 have the failure detecting functions 210A, 210B and 210C, respectively. The failure detecting function 210C of each actuator driving node 300 has not only the self-diagnosis function, but also the function of detecting a failure of the associated actuator 400.

The operation amount generating node 100 computes an operation amount command value 120 based on a driver's demand signal 200 and a vehicle status signal 201. The actuator driving node 300 receives the operation amount command value 120 and controls the actuator 400 to thereby execute driving, steering, braking, etc. of the vehicle.

When each of the failure detecting functions 210A, 210B and 210C detects a failure of its own node or the associated actuator 400, it outputs a failure detection notification 230 to the exterior of the node to notify that its own node is in the failed state. When the nodes provided with the failure detecting functions are in the failed state, each of all those nodes stops any other outputs to the exterior than outputting the failure detection notification 230, namely, it is constituted to be fail-silent.

Further, each node includes a data reception table 9100. Though not shown in FIG. 59, each node includes a data transmission table as well. Data stored in the data transmission table is output to the other nodes at a period preset in the system. Conversely, data received from the other nodes is temporarily stored in the data reception table and is read for use at a control period in the relevant node.

Instead of interconnecting the nodes via signal lines as shown in FIG. 59, the nodes may be interconnected via a bus or network configuration in which a common communication path is used in a time division manner. In this ninth embodiment, it is assumed that data outputted from one node can be received by a plurality of other nodes. Each of the failure detecting functions 210A, 210B and 210C has not only the function of estimating the nodes of the other nodes based on the contents of the data reception table, but also the function of reporting the estimation results to a plurality of nodes.

FIG. 60 shows a practical example of the data reception table 9100. The data reception table 9100 has a message number field 9101 for identifying a transmission source and a transmission event. The message number field 9101 may be an actual field, or it may be given as a particular address assigned to the relevant message instead of the actual field.

Other fields of the data reception table 9100 include a validity field 9102 indicating validity of the relevant message, a time-of-day field 9103 recording the time of day at which the relevant message has been transmitted, a message data field 9104, and a failure vote field 9105.

The message outputted from each node contains those items of information and is stored in the data reception table divided into predetermined fields in the node that has received the message.

The message unnecessary for the relevant node is not required to be stored in it. As indicated by the message number (No. 2) in FIG. 60, therefore, the validity field corresponding to such a message may be set invalid (0) from the beginning. Alternatively, though not necessary for control, the validity field corresponding to such a message may be set valid just for the purpose of signal monitoring. Of course, when the failure detection notification 230 is received from any node, it is reflected on the data field to be able to make determination on whether the received detection notification is valid.

A method of diagnosing a failure of the other node will be described with reference to FIG. 61. While the following description is made of the case where the operation amount generating node is failed, it is similarly applied to the case where any other node is failed.

First, the message number field 9101 corresponding to the operation amount generating node is taken out (step S2110). In an example where the message number field is given as an address, this step is executed by accessing the relevant address.

Then, the validity field 9102 of the data reception table 9100 is referred to. If the validity field 9102 indicates the data being valid and the time-of-day field 9103 is updated, control is executed using the data in the message data field 9104 sent from the operation amount generating node. Here, whether the time-of-day field 9103 is updated or not is determined, for example, by checking whether the difference between the time-of-day information ("now") owned by the relevant node and the time-of-day field ("time") 9103 corresponding to each message is within a preset certain value ("limit")(step S2120).

Returning to FIG. 60, the time of day contained in the message corresponding to the node 5 is older than the other nodes and has a difference not less than 50. Based on such a difference, it is determined that the operation amount generating node is not operated. If the relevant field is determined as being not valid with the above-mentioned method or another suitable one, this means that the operation amount generating node does not operate normally. Therefore, control is executed using the information sent from the other nodes (step S2140). On the other hand, if the relevant field is determined as being valid with the above-mentioned method or another suitable one, control is executed using the information sent from the operation amount generating node (step S2130).

Then, a failure vote is outputted to notify the determination result to the other nodes (step S2150). This failure vote is stored in the failure vote field 9105. Each numeral in the failure vote field 9105 of the data reception table 9100 is expressed as a binary number and corresponds to each of the message numbers assigned in increasing order starting from the left end. In an example of FIG. 60, all the valid nodes except for the node 5 determine that the node 5 is failed ("vote"=1).

Although only the node 5 outputs a failure vote indicating that it is normal ("vote"=0), the node 5 is determined to be invalid based on a predetermined algorithm, e.g., majority decision, and the validity field is made invalid (steps S2160 and S2170).

When the node having failed to operate is recovered, the recovery can be realized, for example, with elimination of a trouble or automatic resetting. In such a case, too, whether the relevant node has recovered or not is decided with voting made from the other nodes based on the observation results.

Thus, since all the nodes taking part in the control can accept the node 5 at the same time, it is possible to avoid a situation where the control method differs for each of individual system sections.

Additionally, the voting algorithm used in determining the recovery of the failed node may be selected as a different one from the algorithm used in determining the occurrence of a failure. For example, the recovery may be determined based on unanimous voting of all the nodes. Further, even the actuator node is also constituted to output a vote so that the system state can be shared by all the nodes via failure voting.

The ninth embodiment is not limited to the above-described example, and it can be practiced in various forms. For example, the command controller for generating control commands is not always required to be a single integrated one, and it may be constituted by a plurality of command controllers.

Figure 62:
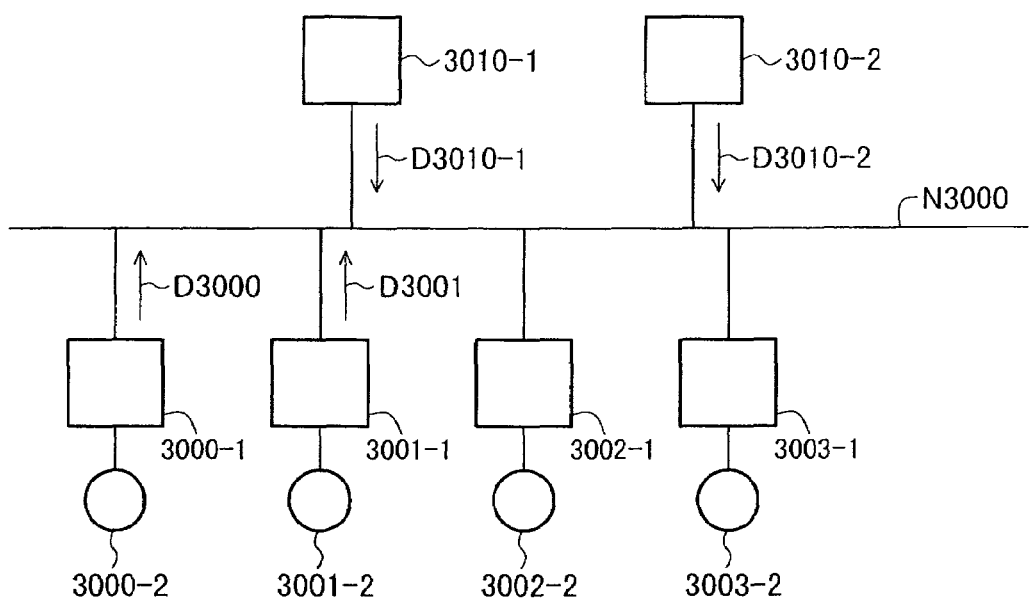
FIG. 62 is a block diagram showing a vehicle control system according to still another embodiment of the present invention.

As shown in FIG. 62, a system may comprise a sensor controller 3000-1 for taking in information from a steering wheel angle sensor 3002-2 and outputting steering wheel angle information D3000 to a network, a sensor controller 3001-1 for taking in information from a brake pedal position sensor 3001-2 and outputting brake pedal step-down amount information D3001 to the network, an actuator controller 3002-1 for operating a steering angle control motor 3002-2, an actuator controller 3003-1 for operating an electric brake caliper, a command controller A (3010-1), and a command controller B (3010-2), which are interconnected via an in-vehicle network N3000.

With such a configuration, the command controller 3010-2 for computing a target braking force D3010-2 and the command controller 3010-1 for computing a target steering angle D3010-1 are arranged in physically spaced relation, whereby a probability of total loss of the integrated control function can be reduced.

The vehicle control system of the present invention has advantages as follows:

(1) Even when a vehicle motion integrated control unit is in an unusable state, a steering unit operated by the driver and a vehicle control unit are able to communicate with each other, whereby the vehicle control can be executed as per the driver's intent.

(2) In the vehicle control system, if a failure occurs in any node, each of the other normal nodes switches over a control mode in accordance with a failure detection notification sent from the failed node so that an error can be backed up through coordination in the entire system. Therefore, a sufficiently high-reliable vehicle control system can be realized at a low cost without increasing redundancy of each node beyond the least necessary level.

(3) Since the operation amount applied from the driver is corrected with the correction amount generated by the correction amount generating node, appropriate steering and braking operations are resulted, whereby stability of the vehicle can be improved.

(4) If the correction amount generating node is failed, the control function is contracted such that the vehicle motion can be provided as per the operation by the driver without using the correction amount.

(5) While a high level of information processing is required to generate the correction amount, comparatively simple information processing is required to generate the operation amount. This makes it essential in the correction amount generating node to increase the number of parts, to raise the operation frequency, and to operate with less electrical and thermal allowances as compared with the operation amount generating node. As a result, the correction amount generating node has a higher failure rate than the operation amount generating node. Thus, the advantage of the present invention is particularly valuable in point of avoiding the influence of a failure of the correction amount generating node having a higher failure rate.

(6) Even if the operation amount generating node is failed, the actuator driving nodes detect the failure of the operation amount generating node and switch over the control programs so as to continue the vehicle control, whereby the correction amount generating node is not required to have redundancy and a safe vehicle control system can be realized at a low cost.

(7) Since the actuator driving nodes detect the occurrence of a failure via mutual communication and switch over the control programs to proper ones, it is possible to avoid a risky vehicle motion, such as braking in an unbalanced state. Further, even in the failed state of the operation amount generating node, safe vehicle control can be maintained.

What is claimed is:

1. A vehicle control system comprising a plurality of actuator driving nodes that control actuators in accordance with a driver's demand and a vehicle status, and communication means for interconnecting said plurality of actuator driving nodes, thereby controlling at least one of driving, steering and braking of a vehicle,
wherein each of said actuator driving nodes has a control program selecting function that selects one of a plurality of control programs based on an operation state of itself and operation states of the other actuator driving nodes,
wherein each of said actuator driving nodes has a failure detecting function that detects its own failure and notifies the occurrence of the failure to the other actuator driving nodes via said communication means, and said control program selecting function selects a control program for safely stopping control based on the failed state of itself and the failed states of the other actuator driving nodes.

2. The vehicle control system according to claim 1, wherein the actuator driving nodes select the control program independent of the driver's demand and the vehicle status.

3. A vehicle control system comprising a plurality of actuator driving nodes that control actuators in accordance with a driver's demand and a vehicle status, and communication means for interconnecting said plurality of actuator driving nodes, thereby controlling at least one of driving, steering and braking of a vehicle,
wherein each of said actuator driving nodes has a control program selecting function that selects one of a plurality of control programs based on reception states of messages sent from the other actuator driving nodes via said communication means,
wherein each of said actuator driving nodes sends a message notifying its own operation state to the other actuator driving nodes via said communication means, and said control program selecting function selects a control program for safely stopping control based on whether the messages have been received from the other actuator driving nodes.

4. The vehicle control system according to claim 3, wherein the actuator driving nodes select the control program independent of the driver's demand and the vehicle status.

5. A vehicle control system comprising at least one operation amount generating node that computes operation amount command values based on a driver's demand and a vehicle status, a plurality of actuator driving nodes that control actuators in accordance with the operation amount command values from said operation amount generating node, and communication means for interconnecting said operation amount generating node and said plurality of actuator driving nodes, thereby controlling at least one of driving, steering and braking of a vehicle,
wherein each of said actuator driving nodes has a control program selecting function that selects one of a plurality of control programs based on an operation state of itself, operation states of the other actuator driving nodes, and an operation state of said operation amount generating node.

6. The vehicle control system according to claim 5, wherein said operation amount generating node has a failure detecting function that detects its own failure and notifies the occurrence of the failure to said actuator driving nodes or said operation amount generating node via said communication means; and
each of said actuator driving nodes has a failure detecting function that detects its own failure and notifies the occurrence of the failure to the other actuator driving nodes or said operation amount generating node via said communication means, and said control program selecting function selects a control program for safely stopping control based on the failed state of itself, the failed states of the other actuator driving nodes, and the failed state of said operation amount generating node.

7. A vehicle control system comprising at least one operation amount generating node that computes operation amount command values based on a driver's demand and a vehicle status, a plurality of actuator driving nodes that control actuators in accordance with the operation amount command values from said operation amount generating node, and communication means for interconnecting said operation amount generating node and said plurality of actuator driving nodes, thereby controlling at least one of driving, steering and braking of a vehicle,
wherein each of said actuator driving nodes has a control program selecting function that selects one of a plurality of control programs based on reception states of messages sent from the other actuator driving nodes or said operation amount generating node.

8. The vehicle control system according to claim 7, wherein said operation amount generating node sends the operation amount command values to said actuator driving nodes via said communication means; and each of said actuator driving nodes sends, upon receiving the operation amount command value, a response message to said operation amount generating node or the other actuator driving nodes via said communication means, and selects a control program for safely stopping control based on whether the operation amount command value from said operation amount generating node or the response messages from the other actuator driving nodes have been received.

9. A vehicle control system comprising sensor means for detecting a driver's demand and a vehicle status, at least one operation amount generating node that computes operation amount command values based on information from said sensor means, a plurality of actuator driving nodes that control actuators in accordance with the operation amount command values from said operation amount generating node or the information from said sensor means, and communication means for interconnecting said sensor means, said operation amount generating node and said plurality of actuator driving nodes, thereby controlling at least one of driving, steering and braking of a vehicle, wherein each of said actuator driving nodes has a control program selecting function that selects one of a plurality of control programs using the operation amount command value from said operation amount generating node, a control method using the information from said sensor means, and a control method of bringing said actuator into a predetermined state based on an operation state of itself, operation states of the other actuator driving nodes, and an operation state of said operation amount generating node.

10. The vehicle control system according to claim 9, wherein said operation amount generating node has a failure detecting function that detects its own failure and notifies the occurrence of the failure to said actuator driving nodes or said operation amount generating node via said communication means; and each of said actuator driving nodes has a failure detecting function that detects its own failure and notifies the occurrence of the failure to the other actuator driving nodes or said operation amount generating node via said communication means, and said control program selecting function selects one of a control method using the operation amount command value from said operation amount generating node, a control method using the information from said sensor means, and a control method of bringing said actuator into a predetermined state based on the failed state of itself, the failed states of the other actuator driving nodes, and the failed state of said operation amount generating node.

11. A vehicle control system comprising sensor means for detecting a driver's demand and a vehicle status, at least one operation amount generating node that computes operation amount command values based on information from said sensor means, a plurality of actuator driving nodes that control actuators in accordance with the operation amount command values from said operation amount generating node or the information from said sensor means, and communication means for interconnecting said sensor means, said operation amount generating node and said plurality of actuator driving nodes, thereby controlling at least one of driving, steering and braking of a vehicle, wherein each of said actuator driving nodes has a control program selecting function that selects one of a plurality of control programs using the operation amount command value from said operation amount generating node, a control method using the information from said sensor means, and a control method of bringing said actuator into a predetermined state based on reception states of messages sent from the other actuator driving nodes or said operation amount generating node.

12. The vehicle control system according to claim 11, wherein said operation amount generating node sends the operation amount command values to said actuator driving nodes via said communication means; and each of said actuator driving nodes sends, upon receiving the operation amount command value, a response message to said operation amount generating node or the other actuator driving nodes via said communication means, and selects one of a control method using the operation amount command value from said operation amount generating node, a control method using the information from said sensor means, and a control method of bringing said actuator into a predetermined state based on whether the operation amount command value from said operation amount generating node or the response messages from the other actuator driving nodes have been received.

\* \* \* \* \*